US012770910B2

(12) United States Patent
Tan et al.

(10) Patent No.: US 12,770,910 B2
(45) Date of Patent: Oct. 20, 2026

(54) ALUMINUM ALLOY-ENABLED FAST RECHARGEABLE BATTERY

(71) Applicants: NUtech Ventures, Lincoln, NE (US); Board of Regents of the University of Nebraska, Lincoln, NE (US)

(72) Inventors: Li Tan, Lincoln, NE (US); Xuejing Shen, Lincoln, NE (US); Tao Sun, Lincoln, NE (US); Michael Sealy, Lincoln, NE (US); Alexey Krasnoslobodtsev, Lincoln, NE (US); Wai-Ning Mei, Lincoln, NE (US); Renat Sabirianov, Lincoln, NE (US)

(73) Assignee: BOARD OF REGENTS OF THE UNIVERSITY OF NEBRASKA, Lincoln, NE (US)

(*) Notice: Subject to any disclaimer, the term of this patent is extended or adjusted under 35 U.S.C. 154(b) by 806 days.

(21) Appl. No.: 18/105,348

(22) Filed: Feb. 3, 2023

(65) Prior Publication Data

US 2023/0253611 A1 Aug. 10, 2023

Related U.S. Application Data

(60) Provisional application No. 63/306,629, filed on Feb. 4, 2022.

(51) Int. Cl.
*H01M 10/054* (2010.01)
*H01M 4/02* (2006.01)
(Continued)

(52) U.S. Cl.
CPC ........... *H01M 10/054* (2013.01); *H01M 4/38* (2013.01); *H01M 4/463* (2013.01); *H01M 4/583* (2013.01);
(Continued)

(58) Field of Classification Search
CPC ...... H01M 10/054; H01M 4/38; H01M 4/463; H01M 4/583; H01M 10/0566;
(Continued)

(56) References Cited

U.S. PATENT DOCUMENTS 8,841,014 B1 9/2014 Deshpande et al.
9,786,955 B1 10/2017 Burke et al.
(Continued)

OTHER PUBLICATIONS

Jiao et al., Liquid gallium as long cycle life and recyclable negative electrode for Al-ion batteries, Chemical Engineering Journal, vol. 391, 2020, pp. 1-8 (Year: 2020).*
(Continued)

*Primary Examiner* — Nicholas A Smith
*Assistant Examiner* — Benjamin Eli Kass-Mullet
(74) *Attorney, Agent, or Firm* — Gerald T. Gray; Leydig, Voit & Mayer, LTD.

(57) ABSTRACT

Aspects disclosed herein include an electrochemical cell comprising: an anode comprising: a first surface comprising aluminum metal or an aluminum alloy; a liquid metal on the first surface, the liquid metal being in liquid state during operation of the battery and the liquid metal having a different composition than that of the first surface; and aluminum-rich dendrites extending from the first surface and in contact with an electrolyte; a positive electrode; and the electrolyte between the positive electrode and the negative electrode, the electrolyte being capable of conducting ions.

22 Claims, 40 Drawing Sheets

(51) Int. Cl.
*H01M 4/38* (2006.01)
*H01M 4/46* (2006.01)
*H01M 4/583* (2010.01)
*H01M 10/0566* (2010.01)

(52) U.S. Cl.
CPC .. *H01M 10/0566* (2013.01); *H01M 2004/021* (2013.01); *H01M 2004/027* (2013.01); *H01M 2004/028* (2013.01)

(58) Field of Classification Search
CPC ..... H01M 2004/021; H01M 2004/027; H01M 2004/028
See application file for complete search history.

(56) References Cited

U.S. PATENT DOCUMENTS

| | | | | |
|---|---|---|---|---|
| 10,297,870 | B2 | 5/2019 | Bradwell et al. | |
| 2019/0089013 | A1 | 3/2019 | Ouchi et al. | |
| 2023/0104025 | A1* | 4/2023 | Azimi | H01M 4/587 429/50 |
| 2023/0343945 | A1* | 10/2023 | Nauman | H01M 4/463 |

OTHER PUBLICATIONS

Long et al., Suppressing Al dendrite growth towards a long-life Al-metal battery, Energy Storage Materials, vol. 34, 2021, pp. 194-202 (Year: 2021).*

Wang, L., Hoyt, J.J., Wang, N et al. Controlling solid-liquid interfacial energy anisotropy through the isotropic liquid. Nat Commun 11, 724 (2020). https://doi.org/10.1038/s41467-020-14530-7 (Year: 2020).*

Jiano et al., "Liquid gallium as long cycle life and recyclable negative electrode for Al-ion batteries" Chemical Engineering Journal, vol. 391, 123594 (2020).

Chen et al., "Ultrafast all-climate aluminum-graphene battery with quarter-million cycle life" *Science Advances* vol. 3, No. 12 (2017).

Lin et al., "An ultrafast rechargeable aluminium-ion battery" *Nature* 520, 324-328 (2015).

Hudak, "Chloroaluminate-Doped Conducting Polymers as Positive Electrodes in Rechargeable Aluminum Batteries" *Phys. Chem C*, 118, 10, 5203-5215 (2014).

* cited by examiner

ALUMINUM ALLOY-ENABLED FAST RECHARGEABLE BATTERY

CROSS-REFERENCE TO RELATED APPLICATIONS

This application claims the benefit of priority to U.S. Provisional Patent Application No. 63/306,629, filed Feb. 4, 2022, which is hereby incorporated by reference in its entirety.

BACKGROUND OF INVENTION

Fast charging is the key feature for portable electronics and electric vehicles which has ignited vigorous research activities. For energy storage platforms that rely on reversible redox reactions, the reduction in charging time from hours to minutes has already become a reality. A typical example can be found in Al-ion batteries. Over the past five years, it has quickly captured the fame of exceptional rate in both charging and discharging. The adoption of a pure Al as the electrode provides significant merits such as low cost, nonflammability, and high capacity. In addition, a stable Al electrode-electrolyte interface removes the complexity from an interphase layer that is commonly seen in lithium or lithium-ion systems. As such, long lasting performance with several tens of thousands of reversible charging and discharging has been demonstrated.

Can we further reduce the charging time from minutes to fractions of a second while keeping most of the capacity? Certain prior reports focused on getting a higher specific capacity, synthesizing a new carbon electrode to promote adsorption, or finding an affordable organic electrolyte. Rarely has attention been paid at the intrinsic barrier for charge transfer through the interface between the electrolyte and the electrode. Physics considerations suggest that faster charging requires a larger current injection, but a larger current will result in larger drop in resistance (iR) at the interface. From chemistry standpoint, metal ions in state-of-the-art Al-ion batteries exist as anionic complexes; the rate of reduction for these large negatively charged ions is much slower than reduction rate of metal salts in water. It has been generally described that thin, in the range of a few nanometers, electric double layers (EDLs) exist at the interface between electrolyte and a metal electrode. Current research treats EDLs as stable nanostructures. It is currently not clear how EDLs participate in the reduction of negatively charged ions. It is even less known about how to regulate EDLs in order to facilitate a quick reaction at the interface.

Clearly, there is a need in the art for electrodes and cells that further improve battery performance, such as charging rate.

SUMMARY OF THE INVENTION

Provided herein are electrodes, cells, batteries, and associated methods that include a negative electrode, or anode, that includes aluminum and a liquid metal layer for providing sites for growth of aluminum dendrites at certain interfaces of the liquid metal and a surface of the electrode. Further included herein are positive electrodes or cathodes that include a open networked graphene structure or three-dimensional graphene network. In embodiments, the cells or batteries therewith disclosed herein capable of fast charging rate and high specific capacity that are improved with respect to previously disclosed batteries.

Aspects disclosed herein include an electrochemical cell comprising: an anode comprising: a first surface comprising aluminum metal or an aluminum alloy; a liquid metal on the first surface, the liquid metal being in liquid state during operation of the battery and the liquid metal having a different composition than that of the first surface; and aluminum-rich dendrites extending from the first surface and in contact with an electrolyte; a positive electrode; and the electrolyte between the positive electrode and the negative electrode, the electrolyte being capable of conducting ions.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1A: Scanning electron microscopy (SEM) images of a three-dimensional graphene network after supercritical $CO_2$ drying. Large open pores with interconnecting frameworks are clearly visible. FIG. 1B: Cyclic voltammograms of graphene that was either supercritical $CO_2$ dried (G-$CO_2$) or dried by evaporating ethanol (G-Ethanol) (scan rate of 10 $mVs^{-1}$). FIG. 1C: Plot of the specific capacity versus current density for our work (entire red block) and state-of-the-art. FIG. 1D: Galvanostatic charge and discharge curves for devices having record-high specific capacities (200 mA h $g^{-1}$). The graphene cathode has a mass of 0.013 mg and density of 0.16 mg cm-2. FIG. 1E: Fast discharge ($i_c$=100 A $g^{-1}$, $i_{dc}$=100~600 A $g^{-1}$) leads to a quick drop in specific capacity (area of the shadow to assist the view on the amount of charging capacity). FIG. 1F: Moderate discharge followed after a fast charge ($i_c$=400~1,000 A $g^{-1}$, $i_{dc}$=100 A $g^{-1}$) retains 85% specific capacity even when batteries were charged at 1,000 A $g^{-1}$. FIG. 1G: Charging voltage to maintain a decent specific capacity goes up quickly with the increase of current density. FIG. 1H: SEM images of spotted Al islands inside surface pits of a pure Al anode after battery cells were fully charged at 400 A $g^{-1}$.

FIG. 2A: Schematic illustration of the plating of Al adatoms on pure Al versus that on Al-LM. FIG. 2B: Active anode behaves differently from a pure Al anode, where no delay in specific capacity and Coulombic efficiency were observed. FIG. 2C: Al-LM promotes an ultrafast charging with excellent specific capacity ($i_c$=400~1,000 A $g^{-1}$, $i_{dc}$=100 A $g^{-1}$), where a mere 0.35 second can charge the battery to its full capacity. Compared to pure Al anode, the active anode requests a lower charging voltage and exhibits longer time of discharging duration ($i_c$=1,000 A $g^{-1}$, $i_{dc}$=100 A $g^{-1}$). FIG. 2D: Bar graphs of active anode vs. pure Al anode in producing better specific capacity under high rates. Same cut-off voltage for both cases, saturation voltage of Al-LM anode. (Inset) Charge and discharge curves at a current density of 100 A $g^{-1}$ (graphene parameters: 0.025 mg; 0.22 mg cm-2). FIG. 2E: Electrochemical impedance spectroscopy (EIS) reveals pure Al anode higher resistance than the active anode. FIG. 2F: Over-charging of Al-ion batteries with two different anodes (Al vs. Al-LM, $i_c$=$i_{dc}$=400 A $g^{-1}$). ① SEM images of full-charging show early morphologies drastically different; and ②-⑤ are optical microscopy images of front- and side-views of plated Al.

FIG. 3A: SEM images and elemental mapping (EDS) of gallium distribution on anode. Before charging, liquid metal forms a spread-out network on Al. After charging, part of the liquid metal wraps up as spheres next to those newly grown aluminum sites. FIG. 3B: The effect of liquid metal treatment time on capacity (charging and discharging current density of 20 A $g^{-1}$ and cut-off voltage of 2.45 V). FIG. 3C: Galvanostatic charge and discharge curves. Graphene cathode has a mass of 0.026 mg and density of 0.16 mg cm-2. Note the optimal time (4 h) has the lowest saturation voltage and maximum capacity ($i_c$=200 A $g^{-1}$). FIG. 3D: Stability test of our Al-ion batteries using active anode over 45,000 cycles (same charging and discharging current density of 40 A $g^{-1}$, cut-off voltage of 2.45 V).

FIG. 3E: Raman setup to study reaction on the active anode. FIG. 3F: Time series of Raman spectra for one full cycle of charging and discharging at the interface of anode ($i_c$=$i_{dc}$). $Al_2Cl_7^-$, 299 $cm^{-1}$ (green zone); $AlCl_4^-$, 338 $cm^{-1}$ (yellow zone); $Al_3Cl_{10}^-$, 500 $cm^{-1}$ (red zone); and $EMI^+$, 753, 790, 1135, 1410, 1590 $cm^{-1}$ (blue zone).

FIG. 4A: Adsorption energy of Al on different hcp (H), fcc (F), and bridge (B) positions of Al/Ga interface compared with on pure Al and Ga surfaces. The energetically favorable adsorption near the Al/Ga boundary creates a potential nucleation site. FIG. 4B: Differential charge density of H3 and H4 adsorption sites. The H4 site exhibits somewhat stronger localization of electrons at the Al—Ga bond, accompanied by the formation of bonds with adatom, making it the most favorable adsorption site. FIG. 4C: The B44 site shows the disappearance of barrier at bridge position between fcc and hcp sites due to the lowering of local symmetry near the interface. FIG. 4D: Schematic illustration of the dynamic transition in EDLs. Reaction intermediate ($Al_3Cl_{10}^-$) triggers reconfiguration for $EMI^+$. FIG. 4E: The intensity variation with time for $Al_3Cl_{10}^-$ and $EMI^+$ indicates a coordinated change for both ion species during charging (within red shade) and discharging (within blue shade).

FIG. 9A: Corresponding charge/discharge curves. FIG. 9B: Comparison of saturation voltages using bar graphs of active anode vs. pure Al anode ($i_c$=100~1,000 A $g^{-1}$, $i_{dc}$=100 A $g^{-1}$). The maximum cut-off voltage with Coulombic efficiency >90% is defined as saturation voltage. Same 3D graphene cathode with the mass of 0.025 mg and density of 0.19 mg cm-2 is used in these measurements.

FIG. 10A: Relevant equivalent circuit model for EIS data. FIG. 10B: Nyquist plot. FIG. 10C: Bode plots and (FIG. 10D) Bode-phase angle versus frequency plots. The parameter $R_S$ is the electrolyte resistance, constant phase element (CPE) and $R_{CT}$ are the capacitance and charge-transfer resistance, respectively, and $W_0$ is the Warburg impedance related to the diffusion of ions into the bulk of the electrode. Total of 6 measurements are performed, i.e., four on Al-LM and two on pure Al. All data fitting results are shown in FIG. 10A and FIG. 2E, and representatives of pure Al anode and active anode were selected respectively to draw their Bode plots (FIG. 10C) and Bode-phase angle versus frequency plots (FIG. 10D), which can show fitting details. Simulated results (solid lines) fitted well with the experimental data (blue and red symbols), indicating the model being reasonable. Resistances for pure Al anode and active anode are calculated with the model, i.e., $R_{CT,\ pure\ Al}$=476.6±29.60 ohms; $R_{CT,\ Al\text{-}LM}$=186.5±17.79 ohms.

FIG. 16A: Cyclic voltammograms (CV) measured with scanning rate of 10 mV $s^{-1}$, using 3D graphene as the working electrode and different anodes as the counter/reference electrode. FIGS. 16B-16C: Galvanostatic charge and discharge curves with different anodes to 2.45 V (FIG. 16B) and their own saturation voltages (FIG. 16C). FIG. 16D: Specific capacities and Coulombic efficiencies of different anodes under saturation voltages. Current densities varied from 20 to 200 A $g^{-1}$.

FIG. 17A: Supercell with a Ga island on top of Al(111) surface. FIG. 17B: the adsorption energy of Al on different hcp, fcc and bridge positions. Al adsorption near the interface of the island can be even lower than the one of Al(111) surface, creating the conditions for potential nucleation.

STATEMENTS REGARDING CHEMICAL COMPOUNDS AND NOMENCLATURE

In general, the terms and phrases used herein have their art-recognized meaning, which can be found by reference to standard texts, journal references and contexts known to those skilled in the art. The following definitions are provided to clarify their specific use in the context of the invention. Certain terms used herein are intended to be consistent with the same as would be understood by one of skill in the art of batteries and/or material science, such as that of inorganic materials.

The term "electrochemical cell" refers to devices and/or device components that perform electrochemistry. Electrochemistry refers to conversion of chemical energy into electrical energy or electrical energy into chemical energy. Chemical energy can correspond to a chemical change or chemical reaction. Electrochemistry can thus refer to a chemical change (e.g., a chemical reaction of one or more chemical species into one or more other species) generating electrical energy and/or electrical energy being converted into or used to induce a chemical change. Electrical energy refers to electric potential energy, corresponding to a combination of electric current and electric potential in an electrical circuit. Electrochemical cells have two or more electrodes (e.g., positive and negative electrodes; e.g., cathode and anode) and one or more electrolytes. An electrolyte may include species that are oxidized and/or species that are reduced during charging or discharging of the electrochemical cell. Reactions occurring at the electrode, such as sorption and desorption of a chemical species or such as an oxidation or reduction reaction, contribute to charge transfer processes in the electrochemical cell. Electrochemical cells include, but are not limited to, electrolytic cells such as electrolysers and fuel cells. Electrochemical oxidation refers to a chemical oxidation reaction accompanied by a transfer of electrical energy (e.g., electrical energy input driving the oxidation reaction) occurring in the context an electrochemical cell. Similarly, electrochemical reduction refers to a chemical reduction reaction accompanied by a transfer of electrical energy occurring in the context an electrochemical cell. A chemical species electrochemically oxidized during charging, for example, may be electrochemically reduced during discharging, and vice versa. The term "electrochemically" or "electrochemical" may describe a reaction, process, or a step thereof, as part of which chemical energy is converted into electrical energy or electrical energy is converted into chemical energy. For example, a product may be electrochemically formed when electrical energy is provided to help the chemical conversion of a reactant(s) to the product proceed. Electroplating is an example of an electrochemical process.

Figure 25:
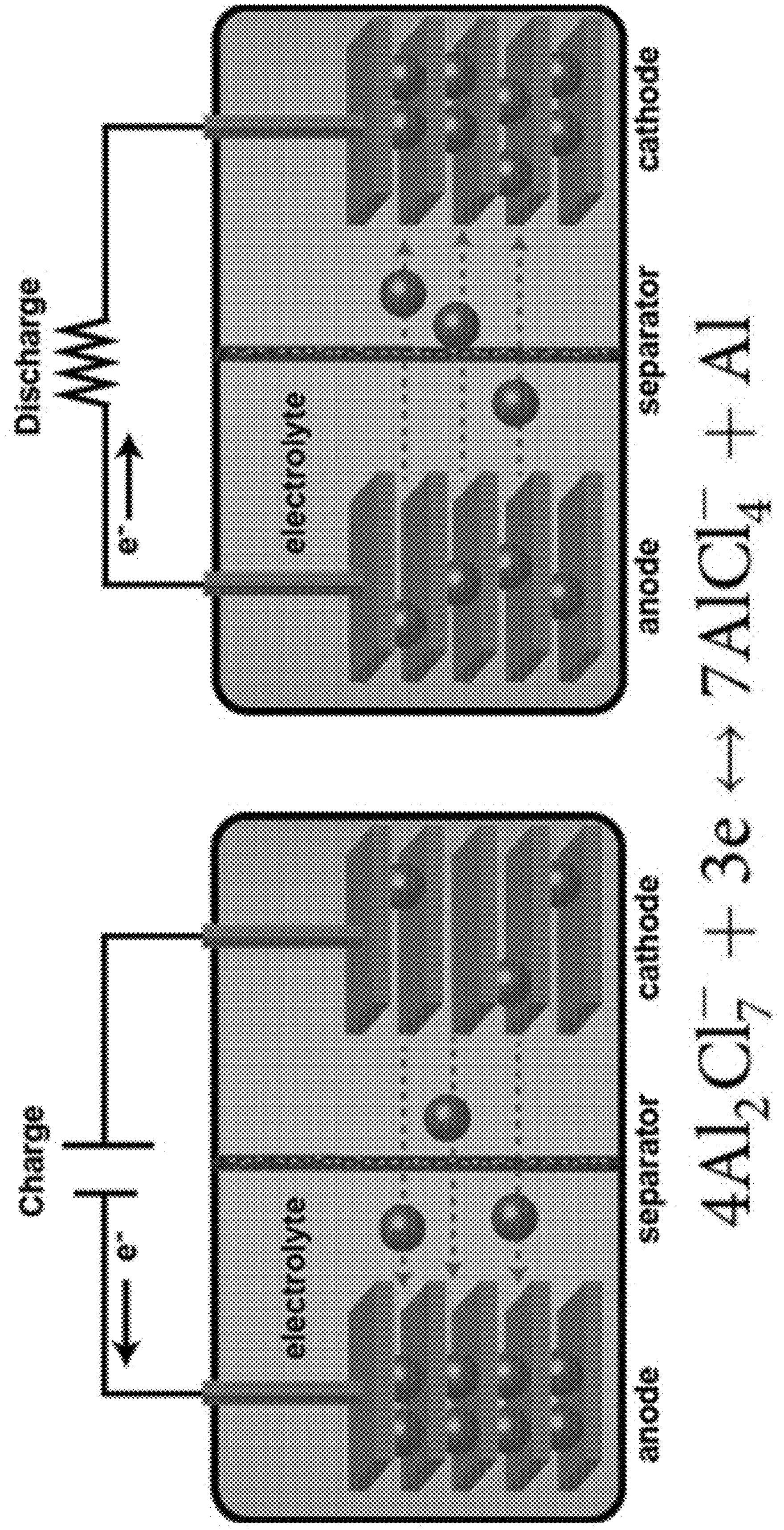
FIG. 25: An illustration depicting certain features of an electrochemical cell as used herein according certain embodiments.

The term "electrode" refers to an electrical conductor where ions and electrons are exchanged with the aid of an electrolyte and an outer, external, or other electrical circuit. In certain embodiments, the term "anode" refers to an electrode that is oxidized or undergoes oxidation during discharge of the cell. In certain embodiments, the term "cathode" refers to an electrode that is reduced or undergoes reduction during discharge of the cell. See also FIG. 25.

The term "electrical communication" refers to the arrangement of two or more materials or items such that electrons can be transported to, past, through, and/or from one material or item to another. Electrical communication between two materials or items can be direct or indirect through another one or more materials or items. Generally, materials or items in electrical communication are electrically conducting or semiconducting.

"Ionic communication" refers to the arrangement of two or more materials or items such that ions can be transported to, past, through, and/or from one material or item to another. Generally, ions can pass through ionically conducting materials such as ionically conducting liquids, such as water, or through solid ionic conductors. Preferably, but not necessarily exclusively, as used herein, transport or conduction of ions refers to transport or conduction of ions in an aqueous solution. For example, in some embodiments two materials or items are in ionic communication with one another if a path of ion flow is provided directly between the two materials or items. In some embodiments, two materials or items are in ionic communication with one another if an ion flow path is provided indirectly between the two materials or items, such as by including one or more other materials or items or ion flow paths between the two materials or items. In one embodiment, two materials or items are not necessarily in ionic communication with one another unless ions from the first material or item are drawn to, past and/or through the second material or item, such as along an ion flow path.

The term "dendrite" is intended to be consistent with the same term as used in the art of battery devices including materials and electrochemical reactions in batteries. Generally, according to certain embodiments, dendrites are nanostructures and/or microstructures which are typically but not necessarily metallic, typically but not necessarily formed, grown, or deposited at an anode or negative electrode during operation of an electrochemical cell, typically but not necessarily during a charging process/cycle.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

The term "and/or" is used herein, in the description and in the claims, to refer to a single element alone or any combination of elements from the list in which the term and/or appears. In other words, a listing of two or more elements having the term "and/or" is intended to cover embodiments having any of the individual elements alone or having any combination of the listed elements. For example, the phrase "element A and/or element B" is intended to cover embodiments having element A alone, having element B alone, or having both elements A and B taken together. For example, the phrase "element A, element B, and/or element C" is intended to cover embodiments having element A alone, having element B alone, having element C alone, having elements A and B taken together, having elements A and C taken together, having elements B and C taken together, or having elements A, B, and C taken together.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Overview:

Included herein is an aluminum anode coated with a thin layer or coating of liquid metal, such as gallium, for a cell or battery. In embodiments, the effect of the liquid metal layer includes reducing dendrite formation and increased electrochemical performance. In embodiments, the presence of the liquid metal layer focuses the nucleation sites of dendrite formations to boundary layers between the liquid metal (e.g., Ga) and Al, resulting in an overall reduction of dendrites.

Limitations or challenges in batteries that are addressed by the embodiments herein include: discharge/recharge rate: only so many chemical reactions can happen at a moment, regulated by surface area (specific capacity); degradation: e.g., chemical reactions deposits "debris" on charging surfaces, limiting transfer rates and hampers cycle life (e.g., dendrite formation); capacity: type of ion affects the total amount of available charge.

In embodiments, application of liquid gallium to the aluminum anode results in faster charging rates, higher current delivery, and longer life-span of the battery. In embodiments, the use of an open-networked graphene structure provides further benefits to performance characteristics of cells and batteries disclosed herein. For example, in embodiments, benefits of embodiments disclosed herein include:

- quick discharge: rechargeable Al-ion batteries capable of reaching a high specific capacity of 200 mAh $g^{-1}$ (highest among Al-ion batteries);
- faster charging rate: fastest charging rate of 104 C among all metal and metal-ion batteries;

increased capacity under load: 500% specific capacity compared to pure Al anode, under high-rate conditions;

long lasting: excellent stability over 45,000 cycles; and low cost: Al is beneficial for its lightweight and affordable characteristics.

Applications of the electrodes, cells, batteries, and/or methods disclosed herein include: rechargeable electronics, alternatives to Li-ion batteries, long-lasting quick-charging/discharging batteries, automotive systems, aerospace systems or devices, healthcare systems or devices, and consumer electronics.

Various non-limiting aspects and examples are described below.

Ultra-Fast Charging in Aluminum-Ion Batteries: Electric Double Layers on Active Anode:

Summary: With the rapid iteration of portable electronics and electric vehicles, developing high-capacity batteries with ultra-fast charging capability has become a holy grail. Here we report rechargeable aluminum-ion batteries capable of reaching a high specific capacity of 200 mAh $g^{-1}$. When liquid metal is further used to lower the energy barrier from the anode, fastest charging rate of 104 C (duration of 0.35 sec to reach a full capacity) and 500% more specific capacity under high-rate conditions are achieved. Phase boundaries from the active anode are believed to encourage a high-flux charge transfer through the electric double layers. As a result, cationic layers inside the electric double layers responded with a swift change in molecular conformation, but anionic layers adopted a polymer-like configuration to facilitate the change in composition.

Introduction: Fast charging is the key feature for portable electronics and electric vehicles which has ignited vigorous research activities. For energy storage platforms that rely on reversible redox reactions, the reduction in charging time from hours to minutes has already become a reality. A typical example can be found in a non-lithium platform, i.e., Al-ion batteries[1]. Over the past five years, it has quickly captured the fame of exceptional rate in both charging and discharging. The adoption of a pure Al as the electrode provides significant merits such as low cost, nonflammability, and high capacity. In addition, a stable Al electrode-electrolyte interface removes the complexity from an interphase layer that is commonly seen in lithium or lithium-ion systems[2,3]. As such, long lasting performance with several tens of thousands of reversible charging and discharging has been demonstrated[1].

Can we further reduce the charging time from minutes to fractions of a second while keeping most of the capacity? We have seen great works from different research groups, where they focused on getting a higher specific capacity[1,4,5], synthesizing a new carbon electrode to promote adsorption[4,6-9], or finding an affordable organic electrolyte[10,11]. Rarely has any attention been paid at the intrinsic barrier for charge transfer through the interface between the electrolyte and the electrode. Physics considerations suggest that faster charging requires a larger current injection; but a larger current will result in larger drop in resistance (iR) at the interface. From chemistry standpoint, metal ions in state-of-the-art Al-ion batteries exist as anionic complexes; the rate of reduction for these large negatively charged ions is much slower than reduction rate of metal salts in water. If the limitation in charge transfer is removed, we can then expect much bigger impacts than mere savings in time. For instance, this will eliminate the clear boundary between a supercapacitor and a battery, making the device both high capacity and high rate; and it will provide a deeper understanding of the electric double layers (EDLs). It has been generally accepted that thin, in the range of a few nanometers, EDLs exist at the interface between electrolyte and a metal electrode. Current research treats EDLs as stable nanostructures[12]. It is currently not clear how EDLs participate in the reduction of negatively charged ions. It is even less known about how to regulate EDLs in order to facilitate a quick reaction at the interface.

In this study, we demonstrate that charge transfer through the interface between Al electrode and the organic electrolyte can be effectively accelerated. As a result, the sites for $Al^{(0)}$ deposition are no longer assisted by surface defects only. We gained multiple technological and scientific advances including the ultrafast charging rate, high energy capacity, and 500% higher specific capacity under high-rate conditions. Most importantly, acceleration of the charge transfer reaction enabled the discovery of many intermediates inside the EDLs, expanding our understanding of the role that EDLs play in rechargeable batteries. We show that the byproducts formed during charging/discharging can be used to calibrate and challenge conventional understanding in the bulk.

Results:

Intrinsic Barrier in Charging. Al-ion batteries earned their fame by using an organic cation-based electrolyte[1,5], similar to those cases in lithium[13] and lithium-ion batteries[14]. Different from metal salts in water, cations here do not have any metal element, therefore they don't directly participate in redox reactions. Instead, the metal ions exist as anions or as negatively charged metal complexes. Preparation of the electrolyte is straightforward: mixing imidazolium chloride ($EMI^+Cl^-$) (solid) and anhydrous powder of $AlCl_3$ produces an ionic liquid (eutectic mixture). Three major ions have been reported in this electrolyte, i.e., Al mono-complex ($AlCl_4^-$), Al duo-complex ($Al_2Cl_7$), and the organic cation ($EMI^+$)[5,15]. When this electrolyte is placed inside an Al-ion battery, the Al electrode will be biased negatively and carbon electrode positively for charging. As a result, electrons from Al will jump over to the Al duo-complex and reduce it to a mono-complex, depositing fresh $Al^{(0)}$ over the Al electrode. On the carbon side, no new products will form. Rather, the Al mono-complex will adsorb on positively charged carbon surfaces. When batteries are allowed to discharge, Al (anode) will be oxidized but the carbon (cathode) reduced.

Figures 1A, 1B, 1C:
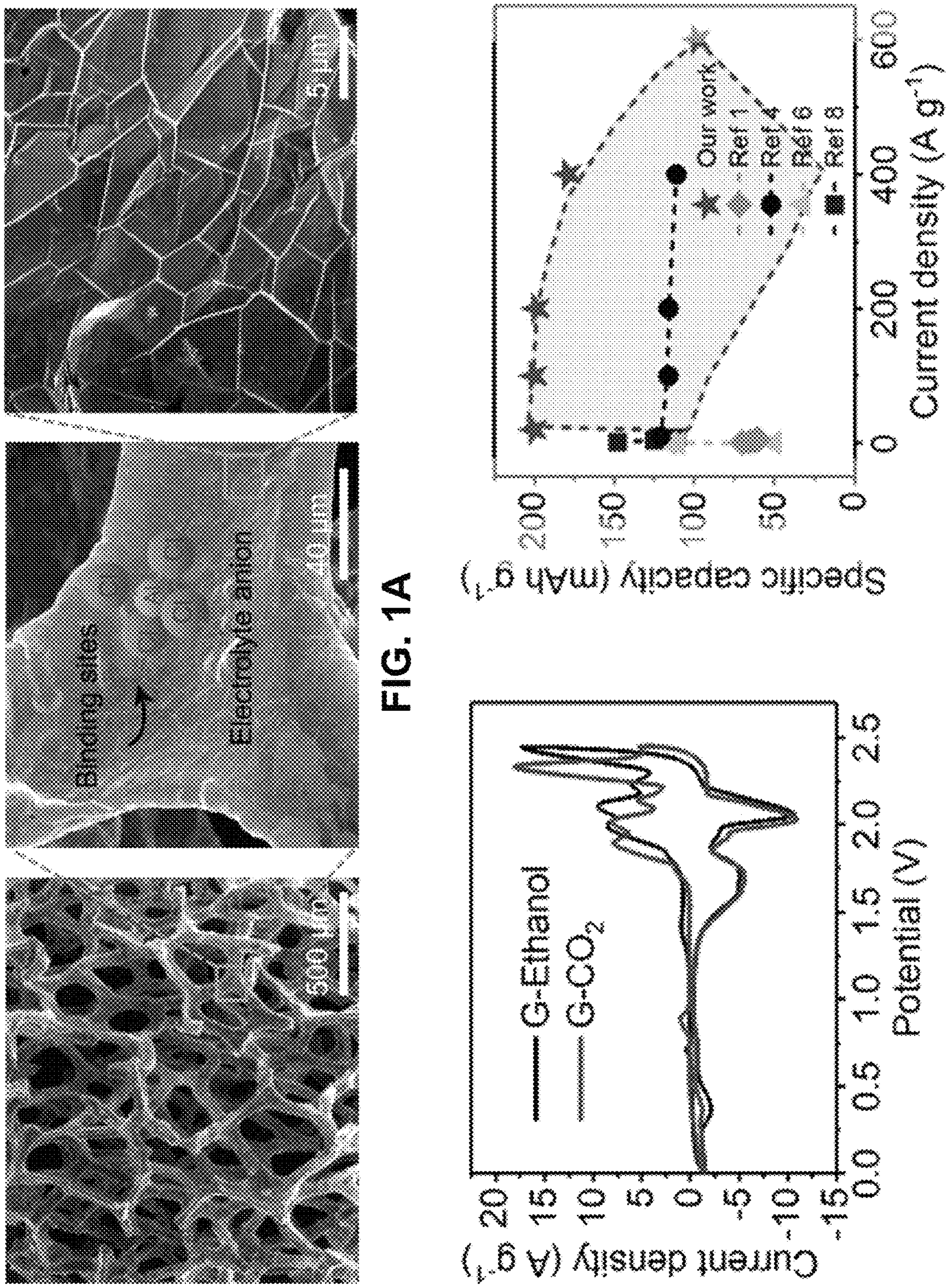
FIGS. 1A-1H: Highlights of Al-ion batteries and their performance limits.
Figure 5A:
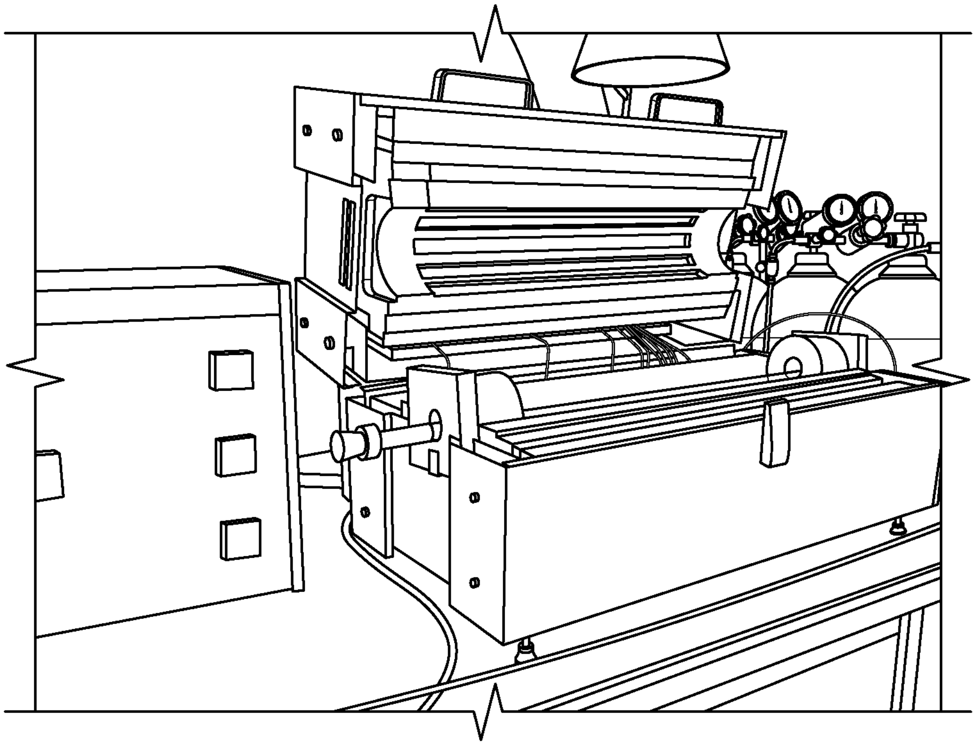
FIGS. 5A-5B: Chemical vapor deposition (CVD) system for graphene growth. The home-built quartz tube furnace (FIG. 5A) and control parameters (FIG. 5B) used for the growth of graphene.
Figure 5B:
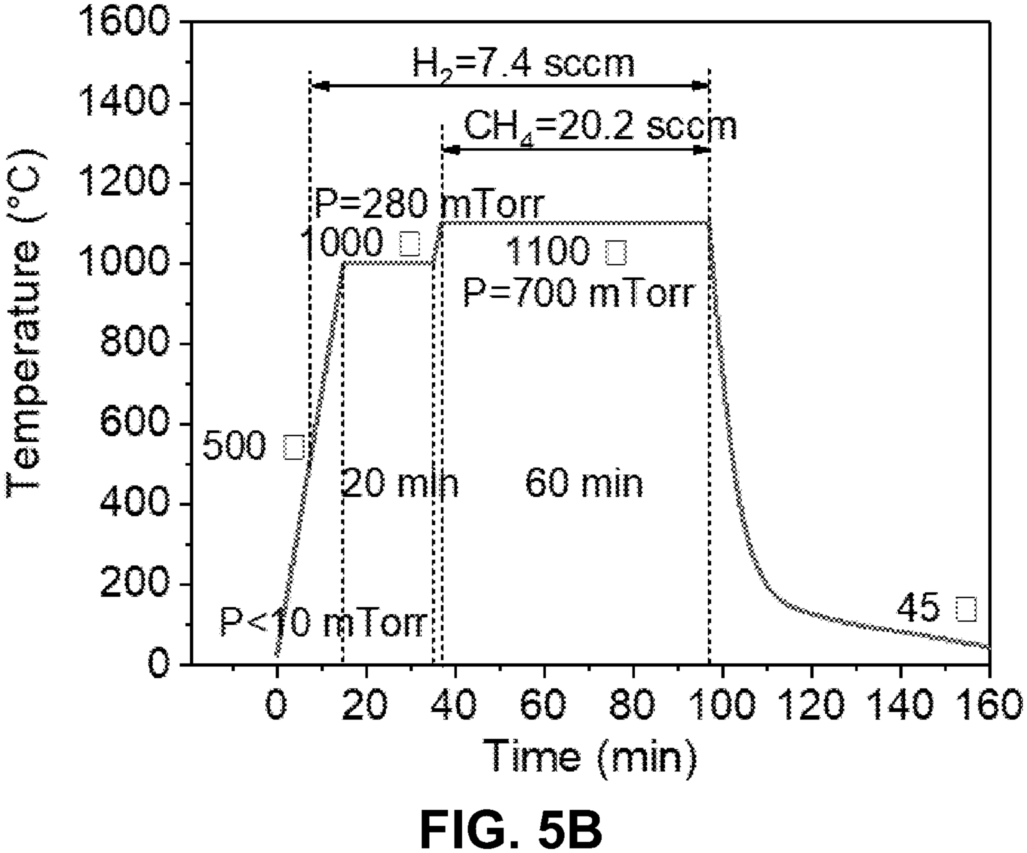
Figure 6A:
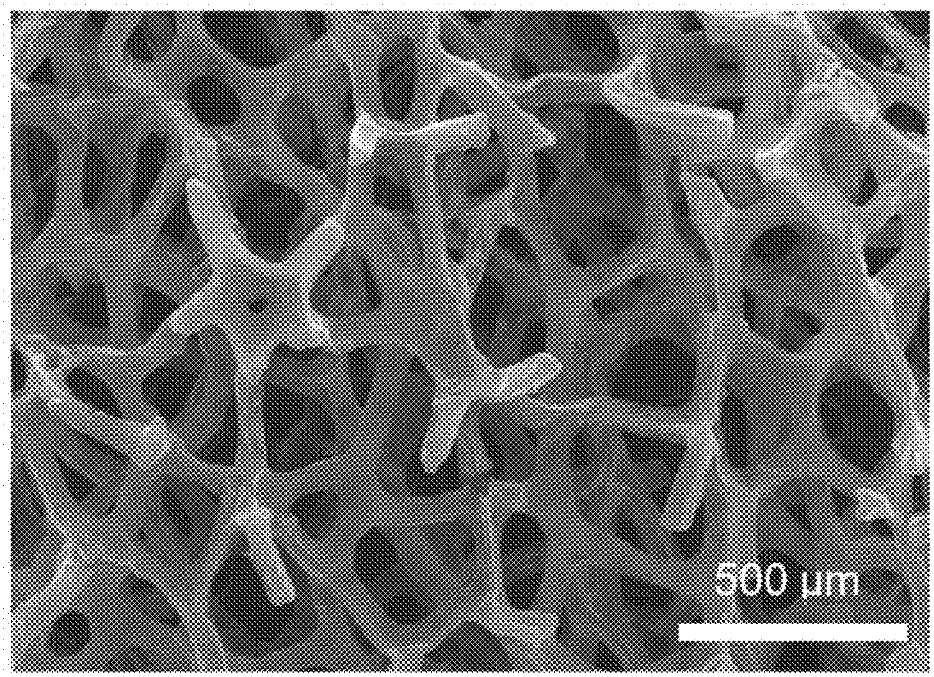
FIGS. 6A-6B: Network of graphene with different textures. SEM images of 3D graphene dried with supercritical $CO_2$ (FIG. 6A) and ethanol (FIG. 6B).
Figure 6B:
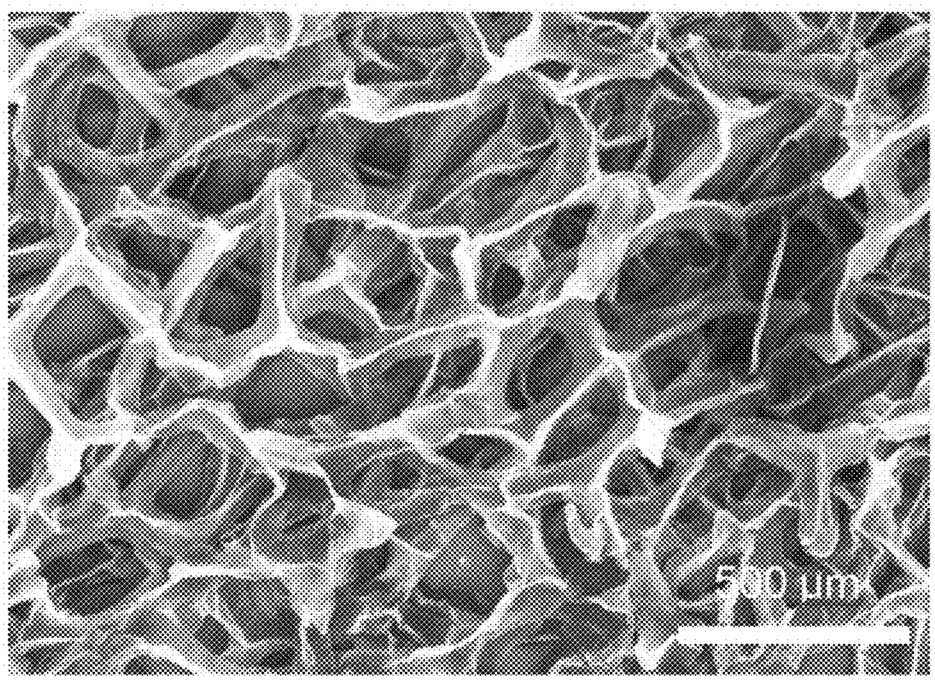
Figure 7:
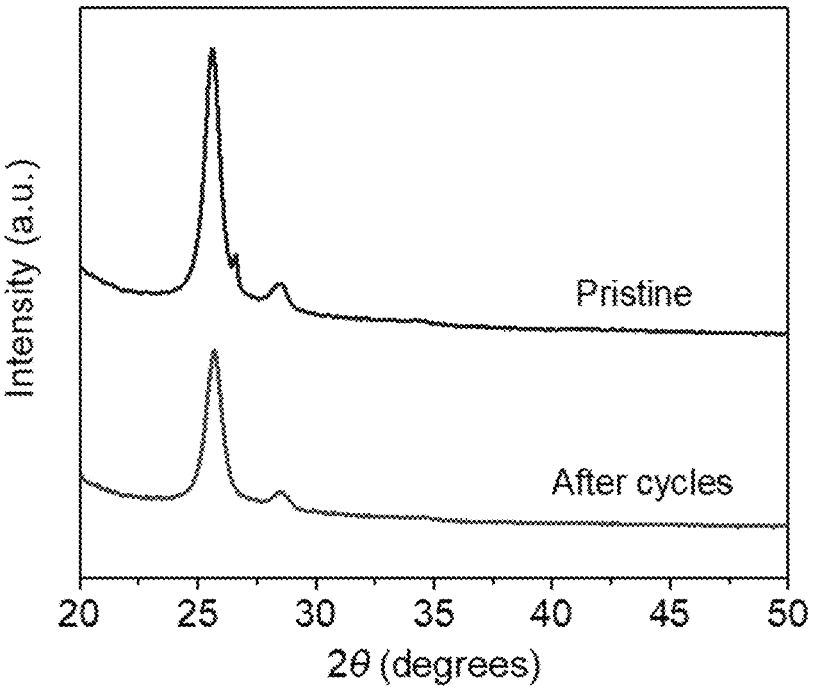
FIG. 7: Anion absorption on graphene. Ex situ X-ray diffraction patterns of pristine G-$CO_2$ and after 1,000 cycles of battery operations. Little change in interlayer spacing suggests anion absorption mainly occurred on open surfaces.

We used a three-dimensional (3D) network of graphene as the cathode to promote charge capacity, along with pure Al as the anode. FIG. 1A shows the network structure of our graphene, where the carbon-growth on a nickel foam was handled inside a chemical vapor deposition (CVD) chamber[16] (see FIGS. 5A-5B). Later removal of the nickel template requested acid dissolution, solvent rinsing, and drying. We found that the graphene cathode can exhibit smaller redox potentials in cyclic voltammogram (FIG. 1B) only when the drying step is handled using supercritical $CO_2$. Shifted peaks in the voltammogram suggest higher affinity for anions ($AlCl_4^-$) to bind to the surface (FIG. 1A-middle); an open and continuous network would then allow for a reliable desorption (FIGS. 6A-6B and 7). Seemingly, the graphene cathode acts as an open pocket by holding anions ($AlCl_4^-$) during charging process. When these anions bind to the graphene (positively biased while charging), three carbon-chloride bonds (FIG. 1A-middle) could form, rendering a robust "holding" of the Al mono-complexes. As strong bonding lowers energy of the system, we hypothesize that further cleavage of these bonds would be energetically costly, making discharge prohibitive under a high rate.

Figure 1D:
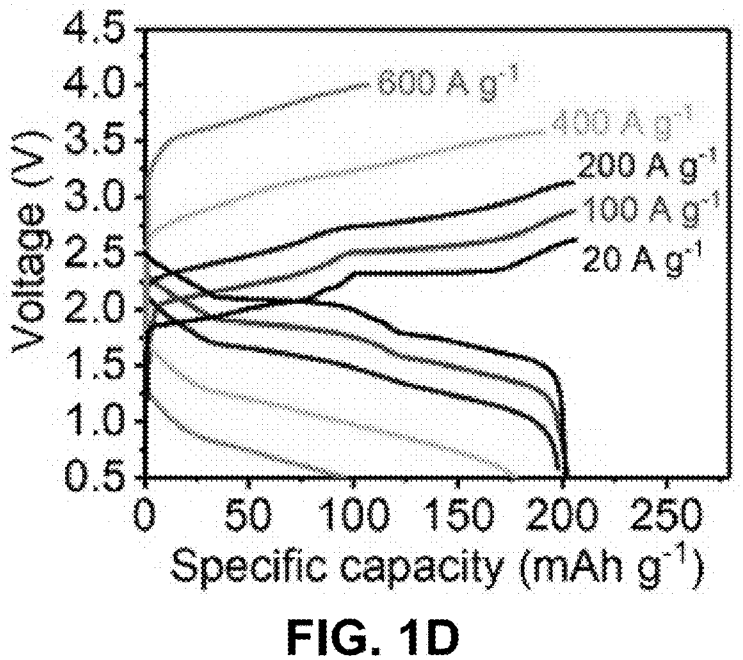
Figure 1E:
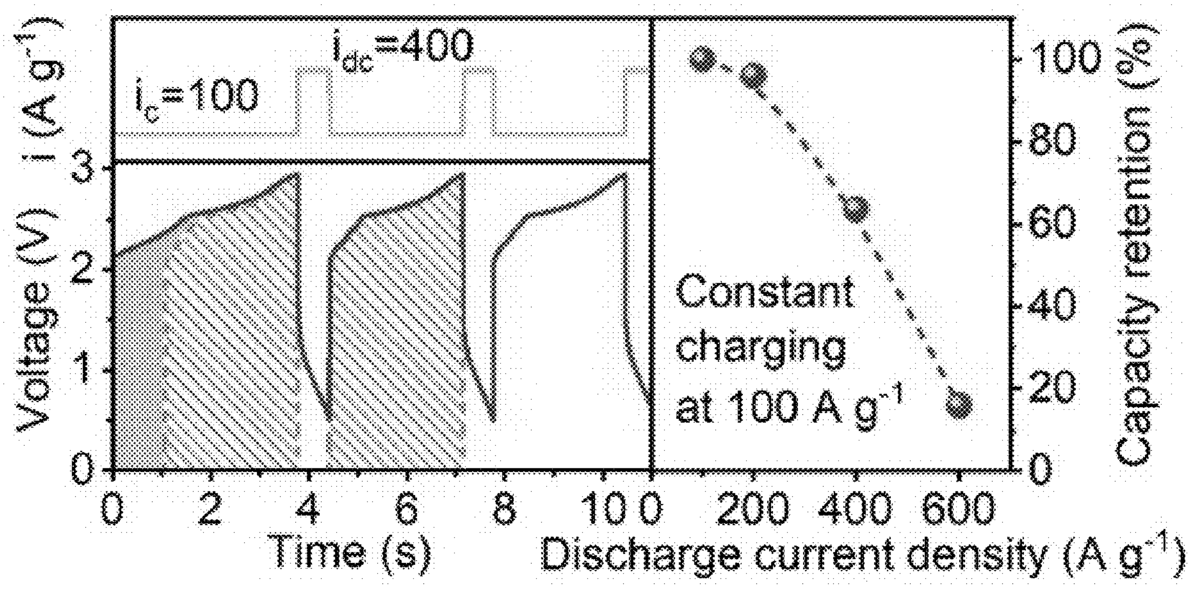
Figure 1F:
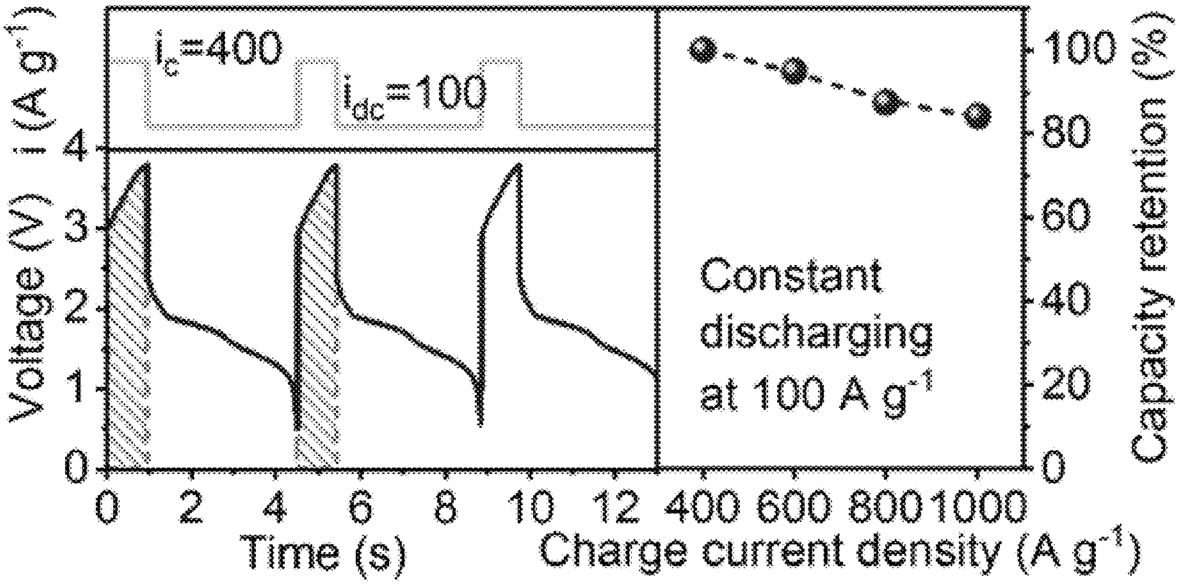
Figure 8:
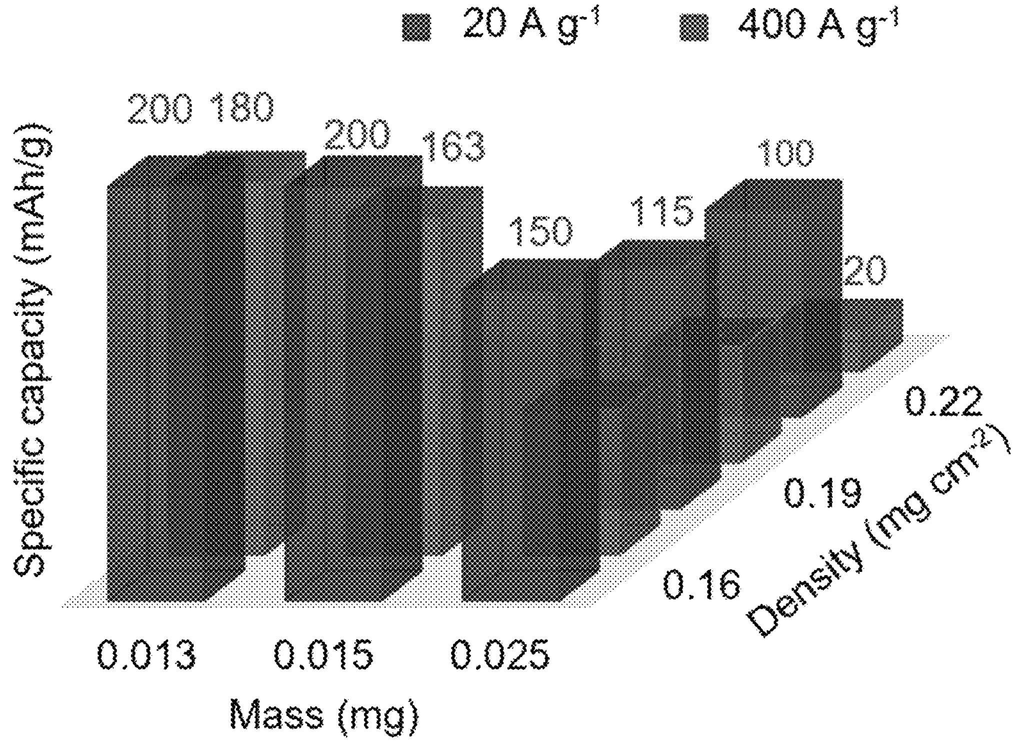
FIG. 8: Influence from mass and density of 3D graphene to specific capacities. The specific capacity of a device is affected by two factors: one is the adsorption and desorption of anions from the graphene and the other is the current density on Al anode. The first one becomes more difficult with the increase of carbon density (stacking of graphene layers) and the second one becomes larger as carbon mass increases. The latter will contribute to an elevated surface resistance, making charge transfer less efficient (smaller capacity). In our case, the density is calculated by using the mass of the graphene cathode involved in the reaction divided by the geometric area of this part (rectangular area of the graphene cathode in the top view) that is not the actual surface area of the graphene.

Exposed thin layers from the 3D graphene further improve performance of the Al-ion batteries as shown in FIG. 1C. We first observed a record-high[1,4-9] specific capacity (200 mAh $g^{-1}$) under a current density (i) of 20 A $g^{-1}$ (C-rate of 100; charging density ($i_c$) same as discharging ($i_{dc}$) or $i_c=i_{dc}$), then the capacity dropped at higher discharge rates (i 200 A $g^{-1}$ or rate over 1,000 C). Details of these charging/discharging are shown in FIG. 1D. Comparison between FIGS. 1E and 1F further provided reasons for the capacity decline, where reduced capacity retention was partially due to a fast discharging. Namely, when charging rate was kept at a moderate level ($i_c$=100 A $g^{-1}$) but followed by a fast discharging ($i_{dc}$=100~600 A $g^{-1}$), clear loss of capacity in the charging plateau (shortened charging time; FIG. 1E-left) or a widespread quick drop in capacity retention (FIG. 1E-right) was observed. However, when this sequence was reversed, i.e., charging at a really fast rate ($i_c$=400~1,000 A $g^{-1}$) but followed by a moderate rate of discharging ($i_{dc}$=100 A $g^{-1}$), loss of capacity became much less severe (FIG. 1F). Again, these data agree with our earlier statement that the graphene pocket is good at adsorbing anions but does not release them very well. In other words, a densely packed pocket would make the absorption of anions challenging, leading to inferior performances or a reduction in specific capacity (FIG. 8). Beside pocket size, we do not foresee any barrier for fast charging at the cathode side, where one-atom-thick carbon layer presents minimal resistance for current injection and Al-mono complex ($AlCl_4^-$) naturally likes a positively charged surface (graphene).

Figure 1G:
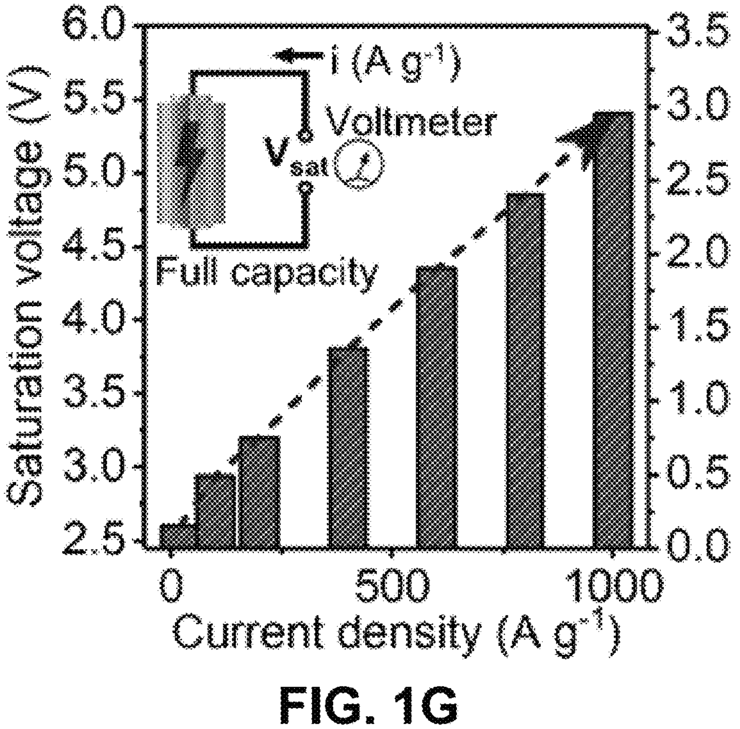
Figure 1H:
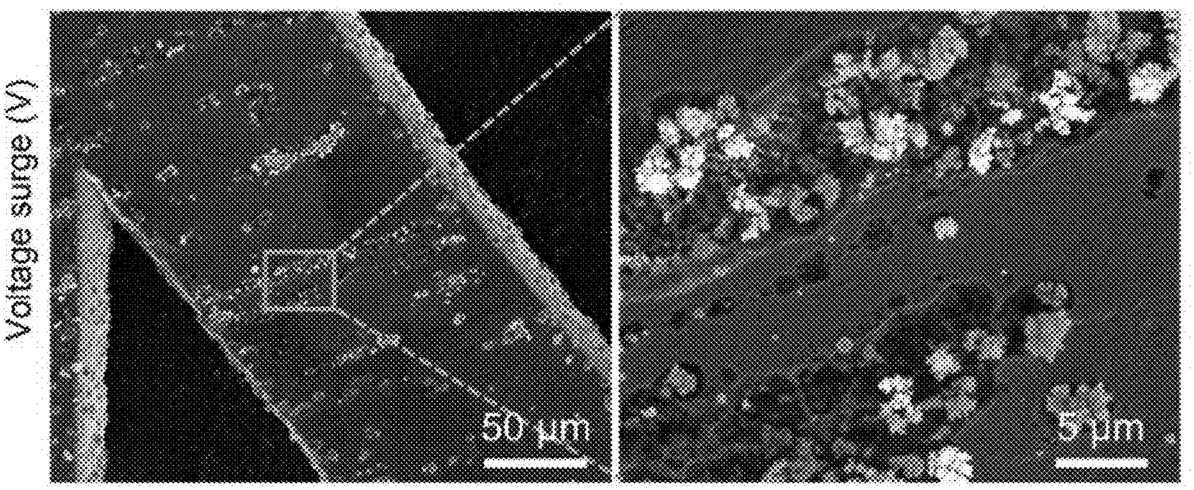

Fast charging at the anode side, however, is not simple. Mainly, Al species inside the organic electrolyte carry negative charges, either as mono-complexed ions ($AlCl_4^-$) or duo-complexed ones ($Al_2Cl_7^-$)[1,5]. The only way to reduce these Al-complexes is to negatively bias the Al anode. This, however, will result in oppositely charged cations ($EMI^+$) adsorbing on the anode first, leaving anions no choice but to adsorb as the second layer. Such two-layered structure will then stack on top of one another multiple times to form the so-called EDLs. Due to the presence of EDLs, electrons from the electrode cannot reach those Al-complexes without tunneling through the $EMI^+$ layer. Scanning tunneling microscopy studies in liquid[12,17] have confirmed such tunneling of electrons through the $EMI^+$ barrier. Therefore, the reduced $Al^{(0)}$ adatoms will need extra amount of energy before being deposited across the same $EMI^+$ layer. FIG. 1G confirms the existence of this energy barrier in fast charging. A voltage surge as high as 3.0 V was recorded when a large amount of current was injected through the Al anode. Interestingly, the device used surface defects for $Al^{(0)}$ depositions. FIG. 1H shows that flower buds-like Al grew almost exclusively inside the surface pits. This defect-guided growth suggests a reduction in surface energies being adopted to minimize the total consumption in energy. As those buds were spherical in shape, Al plating must have occurred at the same rate in all directions[18]. By increasing the surface energy in Al anode we can therefore push the growth rate of $Al^{(0)}$ further. This can be achieved utilizing liquid metal instead of pure aluminum.

Figure 2A:
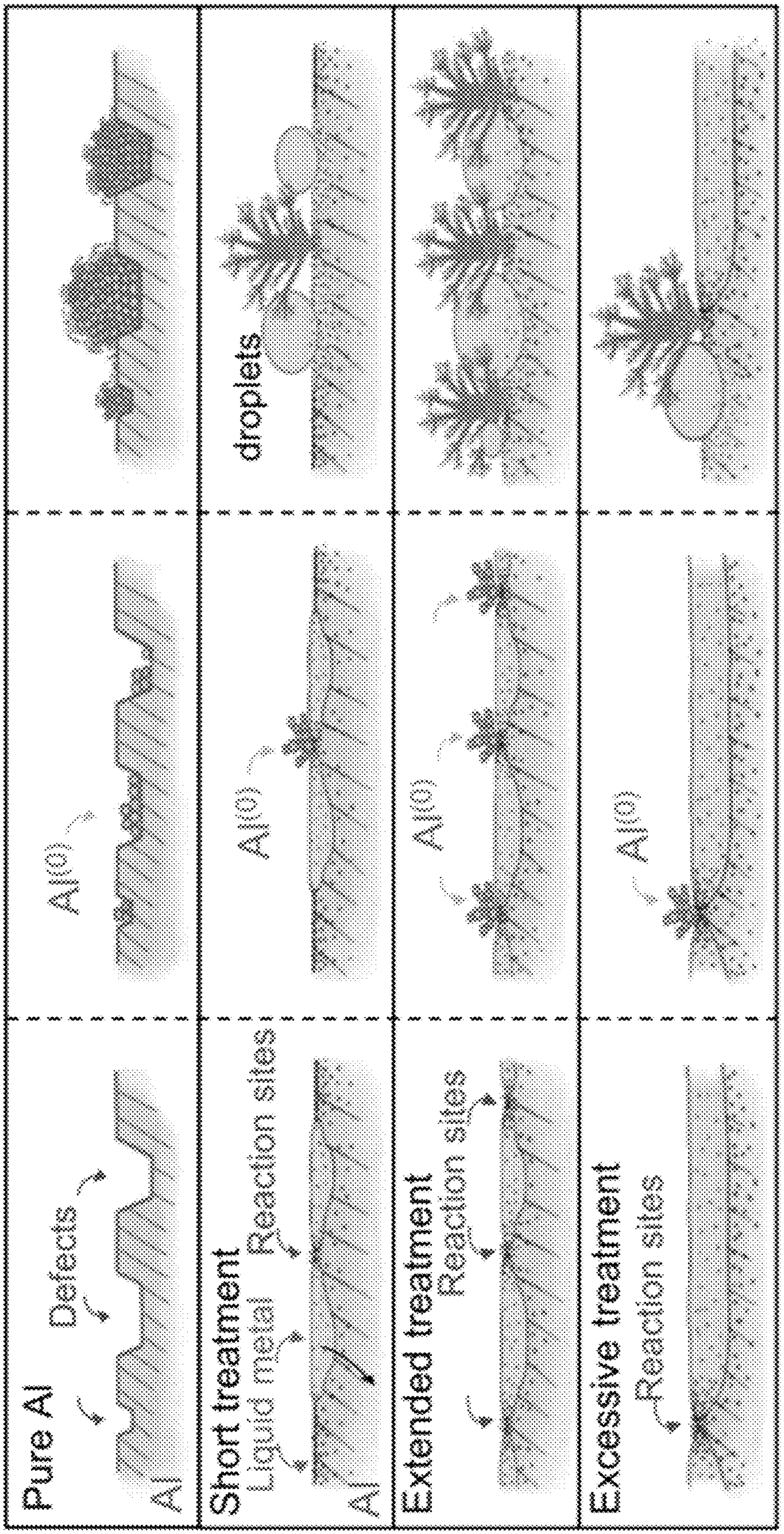
FIGS. 2A-2F: Active anode (Al-LM) promotes easy Al plating.

Increasing Surface Energy with Liquid Metal. Gallium has been reported as a good solvent for aluminum when heated[19]. Galinstan (dubbed as liquid metal or LM), on the other hand, is a eutectic alloy (m.p. −19° C.) of gallium (68.5%), indium (21.5%), and tin (10.0%) (all by weight)[20]. Not only does this alloy inherit the dissolving power from gallium, it lowers the working temperature without the need of heating[21]. At room temperatures, we can dip a piece of Al into a pool of liquid metal. Non-uniform infiltration of liquid metal crossing Al grains will naturally occur after extended period of time (min to hour). Liquid metal will fill the grain boundaries as well as those defect sites (FIG. 2A). Solid Al surface (green stripes) can then transform into a domain that is Al-rich (trace of Ga as pink dots) but still solid-like and another domain that is Ga-rich but liquid-like (pink patch). As the boundaries between both domains are Al-rich (green dots) but highly amorphous, they would act as high-surface-energy sites for subsequent Al plating.

As a result, in embodiments, the use of a liquid metal layer, such as gallium, on the aluminum anode, provides unexpected benefits. Conventionally, the perspective of one of skill is that dendrites and their growth should be entirely avoided in batteries. However, in embodiments, a liquid metal is used herein to intentionally form or expose nucleation sites (e.g., amorphous domains and/or defect sites) for resultingly intentional or desired growth of dendrites. However, in embodiments herein, the resulting (intentionally or desirably) formed dendrites provide unexpected benefits, as described below and throughout herein, such as increased reaction area without causing shorting.

Figure 2B:
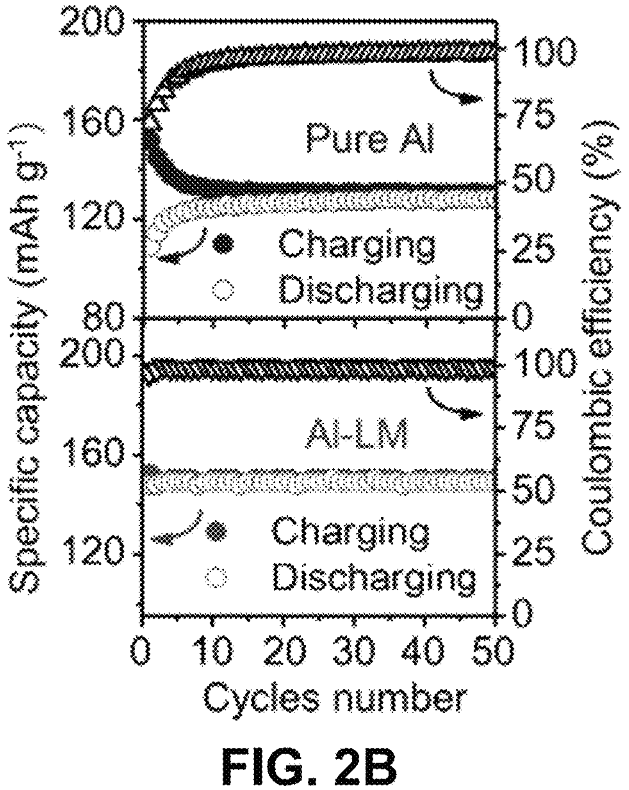
Figure 2C:
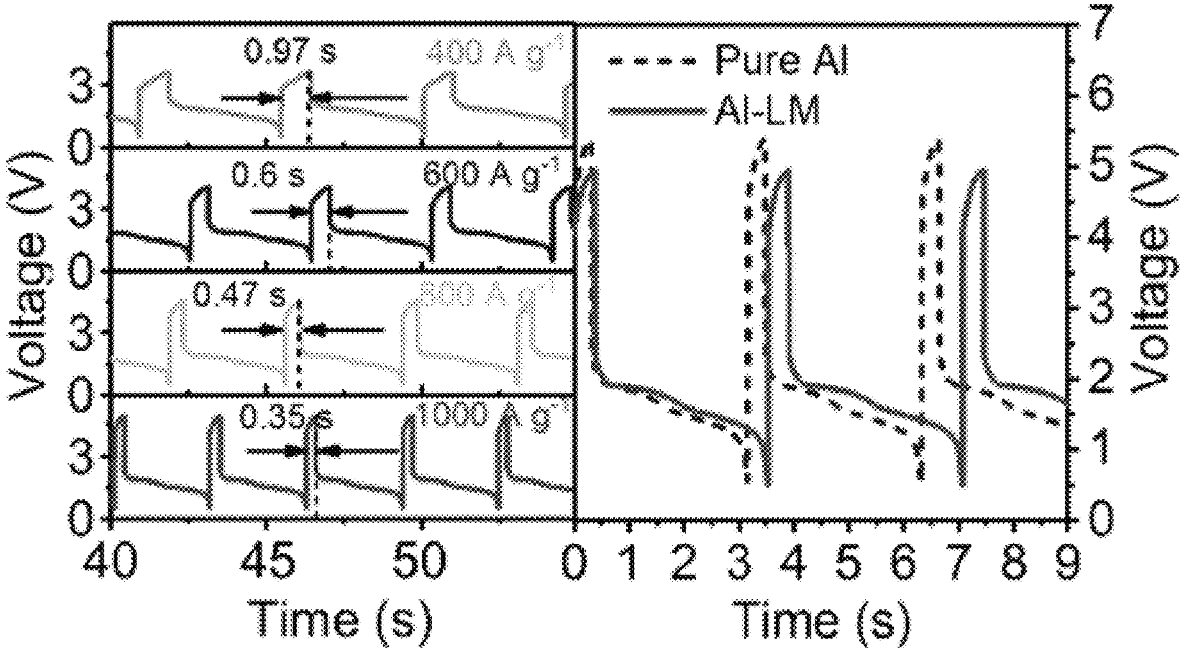
Figure 2D:
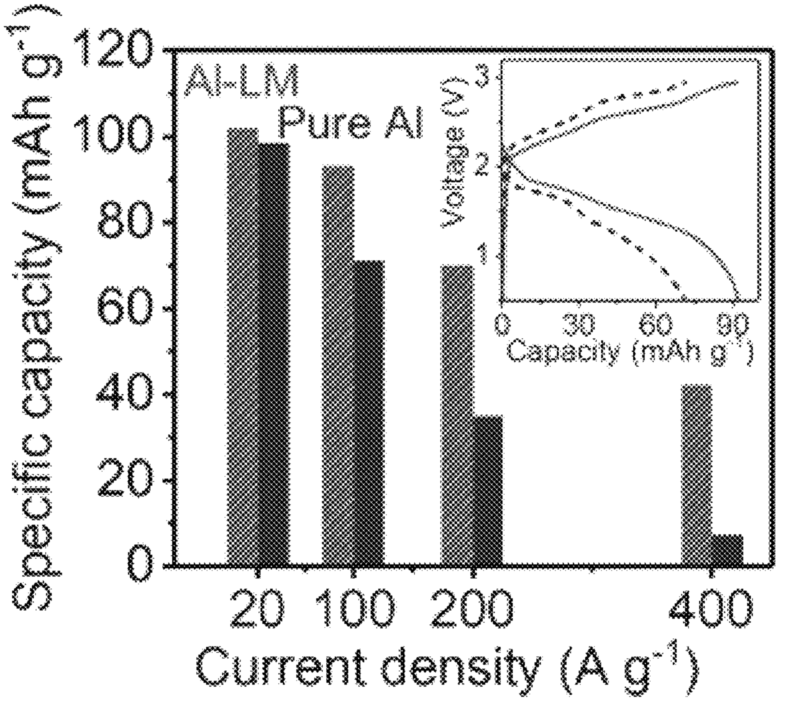
Figure 2E:
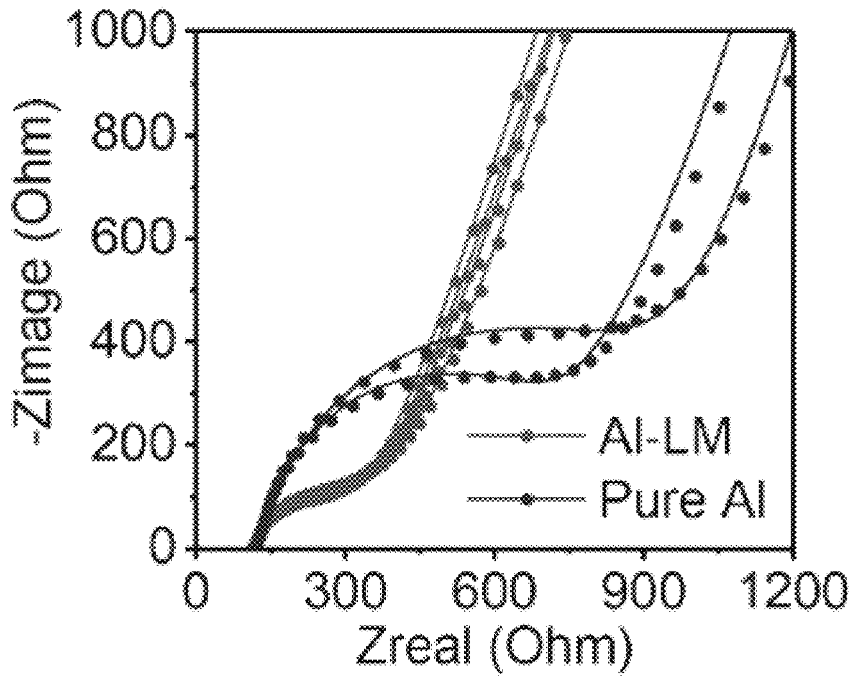
Figure 9A:
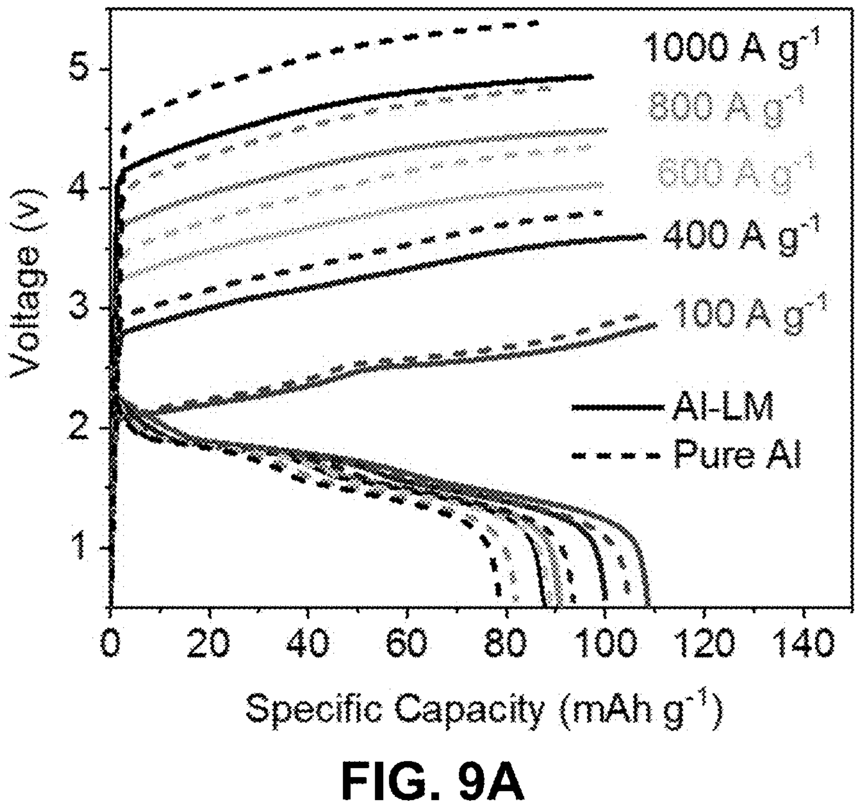
FIGS. 9A-9B: Comparison of pure Al anode and active anode under ultrafast charging.
Figure 9B:
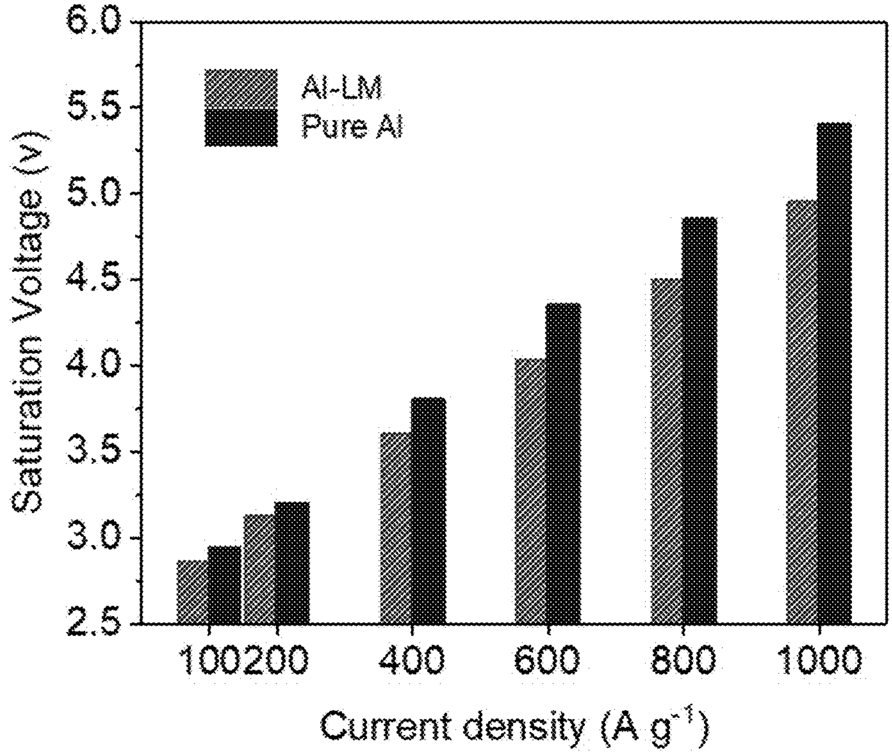
Figure 10A:
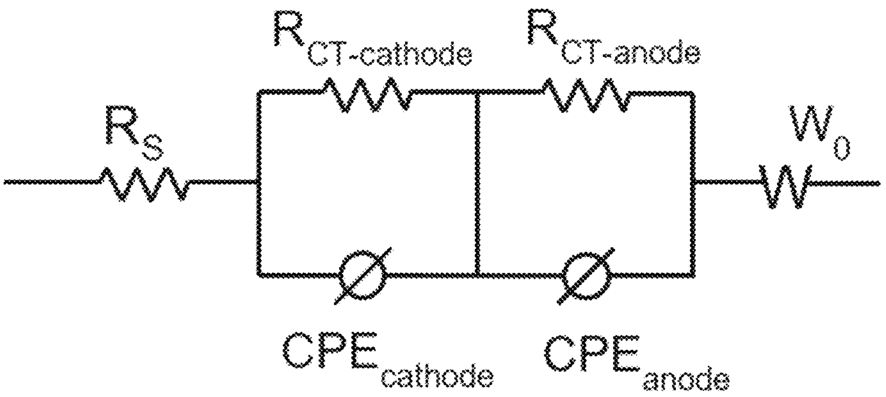
FIGS. 10A-10D: Circuit model and data fitting for EIS.
Figure 10B:
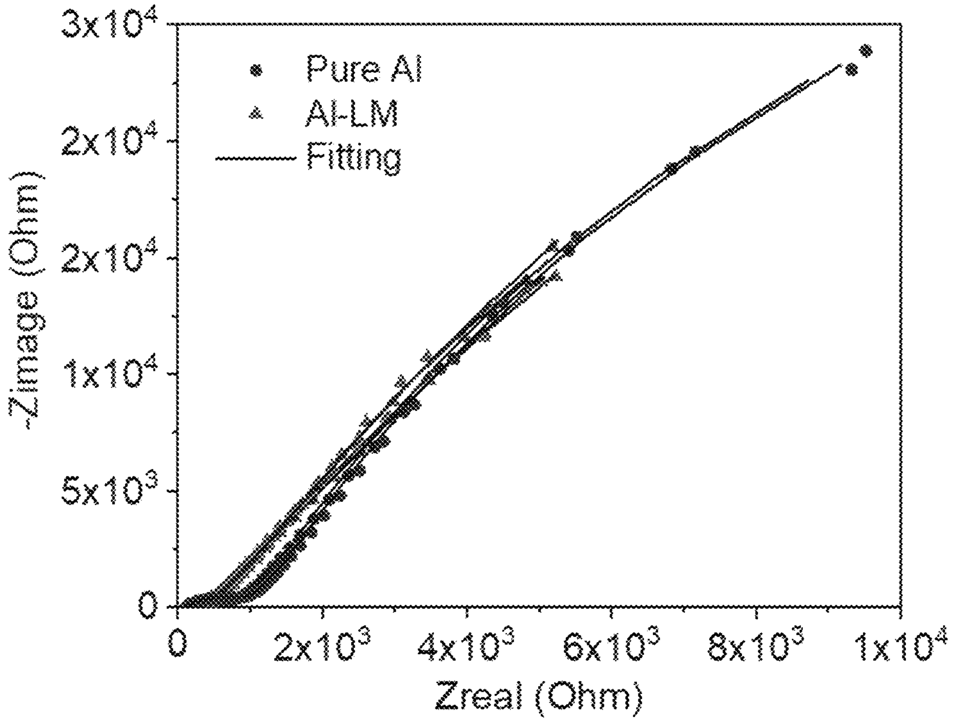
Figure 10C:
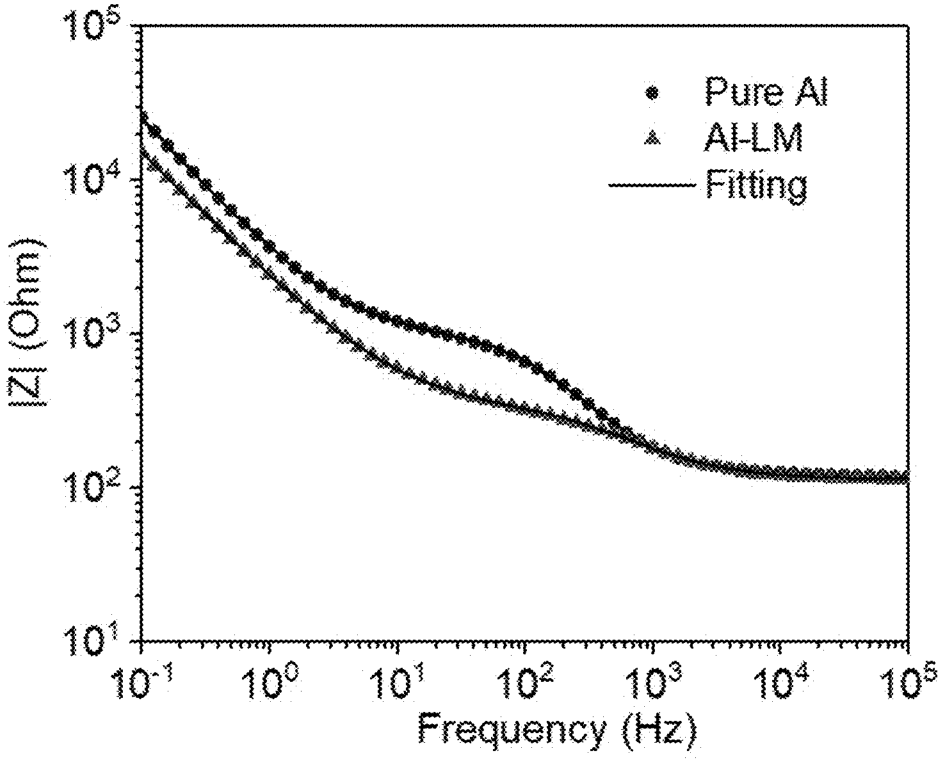
Figure 10D:
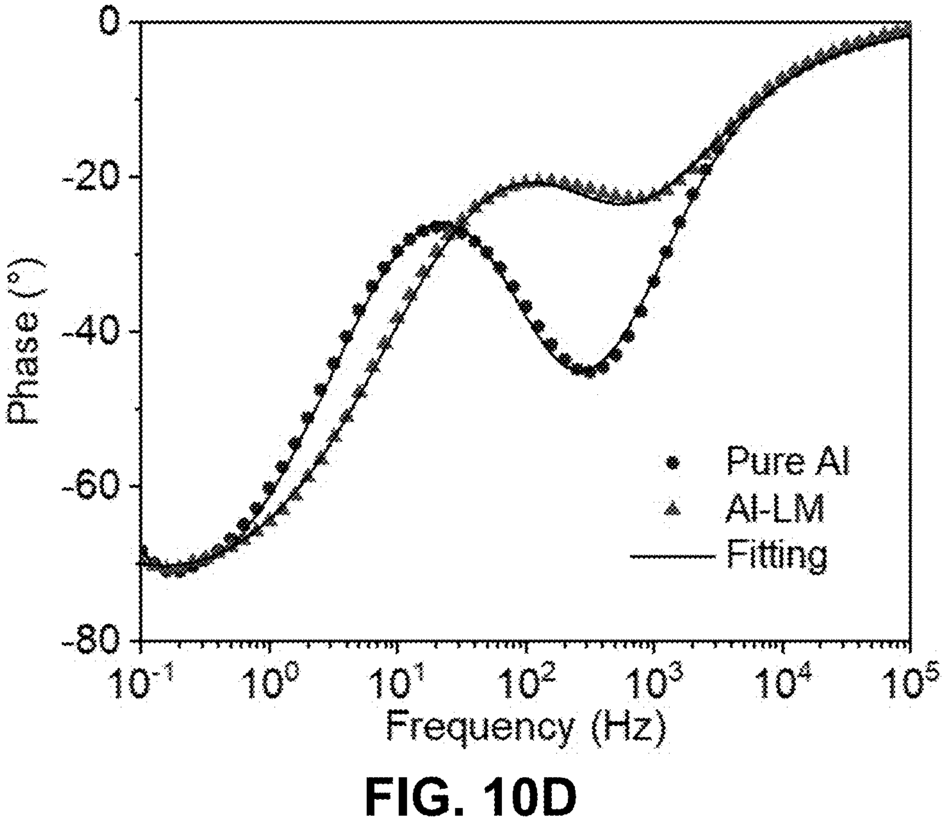

This active anode (Al-LM) is expected to show several advantages. To name a few, the initiation of Al growth will no longer be limited at the defects anymore. Instead, it will grow over the amorphous boundaries everywhere. Next, each nucleation spot can trigger an explosive growth by forming Al dendrites (FIG. 2A). Large surface areas from the dendrites then shall produce even higher surface energies for continued Al deposition. As no solid interphase layer will generate from the electrolyte, these dendrites will maintain an intimate contact with Al-LM. Thus, long-term operation of these devices will not be affected as it does in lithium or lithium-ion batteries[2,3]. In addition to these advantages, Al-LM batteries were found with one more benefit as indicated by the results shown in FIG. 2B-bottom, where high Coulombic efficiencies (~98%) were received immediately after the batteries were installed. In contrast, devices with a pure Al anode gave low efficiencies (~70%) at the beginning (FIG. 2B-top), likely due to an incomplete stripping of the flower bud-like structures. Certainly, if those surface pits were filled with residual buds, continuous charging and discharging would then start to gain high Coulombic efficiencies (~98%). The most exciting benefit with the new anode is that the charging rate can indeed be increased even further (FIG. 2C-left), e.g., 104 C (1,000 A $g^{-1}$; charge to full capacity of 88 mAh $g^{-1}$ in 0.35 sec). FIG. 2C-right shows full cycles of battery operations placed side by side. For the new active anode, not only did the batteries show higher specific capacities (longer time in discharging), their charging plateaus were also much lower (corresponding to smaller voltage; FIGS. 9A-9B). If we now compare specific capacity in both cases with the same charging voltage (FIG. 2D), we see strong gains in performance, i.e., 5 times more specific capacity (42.2 vs. 7.1 mAh $g^{-1}$). This performance leap confirmed a lowered energy barrier for $Al^{(0)}$ depositing. In other words, a reduction in the interface resistance is highly likely, as evidenced by the electrochemical impedance spectroscopy (EIS). In FIG. 2E, the active anode (red) had 3 times less resistance than the pure Al (blue) (see FIGS. 10A-10D for the circuit model and data fitting).

Figure 2F:
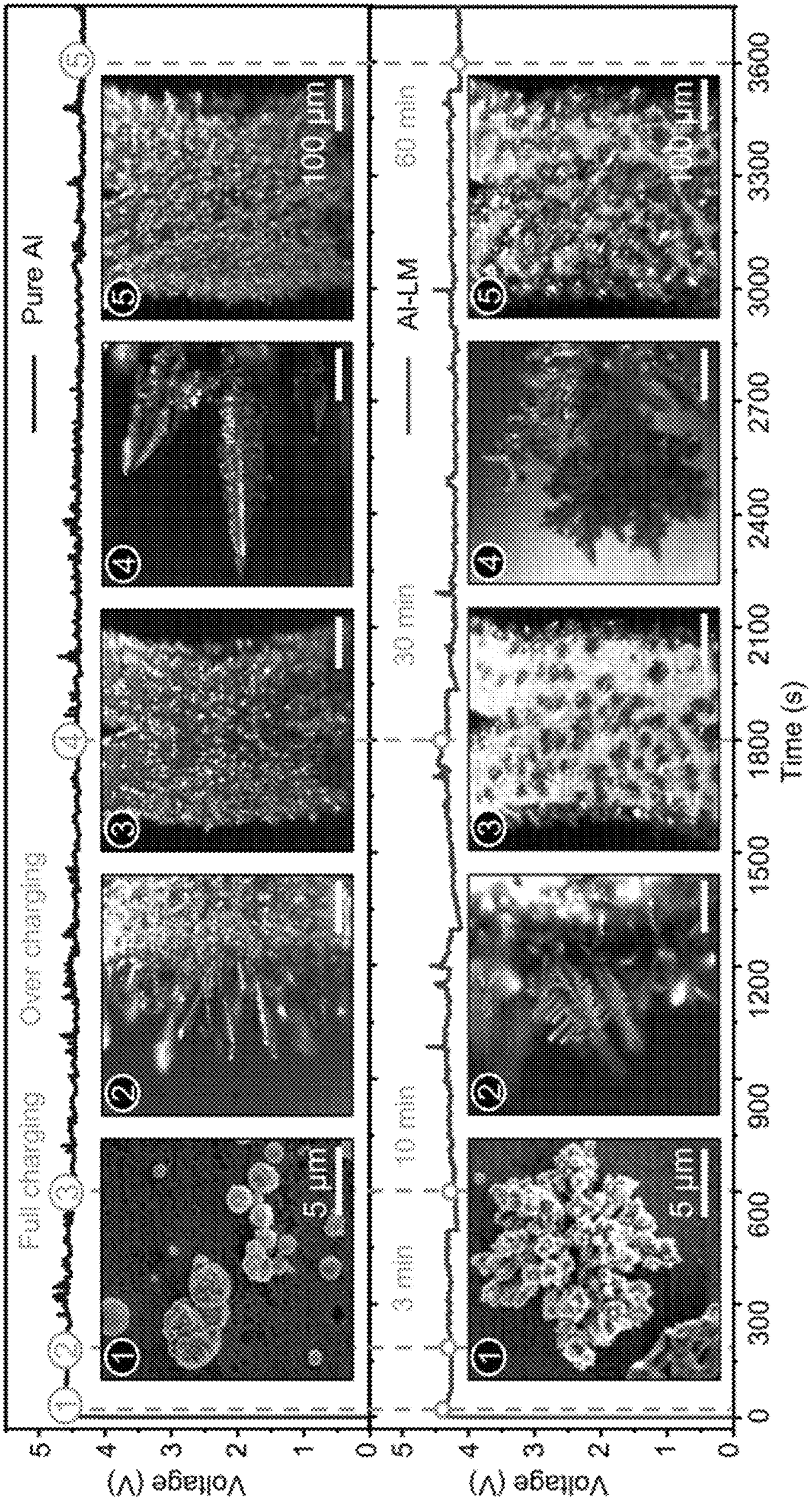
Figure 11A:
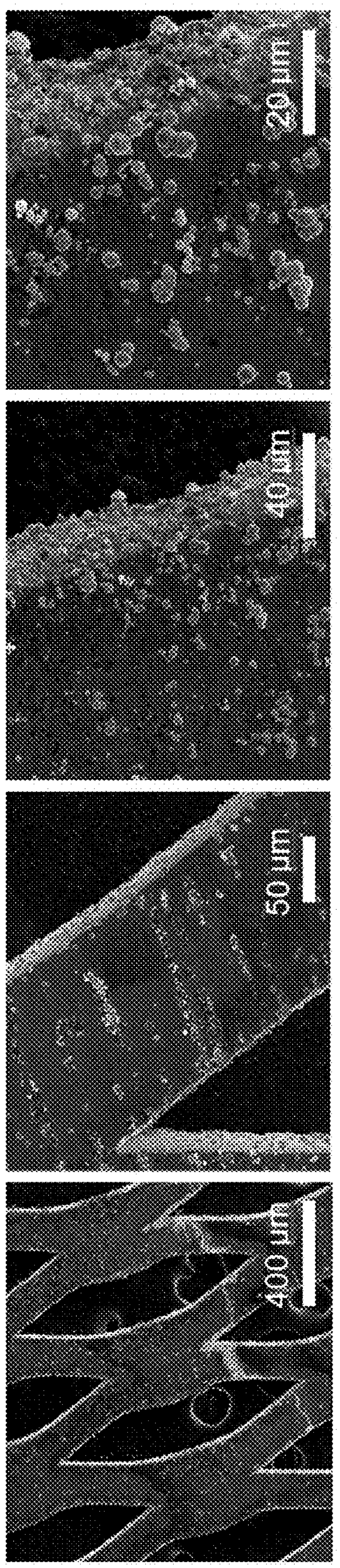
FIGS. 11A-11B: SEM characterizations of pure Al/Al-LM mesh after full-charging. Pure Al mesh (FIG. 11A) and Al-LM mesh after 5-min treatment (FIG. 11B) under current density of 400 A $g^{-1}$.
Figure 11B:
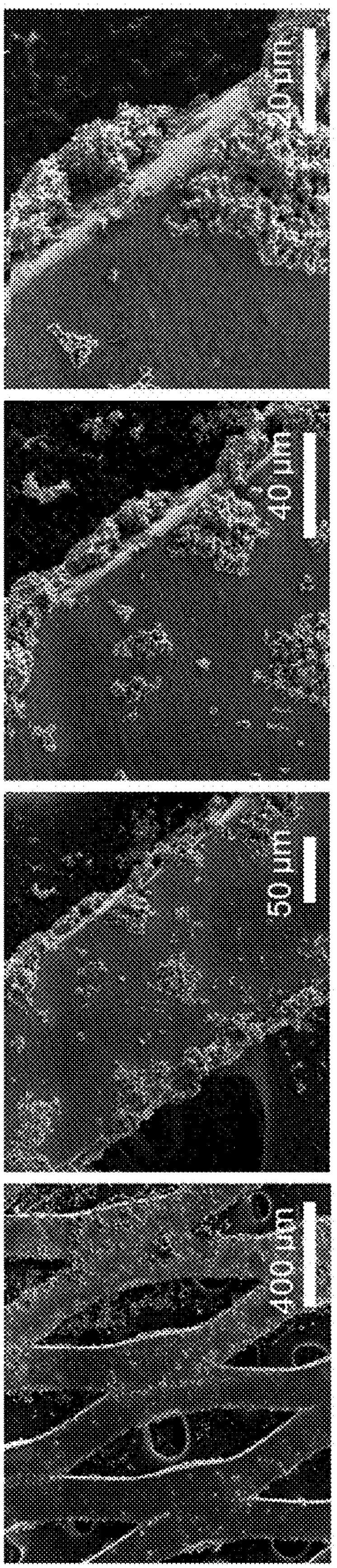

We designed two planar devices to record the accelerated growth rate of $Al^{(0)}$. The anode in one device was a piece of Al mesh but the other one having the mesh briefly treated with liquid metal. We placed both devices under an optical microscope and then let them be overcharged under 400 A $g^{-1}$ for extended period of time. As shown in FIG. 2F, early stage of charging already made newly grown Al different, rather small flower buds (top panel) for the first design (pure Al) but extended fractal structures (bottom panel) for the second design (Al-LM) (t=1.8 s, FIGS. 11A-11B). Afterwards, side views suggest small deposits growing into tall deposits, either adopting a dense, brush-like morphology (Al) or as isolated ferns (Al-LM) (t=3 min). Later on (t=10 min), top view revealed another distinction: Al adatoms prefer to nucleate in a flat area but not on existing brushes (pure Al); in contrast, fractal structures on Al-LM kept getting wider and bigger. Once the overcharging was allowed to continue further, those brushes on pure Al eventually became taller or wider (t=30 and 60 min). These consecutive snapshots showed two benefits obtained from the Al-LM anode, one is easier surface nucleation and another is continued reactivity on already-grown deposits. However, as above LM treatment is rather brief (~3 min), we expect more growth sites when treatment time is extended. But how much longer do we need?

Figure 3A:
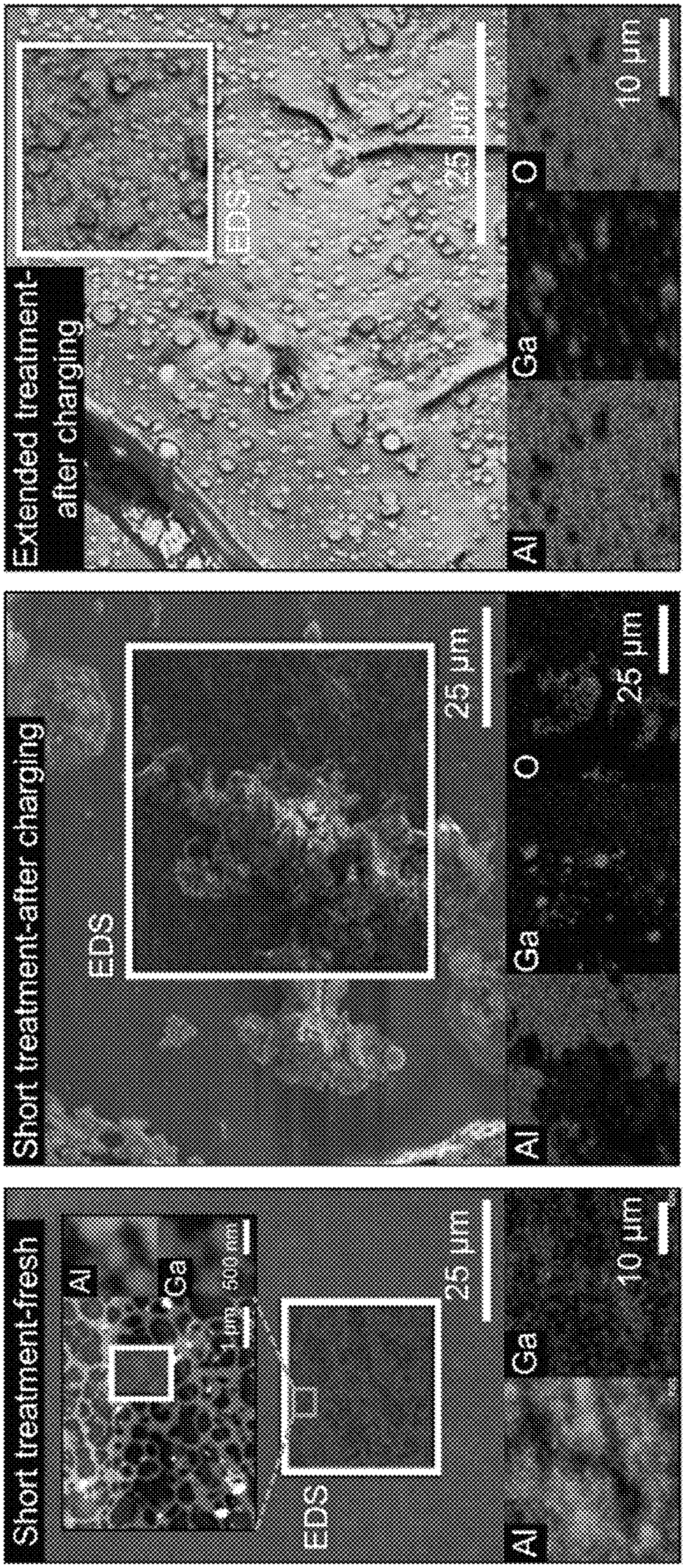
FIGS. 3A-3F: Probing the role of the active anode.
Figure 3B:
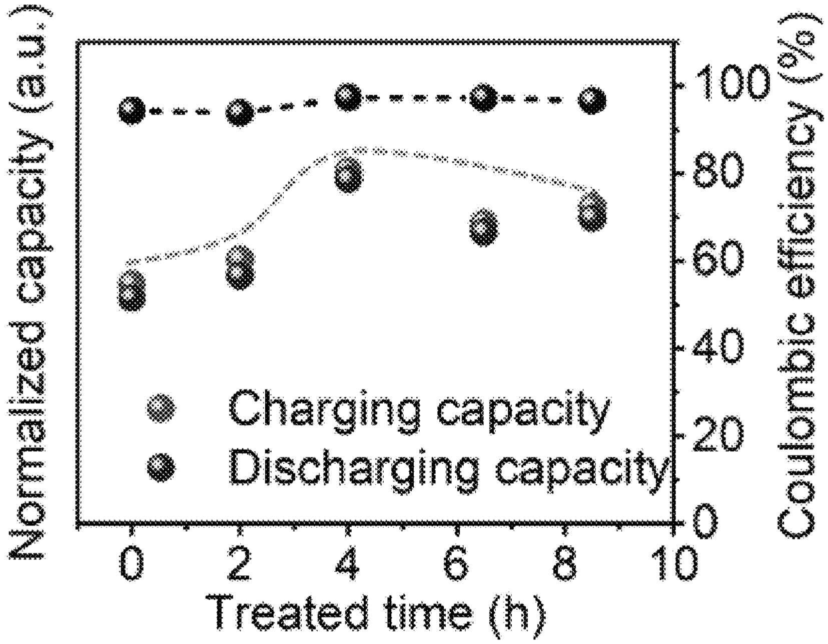
Figure 3C:
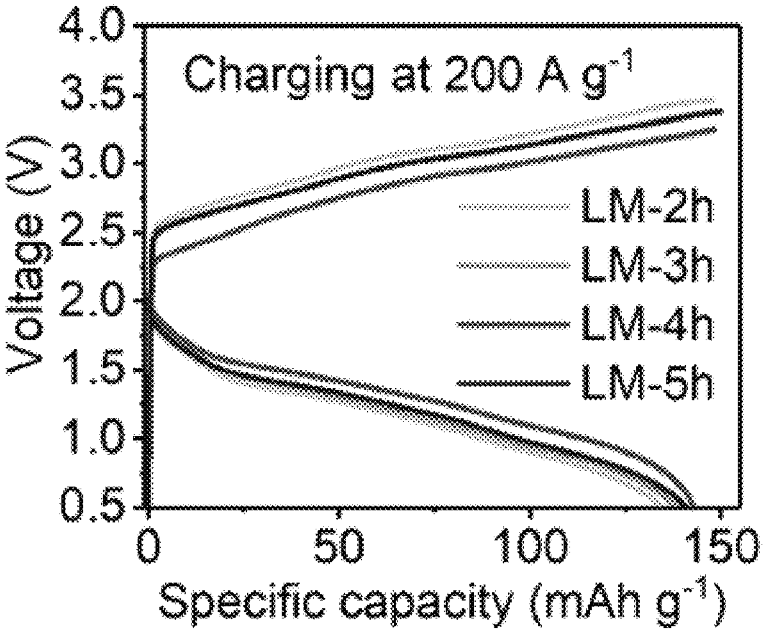
Figure 3D:
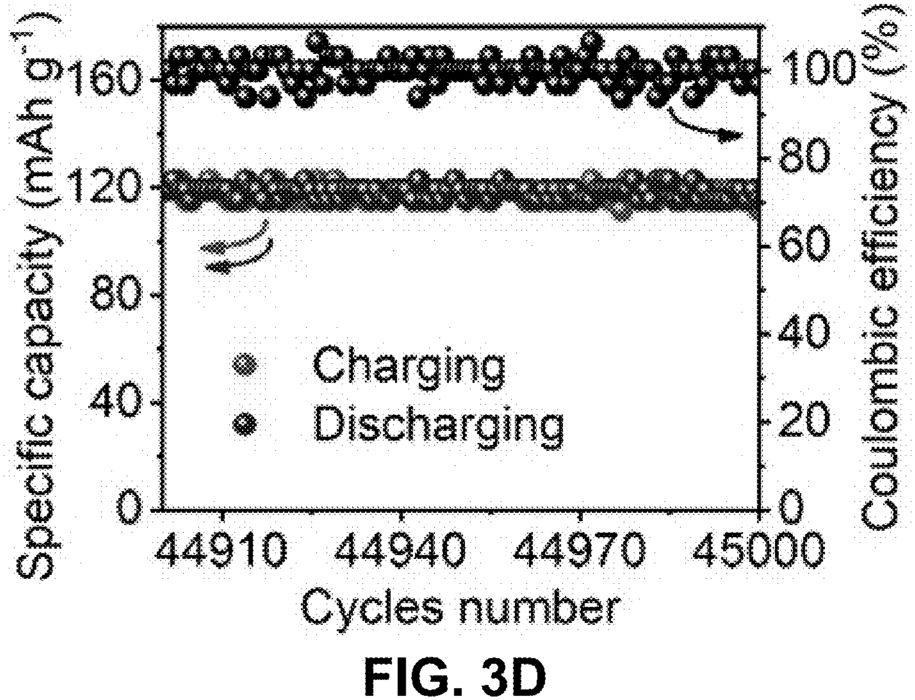
Figure 12A:
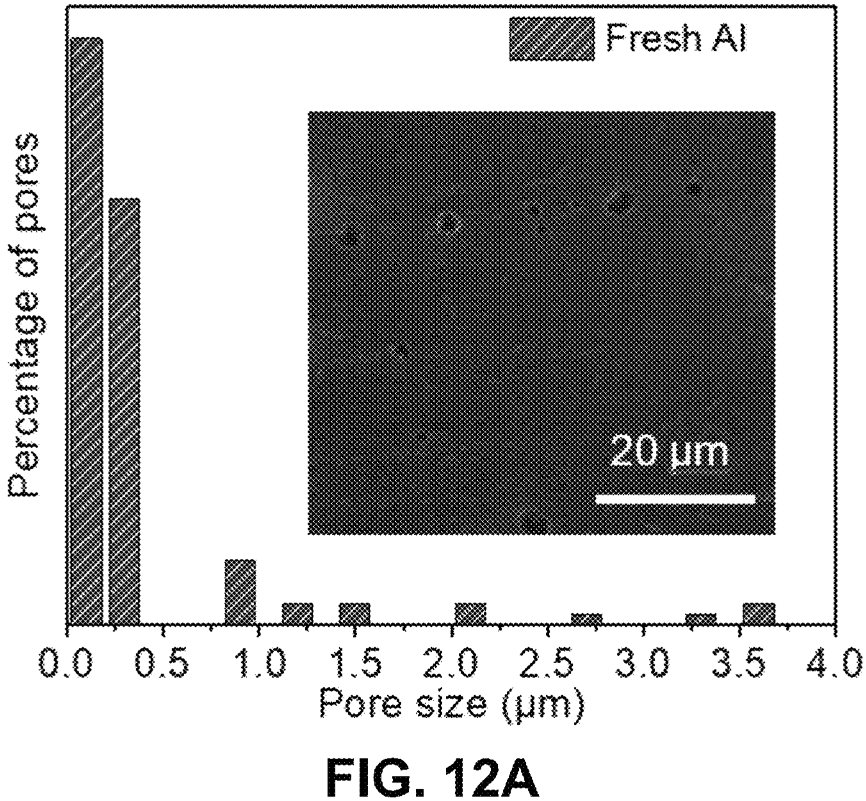
FIGS. 12A-12B: Liquid metal removed most of the surface defects on Al. Quantitative analysis of pores in fresh Al in an area of 60×60 $\mu m^2$ (size of the pore in diameter) (FIG. 12A), where treated surface barely has anything. SEM images of the fresh Al (FIG. 12A, inset) and treated Al (FIG. 12B).
Figure 12B:
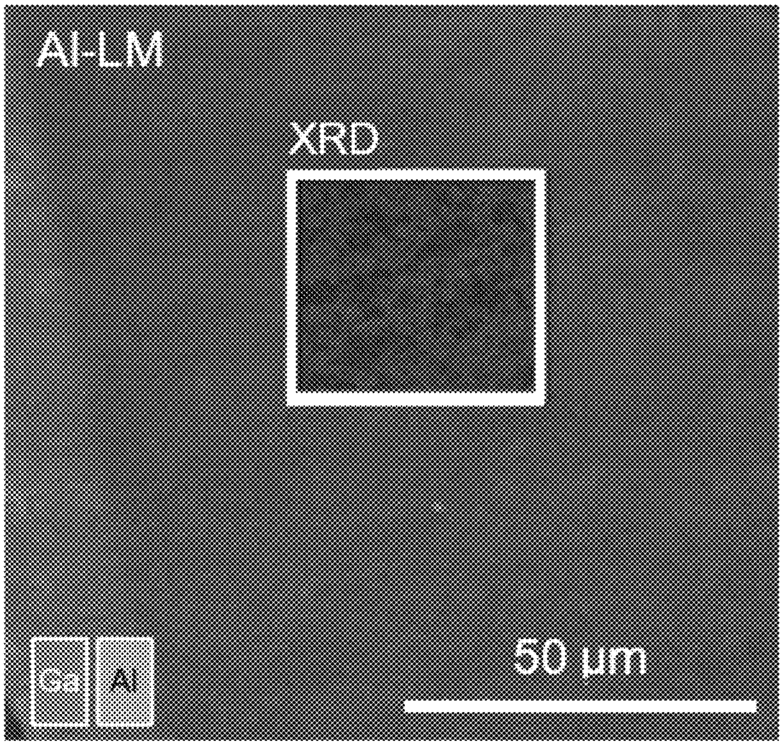

Optimal Amount of Liquid Metal. To answer this question, we have analyzed the surface domains that form as a result of non-uniform infiltration of liquid metal crossing Al grains (FIG. 2A). If we classify the treatment time from short to excessive, we then expect the amount of these reactive sites to increase at first and then decrease. For instance, when the treatment time is short (FIG. 2A—2$^{nd}$ row), a small amount of liquid metal is introduced. Thus, a small portion of the anode surface is modified, with surface pits disappearing first and other areas lightly permeated with gallium. This eventually should produce isolated liquid domains that are surrounded by large patches of solid domains. When the treatment time is extended, more liquid domains and more reactive sites between domains should form (FIG. 2A—3$^{rd}$ row). Clearly, when the treatment time becomes excessive, the liquid domains will connect to form a large and thick patch (FIG. 2A—4$^{th}$ row), with solid domains quickly disappearing and reactive sites sparsely distributed. Either way, dendrites grown on Al-LM must be separated by empty spaces (inactive domains). Therefore, the dendrites are wide but not sharp. This is also the biggest difference we saw between the two cases in FIG. 2F. One interesting feature from these inactive patches, however, is the patch-to-sphere transformation. When reactive sites accept newly deposited Al by forming dendrites, these dendrites will push liquid domains next to them, switching the thin film-like, liquid domain into a sphere or a particle (FIG. 2A). The results in FIG. 3A supported this expectation with additional details. Namely, when the anode was freshly treated by liquid metal in a short time (5 minutes), we first saw a smooth surface without any pits or cavities (FIGS. 12A-12B). Element mapping revealed that this surface consists of small Ga-rich domains, morphologically similar to surface cavities previously shown in FIG. 1H. Further mapping in the Al-rich domain, on the other hand, uncovered channels of Ga inside polycrystalline Al grains. When this piece of anode was charged in a battery, dendrites were generated, with Ga-rich (purple) spherical particles lying next to the roots. While we did not detect signals from oxides on a freshly treated anode, dendrites from a charged anode were different: a brief exposure in air made them oxide rich (seconds before sealing the SEM chamber), while surrounding flat domains were not much affected by this exposure. Once the anode treatment was extended to hours, modified surface after charging then exposed a large number of Ga-rich particles, largely supporting earlier expectation on patch-to-sphere transformation. FIG. 3B depicts the dependence of specific capacity on treatment time, where new anode indeed had better performance in high rate operations and an optimal value was obtained after a treatment of 4 hours. FIG. 3C displays multiple performances laid on top of each other, showing the active anode of 4-hr by Galinstan having the lowest charging plateau and the longest discharging time ($i_c$=200 A $g^{-1}$). Intriguingly, aforementioned droplets or particles shown in FIG. 2*a* had no interference in the repetitive charging/discharging. Rather stable operations were recorded when the device was cycled for 45,000 times (FIG. 3D).

Figure 3E:
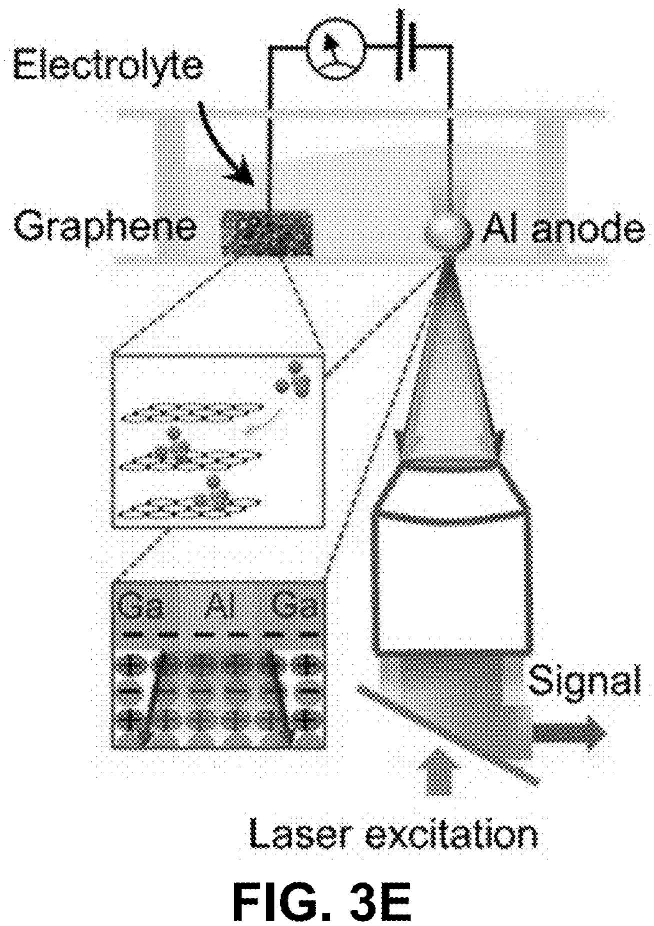

Reaction Intermediates Next to Active Anode. We used Raman spectroscopy to track the events at the anode surface. High intensity Raman signals are expected due to the surface plasmon effect in Al electrode[22]. Rich production of transient intermediates during charging-discharging also contributes to relatively intense and interpretable Raman signals. In FIG. 3E, a battery with a planar configuration was sealed and placed over a glass coverslip, where the reaction on anode was monitored with a laser excitation (λ=532 nm) through the coverslip. By comparing the intensities of Raman signals measured in the bulk electrolyte and measured when aluminum anode was excited, we estimate the Enhancement Factor to be EF=11.5. The intensity of Raman signals strongly depends on the intensity of local electric field because of the surface plasmons in aluminum electrode. Due to evanescent character, the intensity of electric field falls off exponentially with distance away from the anode, penetrating a very short distance (~nm) into the surrounding medium[23]. This allowed us to selectively probe events happening primarily next to the active anode.

Figure 3F:
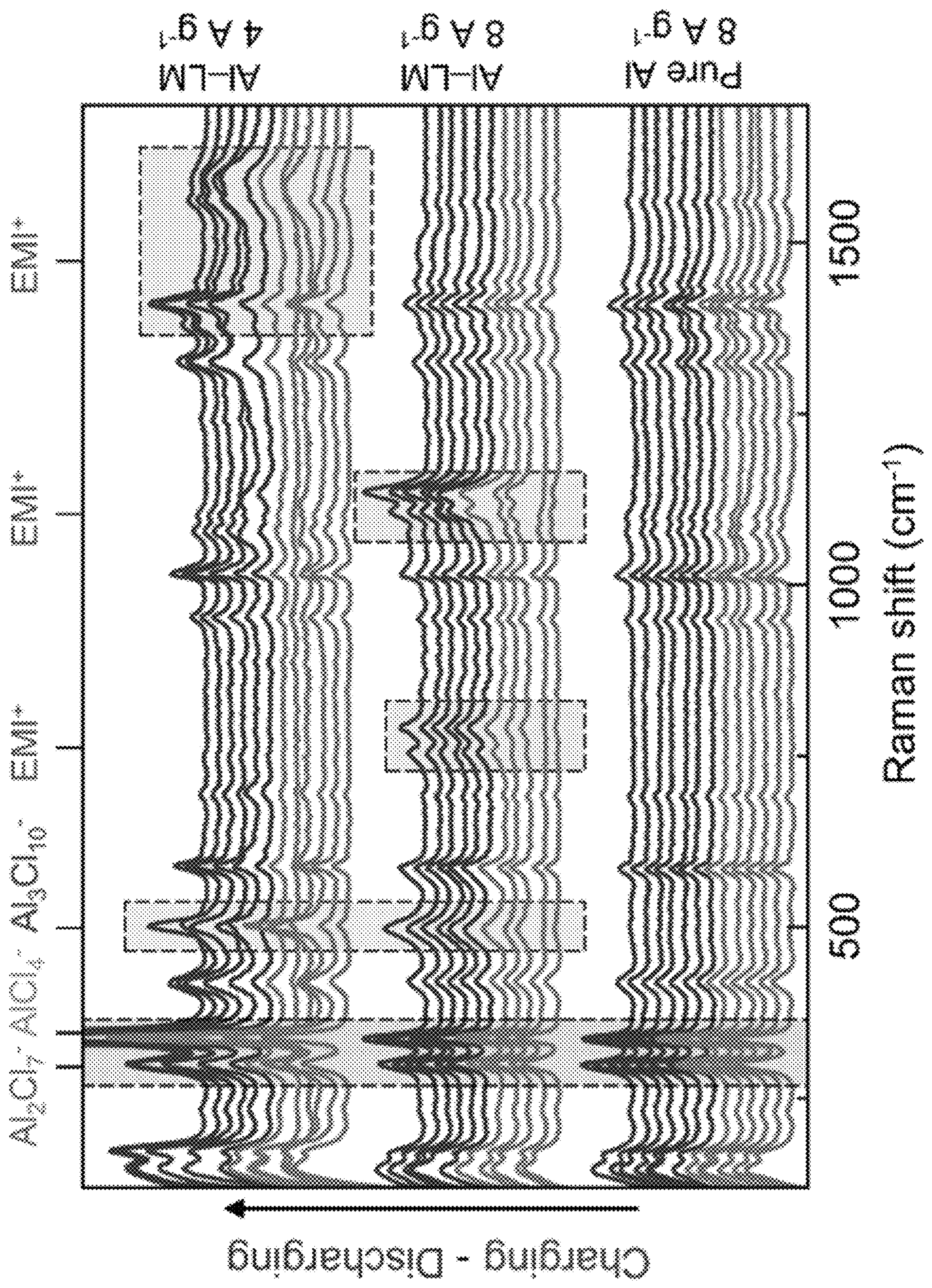
Figure 13:
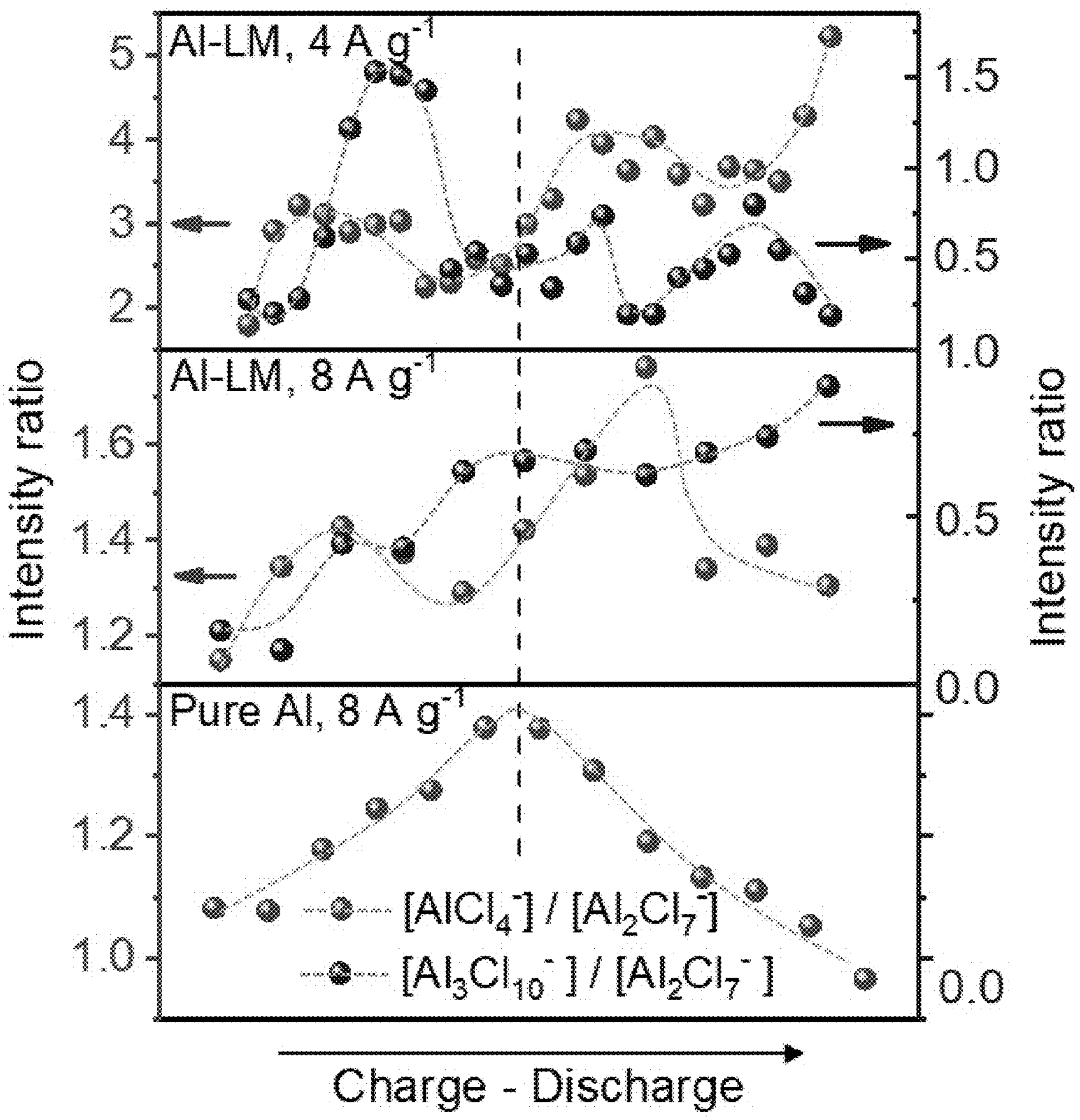
FIG. 13: The triple Al-complex disrupts the reversible transition between mono- and duo-complex. Evolution of the ratio between several signature anions that are identified by the Raman spectroscopy.
Figure 14A:
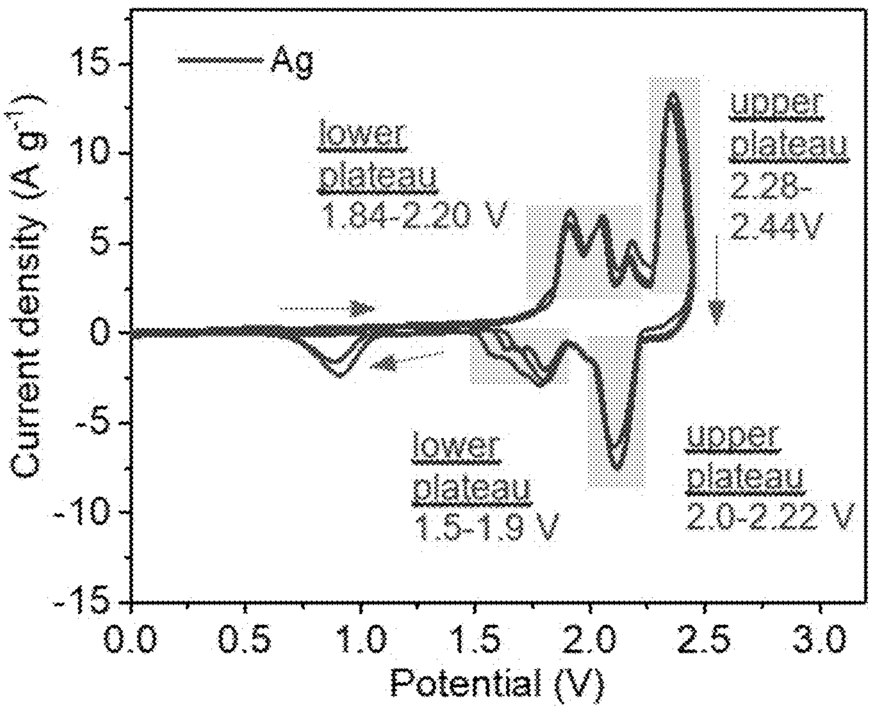
FIGS. 14A-14F: Cyclic voltammograms (CV) of (FIG. 14A) Ag, (FIG. 14B) Ga, (FIG. 14C) In, (FIG. 14D) Sn, (FIG. 14E) Al and (FIG. 14F) Al-LM. The scanning rate is 10 mV $s^{-1}$. The 3D graphene is the working electrode and Ag/Ga/In/Sn/Al/Al-LM(Ga/In/Sn) as the counter/reference electrode. Major peak around 2.3-2.5 V represents graphene oxidation (accompanied with Al electrodeposition on counter/reference electrode).
Figure 14B:
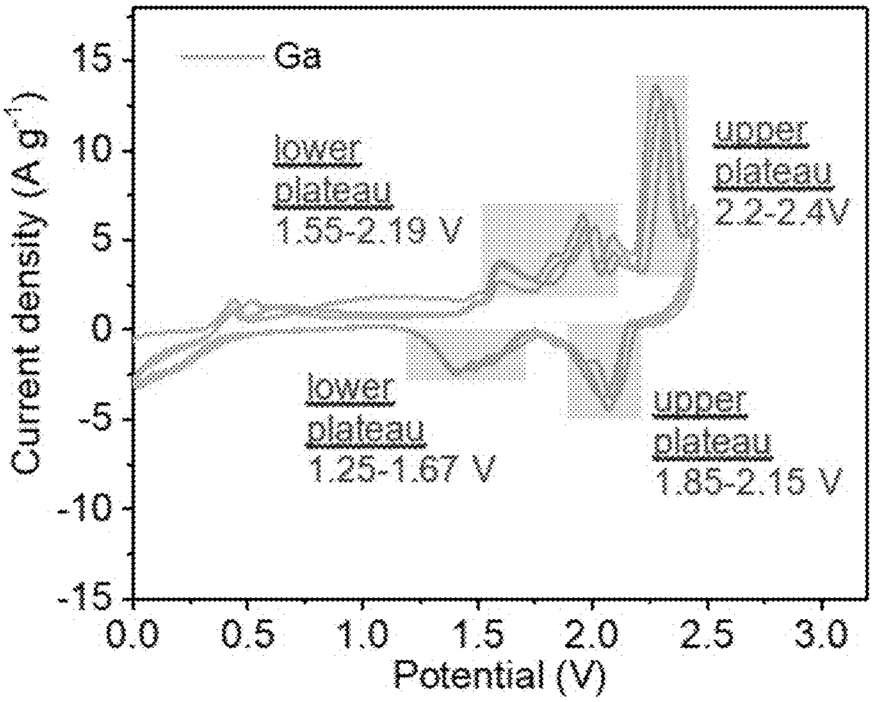
Figure 14C:
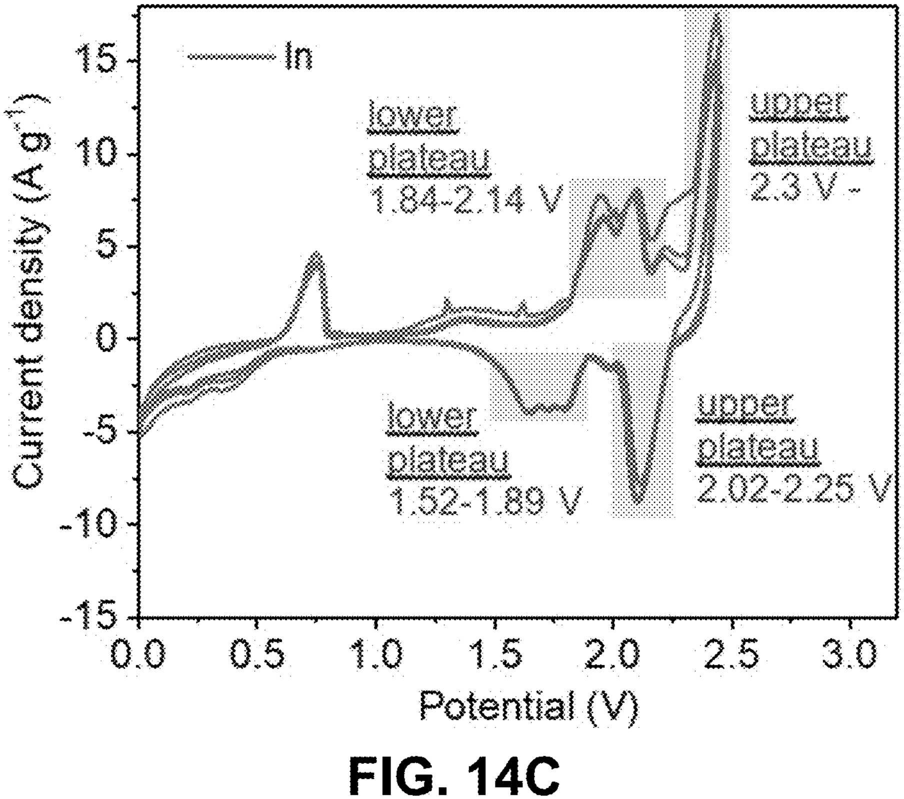
Figure 14D:
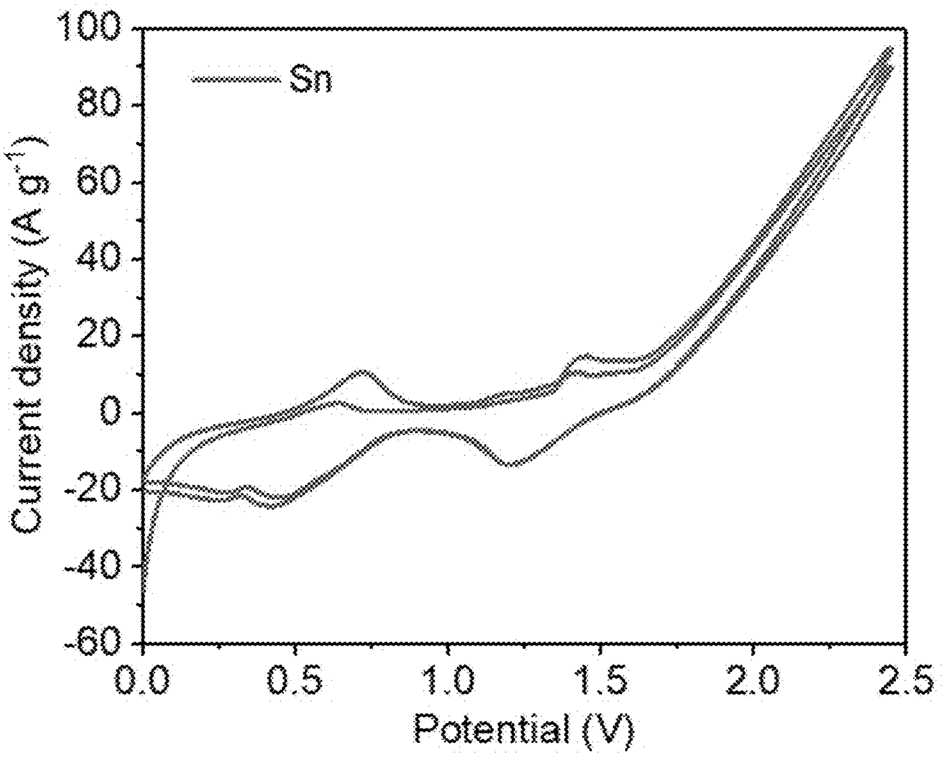
Figure 14E:
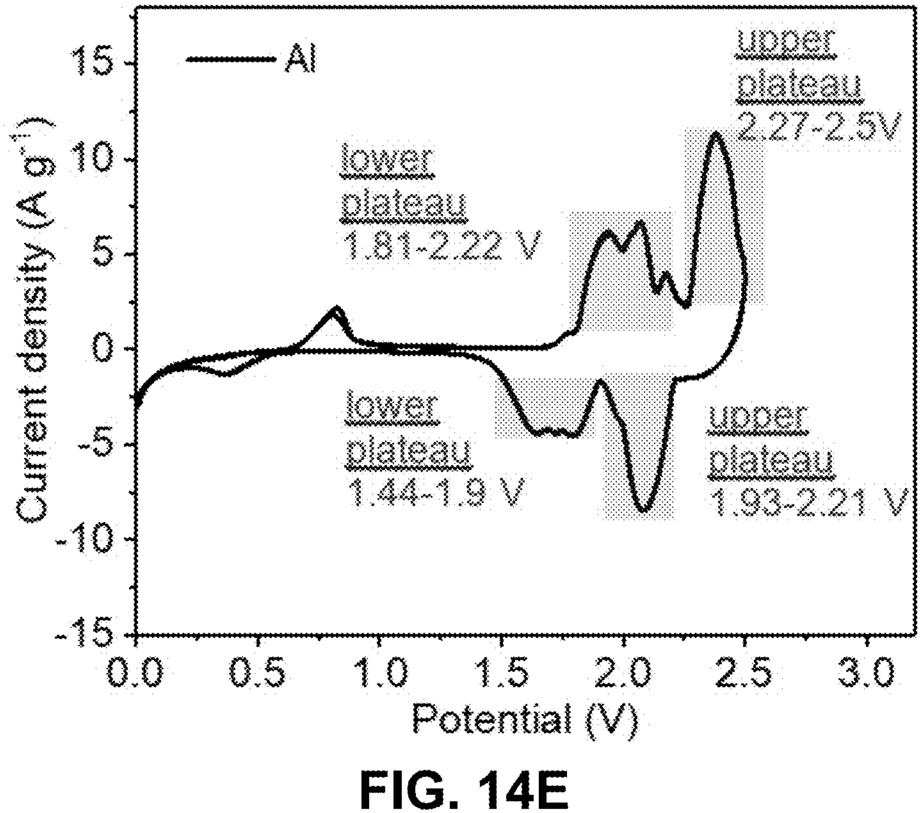
Figure 14F:
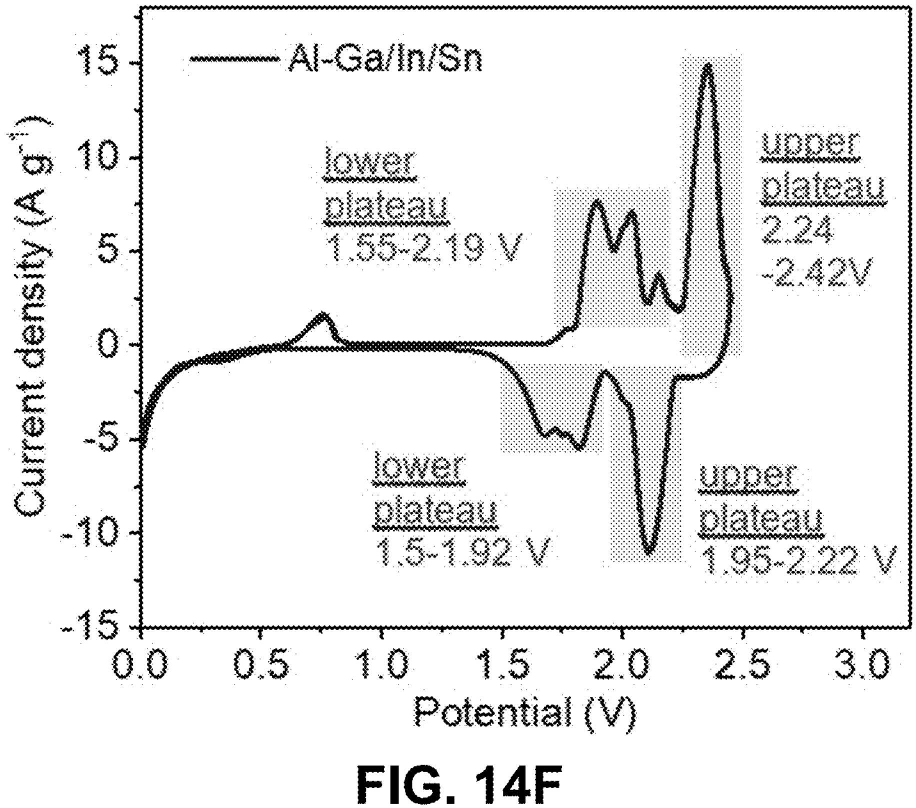
Figure 15:
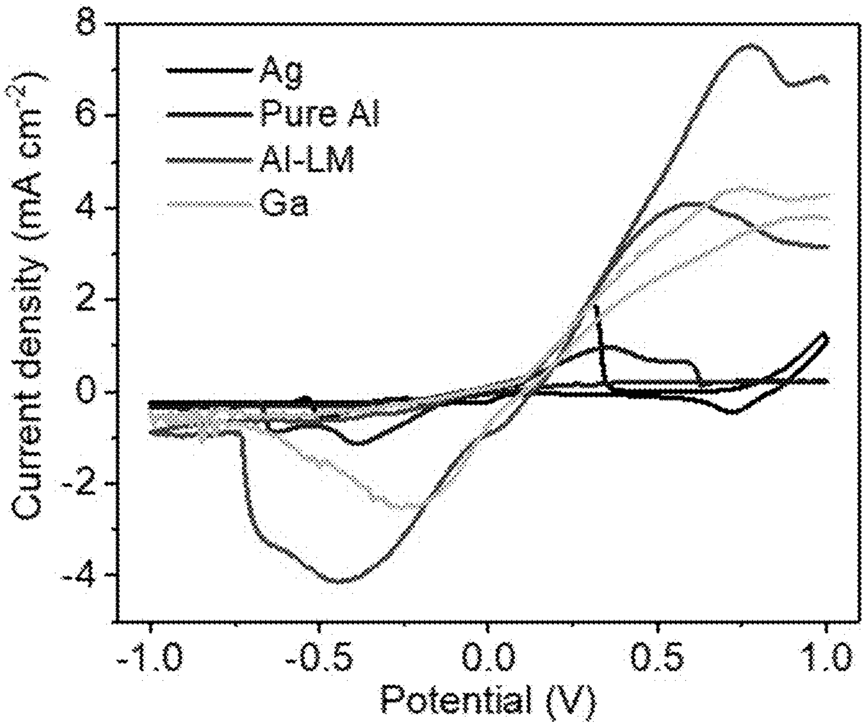
FIG. 15: Cyclic voltammograms (CV) of Ag, Ga, Al and Al-LM without using the 3D graphene cathode. The scanning rate is 10 mV $s^{-1}$. Four different metals were respectively used as the working electrode, in which pure Al was used as the counter/reference electrode. It is clear from these measurements that Al-LM exhibits the highest sensitivity to a given potential (especially comparing to a pure Al electrode), where the reduction process started at the lowest potential among all working electrodes.

FIG. 3F shows the Raman spectra throughout the charging-discharging cycle. Three panels illustrate three scenarios. Spectra shown in the bottom panel suggest that when the anode is made out of pure Al all the peaks corresponding to aluminum complexes and EMI species remain stable except for those at 299 and 338 $cm^{-1}$ which respectively belong to $Al_2Cl_7^-$ and $AlCl_4^-$. The intensities of both peaks change throughout the cycle, with the ratio ($[AlCl_4^-]/[Al_2Cl_7^-]$) depicted in FIG. 13. This trend matches well the existing general notion[1] of the reaction taking place described using the following equation:

$$4Al_2Cl_7^- + 3e \leftrightarrow 7AlCl_4^- + Al \quad (1)$$

Surprisingly, we found that the reaction species adjacent to the Al-LM (FIG. 3F-top, middle) are different from those next to pure Al. With Al-LM not only do we see transient intermediates for $EMI^+$ but also Raman signatures corresponding to a triple-complex of aluminum ($Al_3Cl_{10}^-$). It is worthwhile to note that the rate of the peak disappearance does not exactly follow the rate of discharging. Rather, it takes much longer time for these peaks to fully disappear. As these peaks are captured over the surface of active Al-LM electrode, but not pure Al electrode, we propose that Al-LM electrode differs from Al as much as to allow for the intermediate triple-complex to easily form. Further analysis of the reaction mechanism will help us answer the following questions: How would a new anode accelerate the Al-deposition? And how did this acceleration disrupt the conventional structure of EDLs?

Preferential Nucleation on Active Anode. Among the three elements in Galinstan, gallium is the major component and also the only element that plays a pivotal role in lowering the redox potential in Al electroplating (see FIGS. 14A-14F and FIGS. 16A-16D). While the formation of surface domains back in FIG. 2A seems reasonable to account for this potential lowering, very little is known about why the boundaries inside the active anode are more reactive. With partial coverage of Al surface by Ga we expect a strong effect of Ga presence on both adsorption and diffusion of the Al adatoms. We investigated the preferential nucleation location on such a composite surface, taking into consideration the adsorption energy differences in the first approximation. We calculated the adsorption energy of Al adatoms on Al(111) and compared it to the respective value on Ga monolayer covering Al(111). The results shown in FIG. 4A indicate that the adsorption on pure Al surface is much more favorable (away from the Al/Ga interface or boundary).

Figure 4A:
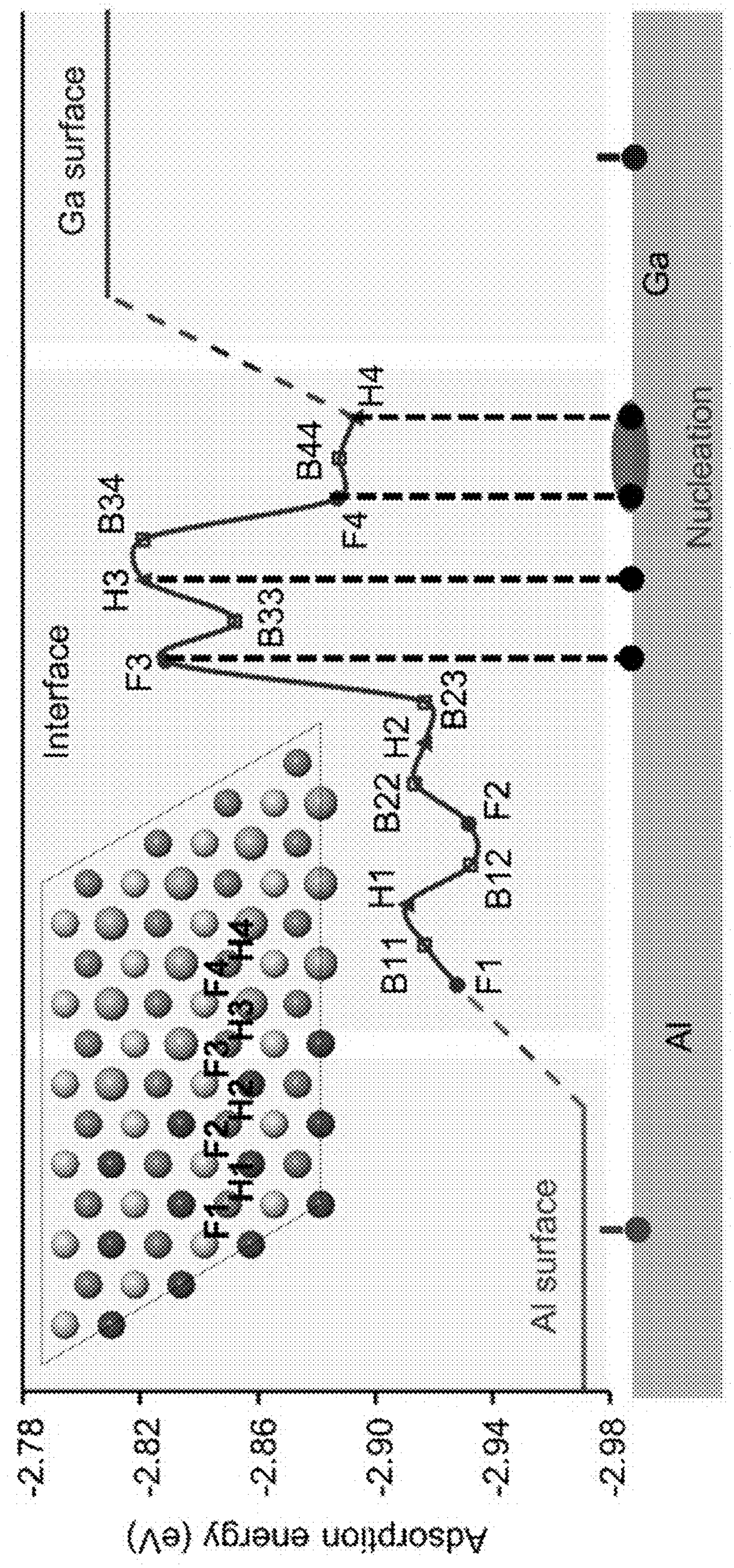
FIGS. 4A-4E: Density-functional theory (DFT) calculations reveal the nucleation sites of Al adatom and dynamic nature of the electric double layers (EDLs).
Figure 4B:
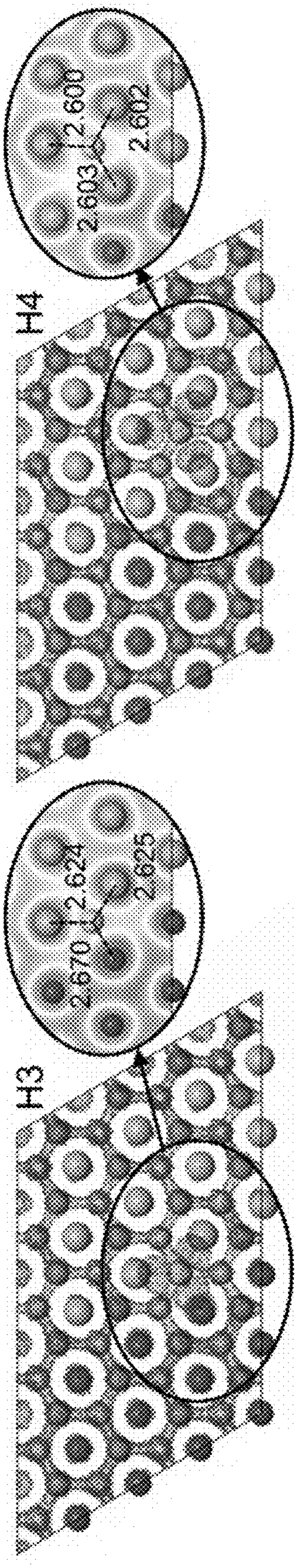
Figure 4C:
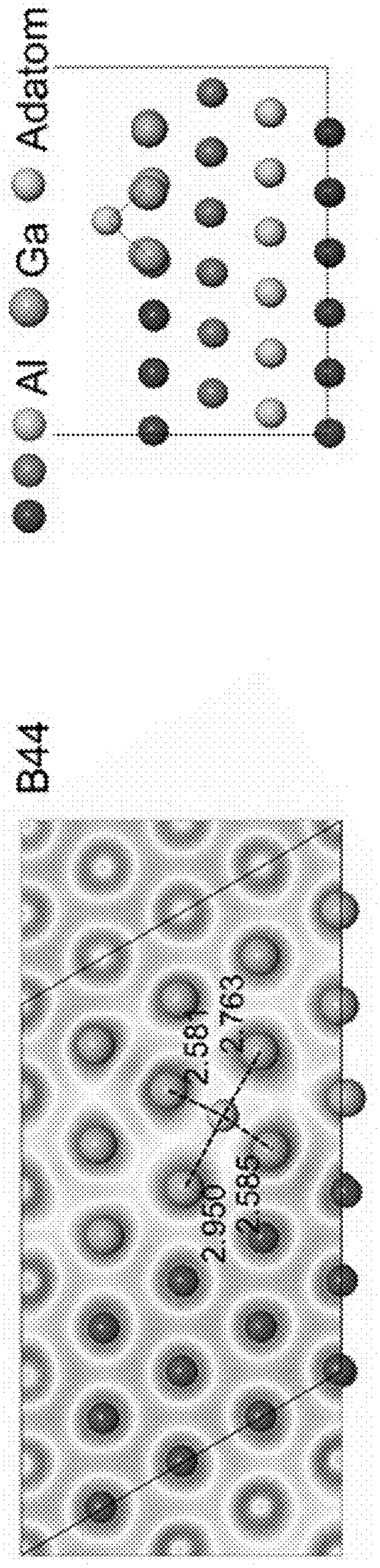

However, we expect the Al/Ga interface will have several nucleation spots. Particularly, Ga is expected to form islands either on the planar Al surface or fill Al surface imperfections such as cracks and scratches. We used DFT calculations to analyze the two configurations: (1) a large Ga patch on Al(111); and (2) a small Ga island covers a small cavity in the Al surface (three high symmetry surfaces (111), (100) and (110)). When a Ga island covers a small cavity (~3-4 interatomic distances) on Al surface, our calculations (details see FIGS. 17A-17B) show that Al adsorption energy near the interface of such a planar surface could be lower than that on pure Al(111). The adsorption energies, however, are more complicated with a Ga patch. We analyze with alternating strips of Al and Ga monolayer. FIG. 4A shows the adsorption energies calculated for hcp (H), fcc (F), and the bridge position (B) between the first two sites. The first conclusion we can make is that, the adsorption energy is not a monotonic function of the distance from the boundary between Al/Ga. There is a sharp increase in adsorption energy right next to the boundary. Far from the interface there is a much larger adsorption energy on the Ga monolayer. Thus, energetically favorable adsorption near the Al/Ga boundary is highly possible and this will lead to preferential sites for nucleation. Then, we compare the interatomic distances (bond lengths) for adsorbed Al in terms of Al—Al and Al—Ga pairs across the Al/Ga boundary. Results shown in FIG. 4B-right indicate that Al in H4 position is indeed more favorable, due to a stronger Al—Ga bonding (Al—Ga bond length decreases to ~2.6 A compared to 2.625 A at monolayer coverage). Meanwhile, differential charge density exhibits a strong localization of electrons around the Al—Ga pairs, where the formation of bonds with adatoms is accompanied by a noticeable disruption in Ga—Ga surface bonding (it gets almost zero in differential charge density). In comparison, the H3 position has a much higher absorption energy, with bonding details shown in FIG. 4B-left. Energetically unfavorable bonding between Al adatom and the H3 position is evidenced by longer interatomic distances ($d_{Al-Ga}$~2.63 and $d_{Al-Al}$~2.67 A, all larger than Al adatom on pristine Al(111)). Bonding of Al adatom in H3 position is more delocalized, but there is no significant change in surface differential charge density. In other words, adatom at the H3 position will not redistribute to form new bonds with neighboring Al and Ga atoms.

Next we explain the low barrier at the bridge position between the fcc and hcp sites. Mainly, not only can the Al adsorbing on Ga strips (B44 position in FIGS. 4*a* and 4*c*) form bonds with two nearest bridge atoms ($d_{Al-Ga}$~2.58 A), it can also bond with two other Ga atoms along the orthogonal direction ($d_{Al-Ga}$~2.76 and 2.95 A). As the bonds along this orthogonal direction are weaker, these Ga atoms could elevate slightly from the surface and move closer to adsorbing Al with distances shortened to Al—Al distance in the bulk (2.87 A). That is to say, having four bonds is more energetically beneficial than maintaining a 3-fold symmetric adsorption site with 3 nearest atoms.

The above analysis was performed on Al(111) surface where adatoms are 3-fold coordinated and diffusion barrier for Al self-diffusion is trivial. Similar conclusions can be made for Al(100) and (110) surfaces containing Ga islands (see FIGS. 18A-18B). The coordination of Al atom on the surface changes in the presence of Ga. For example, Al acquires two extra neighbors when attaches to the Ga island which may serve as a nucleation site both at (100) and (110). Especially drastic observation is received for Al(110) case. The lowest energy position is at the Ga island site because Al binds not only to Ga but also subsurface Al neighbors. This increases the overall adsorption energy. Thus, the ability of Ga atoms to promote an additional bonding with Al adatoms make it a perfect "surfactant" to augment the growth kinetics.

Figure 19:
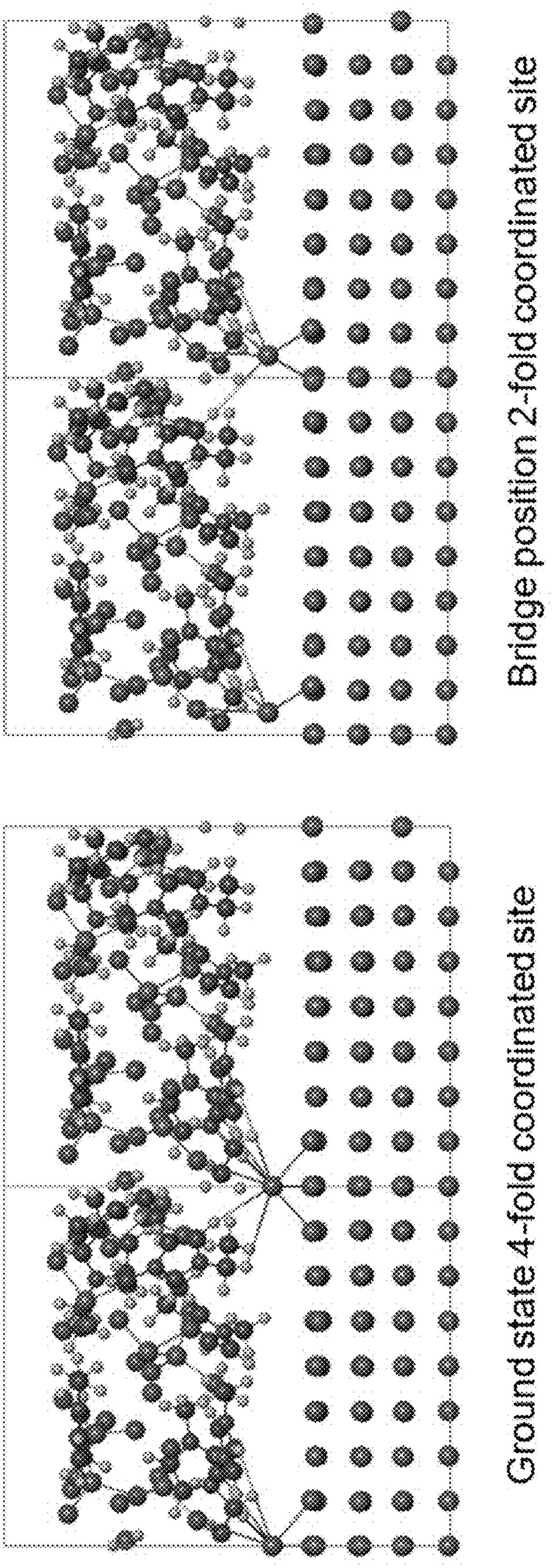
FIG. 19: The configuration of a "toy" self-diffusion model of ionic liquid covering Al (001) surface in the lowest energy configuration and a bridge position of Al adatom. We investigated the effect of ionic liquid on a bridge-hopping diffusion process for (100) surface. Although this is not the lowest energy event, it should be representative of the change in the electrostatic interactions in surface diffusion. (A concerted motion event is expected to be influenced less by IL). We have included seven $EMI^+AlCl_4^-$ complexes at Al (100) surface containing a single adatom using 4×4 supercell with 4 Al layers. We performed a DFT relaxation for the lowest energy position of 4-fold coordinated site. Then we fixed molecular position and considered a bridge-hopping event. By keeping the position fixed we are overestimating the effect of IL on the diffusion process. The results of DFT calculations show that the effect of ionic liquid of the diffusion barrier changes the barrier height from 0.604 to 0.613 eV (in weak electrostatic bonding regime). Although during diffusive events the adatom bonding with the ionic liquid molecules changes, the strength of interaction with ionic liquid is order of magnitude smaller than the interaction of adatom with the surface. The loss of some non-bonding pair interaction during diffusion will be compensated by formation of new non-bonding pair interactions. We are currently investigating approaches to treat the surface electrochemical reactions. There are multiple obstacles of using DFT-based approaches to treat such events. During such processes, the bonding interactions would be introduced and may significantly affect the surface energetics.

The above calculations assume that there are no strong interactions with molecules of the ionic liquid. Such interactions could come during electroplating. We investigated an effect of ionic liquid on a bridge-hopping diffusion process for (100) surface (see FIG. 19). Although the adatom bonding with the ionic liquid molecules changes, the strength of interaction with ionic liquid is order of magnitude smaller than the interaction of adatom with the substrate. As a consequence, earlier approximation to explain the contribution from the Ga coverage on Al deposition is adequate.

The energy landscape of the Al diffusion support the nucleation and growth process described above and illustrated in FIG. 2A. Ga strongly modifies the surface morphology making native defect sites inaccessible for Al growth (preventing low Coulombic efficiency). Al diffuses away from Ga-covered surface towards the free Al surface and nucleates at the Al—Ga disordered interface of Ga-free surface. Thus, the directed diffusion increases Coulombic efficiency and prevents the passivation of the electrode due to the multilayer coverage (observed, for example, in underpotential deposition conditions[24]).

Possible New Reaction Route. Electric double layers (EDLs) next to the active anode (Al-LM) are likely to adopt a lamellar structure like any other electrochemical systems with an organic electrolyte. Current research in surface science treats EDLs as stable nanostructures. This includes revealing them as lamellar stacks[12], interpreting the layered formation with the concept of overcompensation in charge[25], and capturing nonuniformity over topography defects[26]. Reported studies from the electrochemistry community mainly focused on bulk reactions. It is generally assumed that the reaction mechanism appropriate for the bulk should apply to the EDLs too. Rate acceleration, we achieved herein, offered us an opportunity to look into the reaction along the electrolyte-electrode interface.

Figure 4D:
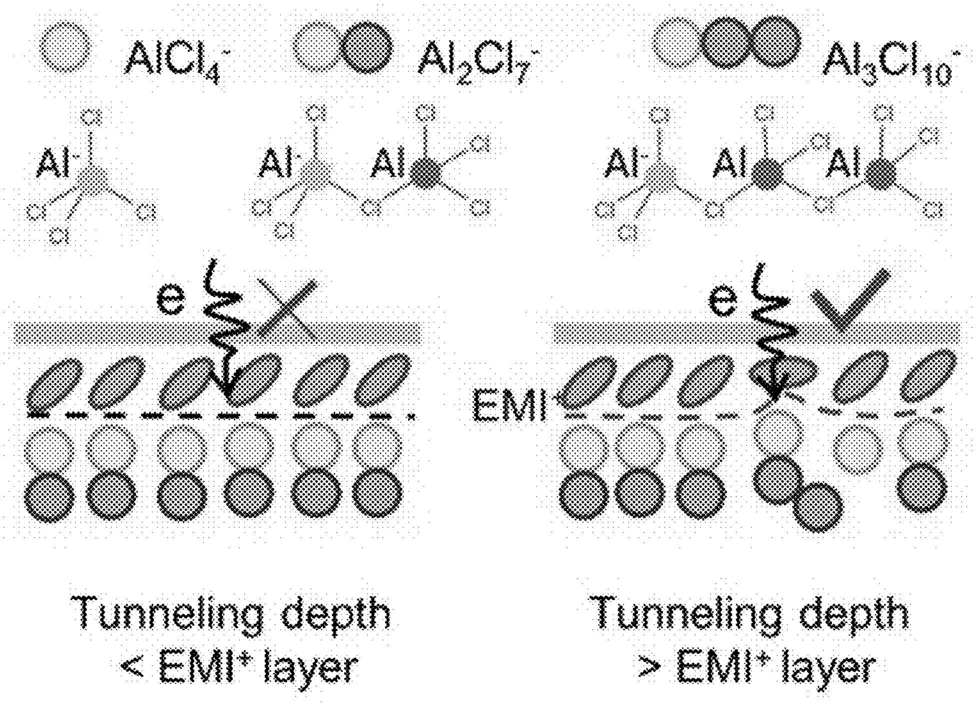
Figure 4E:
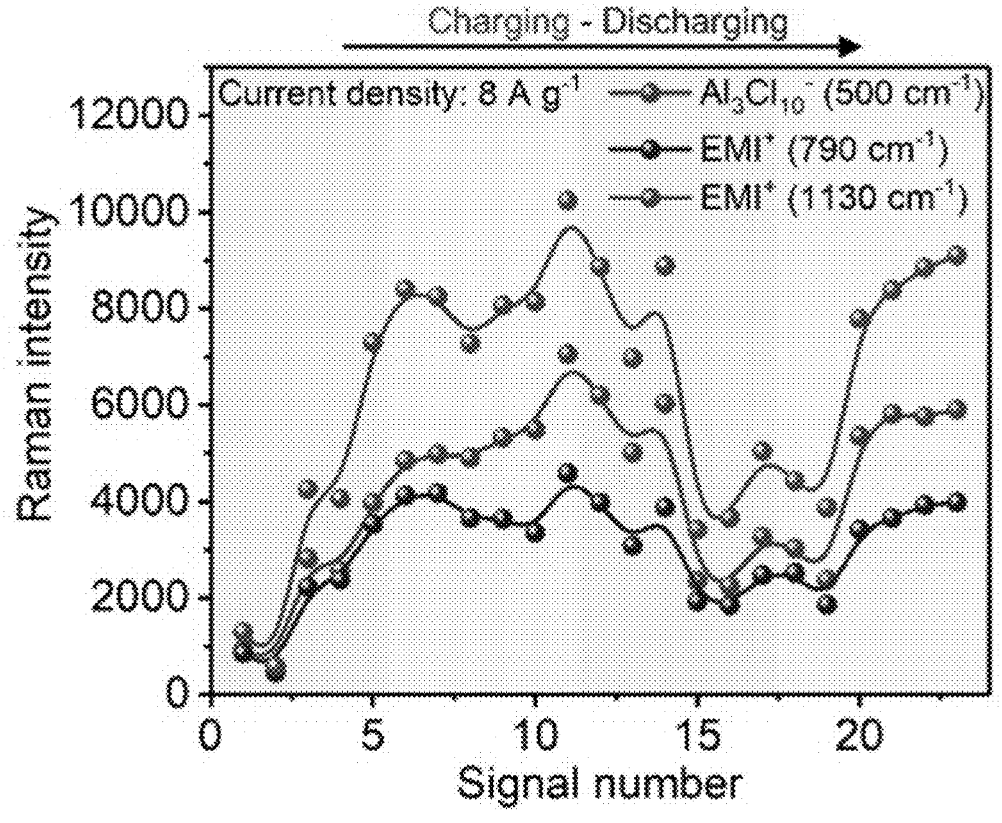

New peaks in FIG. 3F represent the reaction byproducts at the nanometer vicinity of the active anode (Al-LM). Not all of them, however, are accounted for in the conventional charging mechanism (Eq. 1), i.e., $4Al_2Cl_7^-+3e \rightarrow 7AlCl_4^-+Al^{(0)}$. To account for all the observed byproducts, instead of one-step conventional reaction, where electrons from the anode directly reduce 4 parts of Al duo-complex ($Al_2Cl_7^-$) to $Al^{(0)}$, we propose the existence of two extra steps. The first step starts from a subtle change in EDLs. Here, reorganizing two neighboring Al duo-complexes can produce a triple-complex and a mono-complex (Eq. 2a). Since the triple-complex is larger than duo-complex, it may disrupt the uniformity of the organic cationic layer in EDLs (FIG. 4D). In other words, appearance of a large Al complex will prompt the rearrangement of EMI cations. When EMI cations are forced into a different configuration they will stay closer to the electrode (Eq. 2b) which, in turn, will facilitate tunneling of electrons to the large triple-complex assisting in deposition of $Al^{(0)}$ (Eq. 2c—with triple-complex the only reactant or 2d—with duo-complex as additional reactant):

$$2Al_2Cl_7^- \longleftrightarrow Al_3Cl_{10}^- + AlCl_4^- \tag{2a}$$

$$EMI^+ \text{ (standing up)} \longrightarrow EMI^+ \text{ (lying down)} \tag{2b}$$

$$2Al_3Cl_{10}^- + 3e \longleftrightarrow 5AlCl_4^- + Al^{(0)} \tag{2c}$$

$$Al_3Cl_{10}^- + 2Al_2Cl_7^- + 3e \longleftrightarrow Al^{(0)} + 6AlCl_4^- \tag{2d}$$

Figure 20:
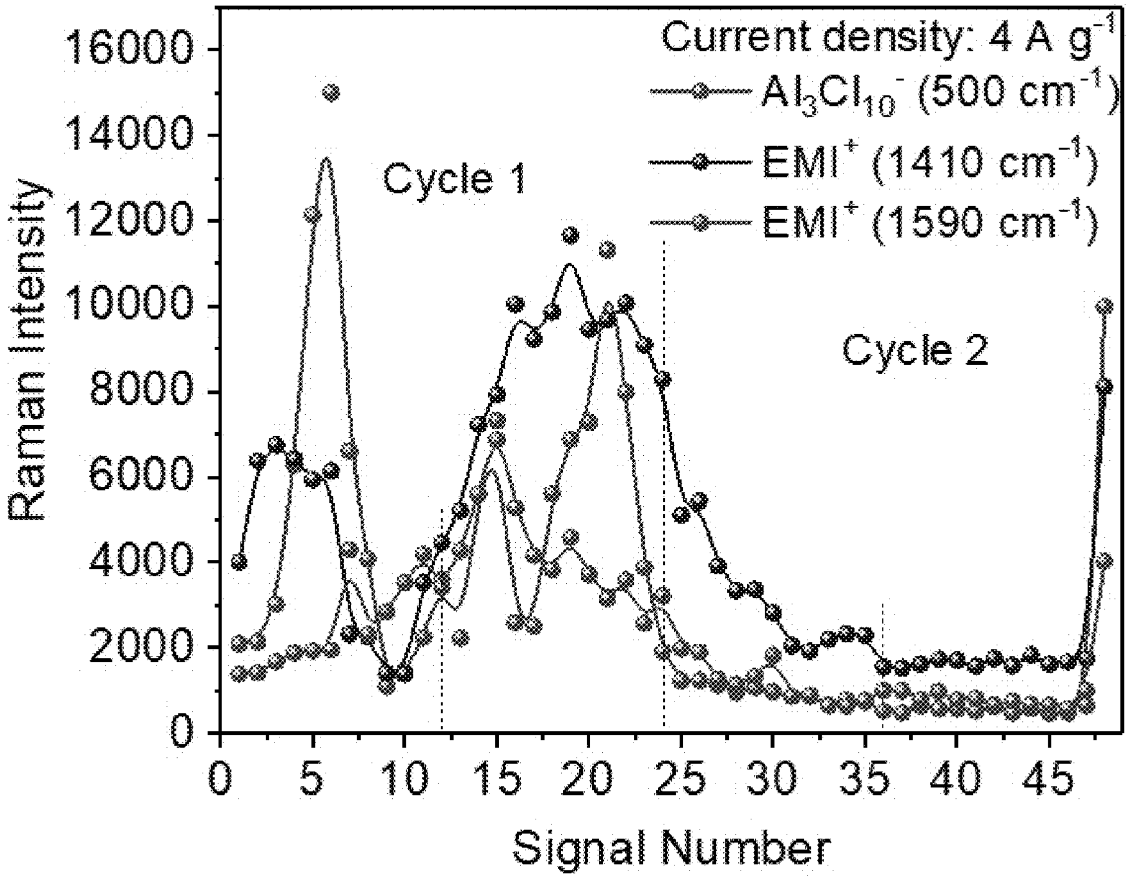
FIG. 20: The intensity variation with time for $Al_3Cl_{10}^-$ and $EMI^+$ under current density of 4 A $g^{-1}$. A smaller current density here (vs. 8 A $g^{-1}$) shows a different trend that can be assigned to variability of Raman sensitivity towards surface features on anode (e.g., unevenness and dendrites growth).
Figures 21A, 21B, 21C, 21D, 21E, 21F:
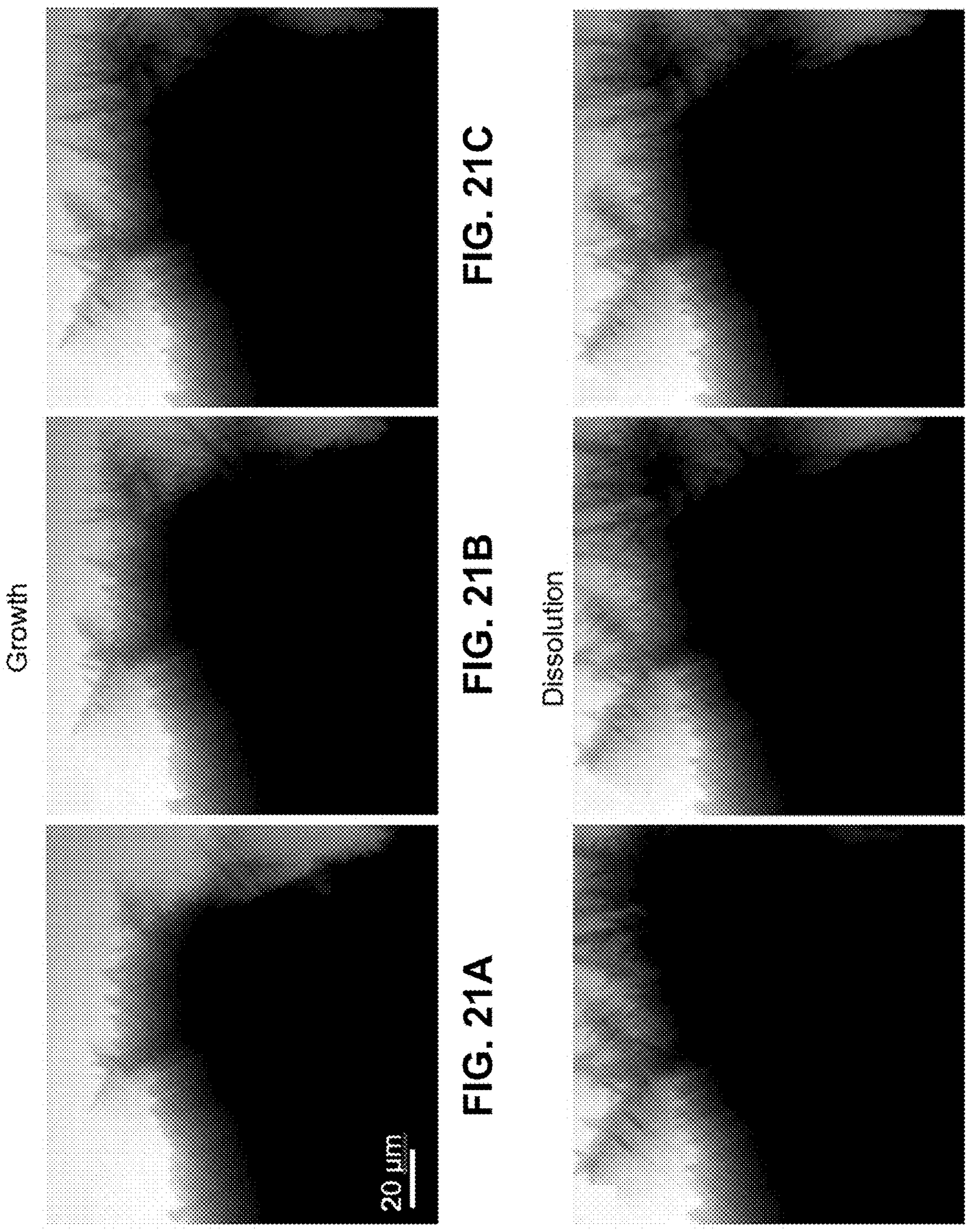
FIGS. 21A-21F: Confocal laser scanning microscopy images of the dendrites growth and dissolution on Al-LM. A planar device with two electrodes, i.e., graphene as the working electrode and Al-LM as the counter/reference, was constructed ($AlCl_3$/EMI-Cl as the electrolyte). A constant current was first applied till a potential of 4.9 V was reached to overcharge this battery (FIGS. 21A-21C) and then it was discharged under the same current (FIGS. 21D-21F). During discharging, the dendrites becomes thinner, resulting in altered curvatures of their branches and trunks. Fine features of the dendrites will contribute to stronger electric field and, hence, larger enhancements factors and as a result an exceptional sensitivity of Raman detection for small amount of molecular/ionic species ($EMI^+$ and others).

This new reaction route above is supported by the signature of the new peaks in FIG. 3F, in which dihedral angle torsion (753 and 790 $cm^{-1}$) and C—C/C—N bond stretches (1135, 1410, and 1590 $cm^{-1}$) resemble peaks observed for the compressed organic cations ($EMI^+$)[27,28]. The aluminum triple-complex ($Al_3Cl_{10}^-$), on the other hand, generates the peak at ~500 $cm^{-1}$. If we single out the new peaks from the current density of 8 A $g^{-1}$ (FIG. 3F) by plotting their intensities vs. the charging/discharging sequence as in FIG. 4E, correlated intensity changes of these intermediates are clearly evident (see FIG. 20 for coupling of intermediates under the current density of 4 A $g^{-1}$). This again supports the proposed reaction steps from Eqs. 2a to 2c or 2d. It's worthwhile to point out that the Raman intensity fluctuations of the Al triple-complex are observed for different charging cycles. Such variation of the sensitivity in Raman detection of species is attributed to the formation of dendrites over the active anode surfaces. High degree of dendrites' structural diversity crossing multiple length scales (from nanometer to micrometer) could largely contribute to variability of enhancement factors over cycles of battery operation (see detailed discussions in FIGS. 21A-21F).

DISCUSSION

Apparently, the capture of Al triple-complex over the interface of electrolyte and the anode has challenged the conventional understanding in Al-ion batteries. One would question how frequently this new intermediate will form in current densities beyond 4 or 8 A $g^{-1}$ and what role it plays in discharging. We have further created a more active Al-LM anode by soaking a piece of Al wire in liquid metal beyond the treatment time used above (Al-$LM_{HIGH}$: 6 h; Al-$LM_{LOW}$: 4 h) and performed Raman measurements over a wide range of current densities (from 0.25 to 160 A $g^{-1}$, see FIG. 22). Extensively treated Al-LM anode did offer a perspective on all participating Al-complexes including single ($AlCl_4^-$), double ($Al_2Cl_7^-$), and triple ($Al_3Cl_{10}^-$) complexes. First, Al single-complex dominates under a small current density, while Al double-complex dominates under a high current density. Second, higher degree of variability in Raman intensities is observed at the intermediate current densities. This observation further corroborates the data shown in FIG. 3F but also points to a complex dependence of Raman intensities on current density and the nature of the interface (Al vs Al-$LM_{LOW}$ vs Al-$LM_{HIGH}$). Additionally, we have observed that Al triple-complex is always formed for the Al-$LM_{HIGH}$ electrode. Triple-complex does no longer disappear completely but varies in intensity, for all the current densities. We therefore postulate a reasonable explanation for Al-triple complex to account for all these new observations as:

$$Al^{(0)} + 2AlCl_4^- + 2Cl^- - 3e \longleftrightarrow Al_3Cl_{10}^- \tag{3a}$$

$$2AlCl_4^- \longleftrightarrow Cl^- + Al_2Cl_7^- \quad (EMI^+ \text{ assisted}) \tag{3b}$$

The combined reaction involving the triple-complex is as following $$Al^{(0)} + 6AlCl_4^- - 3e \longleftrightarrow Al_3Cl_{10}^- + 2Al_2Cl_7^- \tag{3c}$$

Figure 23:
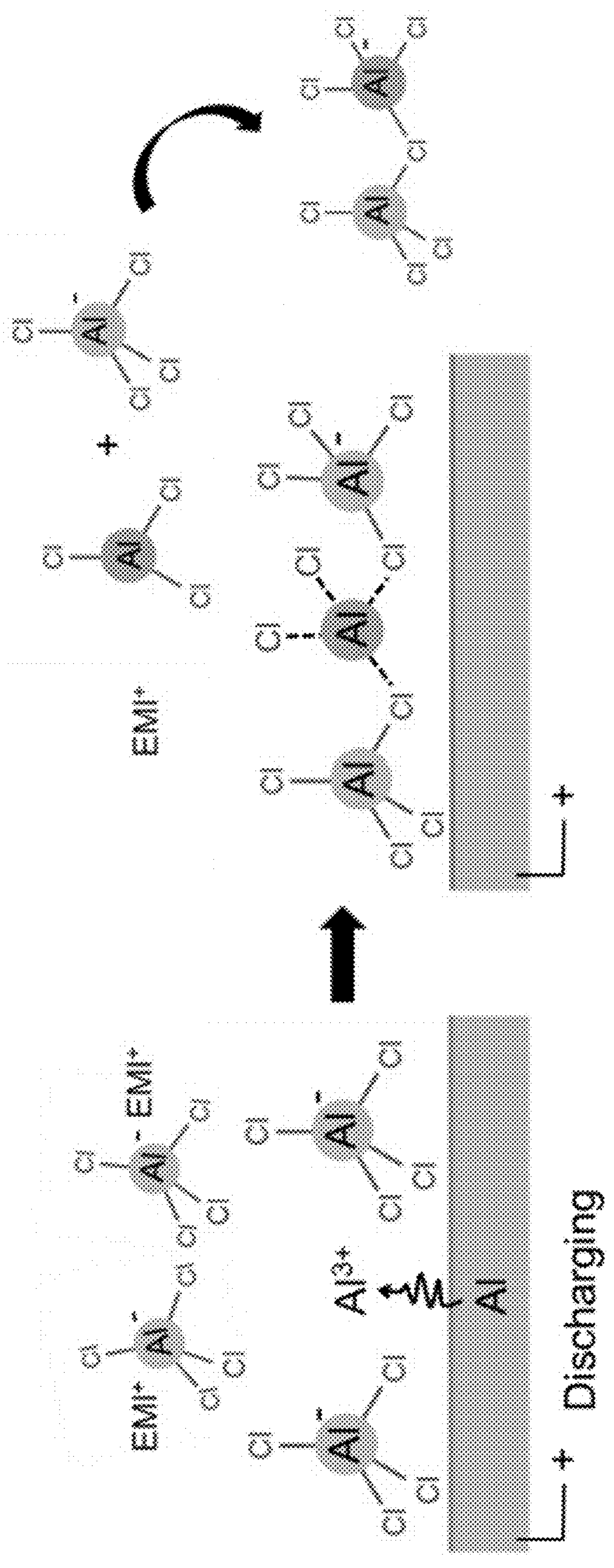
FIG. 23: A more inclusive role for Al triple-complex in discharging. This proposed reaction consumes $Al^{3+}$ and Al single-complexes ($AlCl_4^-$) but generates triple-complex ($Al_3Cl_{10}^-$), dual-complex ($Al_2Cl_7^-$), and frees $EMI^+$ from the bulk electrolyte ($EMI^+$-$AlCl_4^-$). This entire process is reversed during charging, from right to left.

Note Eq. 3c is the same as Eq. 2d when the latter runs in opposite direction (i.e., discharging). Eqs. 3a & 3b provide a simpler view on discharging reaction than the conventional one (Eq. 1: $Al^{(0)}+7AlCl_4^- - 3e \leftrightarrow 4Al_2Cl_7^-$) for several reasons: (a) a clear connection among all complexes (single-, double-, and triple-) is built; (b) the role of organic electrolyte ($EMI^+AlCl_4^-$) in the reaction is further clarified, i.e., it provides $Cl^-$ and frees $EMI^+$ from the cation-anion pair; and (c) it shows clearly where the oxidized Al ($Al^{3+}$) is going, i.e., it inserts between two Al single-complexes and grabs two free $Cl^-$ from the organic electrolyte. A schematic sketch to illustrate these reactions is provided in FIG. 23. From descriptions above, we can hypothesize that the Al-triple species could be both short- and long-lived depending on how active the electrode is and what stage the electrode is at (charging vs. discharging).

It is important to note that, for the new reaction in Eq. 2a to take place, there are two prerequisites. First, the spatial gap between the two duo-complexes ($Al_2Cl_7^-$ or $AlCl_3 \cdot AlCl_4^-$) needs to be small, i.e., less than the van der Waals distance of 5 A for organic molecules[29]. Such that, a small shift for $AlCl_3$ from one of the duo-complex to its neighbor can transform the latter anion to a triple-complex ($AlCl_3 \cdot AlCl_3 \cdot AlCl_4^-$). This tight gap further suggests the anionic portion of the EDLs being internally organized more like polymer patches. Inside an individual patch, the Al duo-complex can be regarded as the repeating unit in a conjugated polymer, with much-needed flexibility to reorganize into larger complexes for fast charging. Secondly, fast charging may not be the only route to produce those Al triple-complexes. In particular, the new anode (Al-LM) while providing much needed high current densities also results in more frequent formation of the triple-complex. Specific details of the new anode's contribution await further explorations. This includes a careful tuning of the surface composition on Al-LM and evaluate its influence to Raman signals.

Overall, we have made substantial progress first by demonstrating ultra-fast charging Al-ion battery and then by expanding our understanding of the role active anode supporting the EDLs plays in charging/discharging. Performance highlights of our device include: (1) highest reported energy capacity of 200 mAh $g^{-1}$, where conventional Al-ion batteries[1,4-10] have a value no more than 120 mAh $g^{-1}$. This improvement is achieved with an open network of graphene that has a low redox potential; (2) fastest charging rate of 104 C (1,000 A $g^{-1}$; duration of 0.35 sec to reach the full capacity) among all metal and metal-ion batteries[30,31]. It was made possible by keeping the discharge at a moderate level (100 A $g^{-1}$; rate of 1,000 C), where adequate ion supplies were ensured by desorption of electrolyte from the graphene cathode; and (3) 500% more specific capacity under high rate operations. Exceptional high rate in charging would cause a large voltage surge at the electrolyte—anode interface and results in low specific capacity; active anode alleviates this surge, with an easier formation of Al adatoms along the Ga/Al boundaries. We expect devices with Al-LM as the anode eliminates the gap between a supercapacitor and a battery. Therefore, devices with other novel cathodes[4,6-9] can all be used to quickly store energy when powerline dropping is expected in a fixed schedule or unexpected with a short notice. This includes energy backup for electric buses that are running between stations, restart a suddenly stopped elevator, or even to minimize power-off-induced loss in manufacturing or production lines.

In certain aspects Al deposition in the presence of organic electrolyte may be useful. Special attention should be given to the proper analysis of electrostatic interactions with non-uniform surfaces, as these features usually show strong non-local character at the interface of ionic liquids and solids[32-35]. To push the high-rate operation further, the insertion of metal cations ($Al^{3+}$) directly in EDLs may be beneficial to provide another boost in charging rate. Not only will it replace those inert organic cations ($EMI^+$) by skipping the energy request on electron tunneling, it will also add a 3-electron process to the total reductions[36,37].

Embodiments of useful methods, for example:

Chemicals and materials. They were purchased from the following vendors unless otherwise specified: hydrochloric acid (HCl, 37 wt %), toluene ($C_7H_8$, >99.5%), and 1-ethyl-3-methyl-imidazolium chloride-aluminum chloride ($AlCl_3$-EMICI) from Sigma-Aldrich; anhydrous ethanol ($CH_3CH_2OH$, 94-96%), anisole ($C_7H_8O$, 99%), and aluminum wire (1.0 mm in diameter, 99.999%) from Alfa Aesar; acetone ($C_3H_6O$, 99.5%) from VWR BDH Chemicals; poly (methyl methacrylate) (PMMA 950 Al 1) from MicroChem; epoxy resin (Gorilla™) from Walmart; colloidal silver (60% silver content) from Electron Microscopy Sciences; Galinstan™ (alloy of gallium, indium, and tin) from Consolidated Chemical & Solvents LLC; nickel foam (1.6 mm in thickness, 0.1 mm in diameter, purity >99.9%) from Alantum Advanced Technology Materials (Dalian) Co., Ltd.; aluminum mesh (55 μm in thickness) from MTI Corporation; silver plated wire (26 gauge; Beadalon™) from Michaels; and copper wire (22 gauge) from Arcor Electronics. Above materials and chemicals were all used as received without further purifications.

Preparation of 3D graphene cathode. Large-area, three-dimensional (3D) graphene was grown by chemical vapor deposition (CVD) using a gas mixture of hydrogen and methane and by placing a nickel foam inside a home-built quartz tube furnace. At first, the Ni foam was cleaved into a narrow strip (17×40 $mm^2$) and then thoroughly rinsed with the following solvents: toluene, acetone, copious de-ionized (DI) water, and anhydrous ethanol. After drying, the Ni foam was loaded into the quartz tube and pumped to a base pressure of 10 mTorr. Subsequently, a constant flow of H2 (7.4 standard cubic centimeters per minute or s.c.c.m) was introduced into the chamber, and the tube was heated to 1000° C. and maintained for 20 minutes, followed by another elevated heating to 1100° C. and a constant flow of methane (20.2 s.c.c.m) to trigger the growth of the 3D graphene over Ni foam. The entire growth process lasted 60 minutes, after which the furnace was cooled down to room temperature over an hour (details see FIGS. 5A-5B). Resulting 3D graphene/Ni foam was then dip-coated with a thin layer of PMMA (4 wt % PMMA solution in anisole) and baked at 95° C. for 4 h. The PMMA/3D graphene/Ni foam was then cut into small pieces with desired dimensions. Afterwards, these pieces were placed in a HCl bath (3.0 M, 70° C.) for 4 h to completely dissolve the Ni layer and later soaked in DI water (5 times) to remove the inorganic residue.

Supercritical $CO_2$ drying. Above PMMA/3D graphene sample was soaked in acetone (6 times) at 50° C. for 1 h, then being placed in anhydrous ethanol and later transferred to a supercritical $CO_2$ dryer (Samdri-780A, USA) where its small chamber was preloaded with 20 mL anhydrous ethanol. Liquid $CO_2$ was pumped into the chamber to keep the pressure at 850 psi. The temperature was kept at 10° C. and purged for 3-5 minutes. A heater was then used to raise the temperature and pressure in the chamber respectively to 31° C. and 1250 psi (for 4 minutes). Finally, the pressure in the small chamber was released, and the 3D graphene was recovered.

Preparation of the active anode (Al-LM). Al wire/mesh was cut into desired dimensions. A copper wire was then used as current collector, with the Al part washed with toluene, acetone, DI water, and anhydrous ethanol before being transferred into the glove box. Al wire/mesh was immersed in Galinstan (Al wire for 2~9 hours, but Al mesh no more than 5 min). After removal, these alloys were gently wiped off the excess liquid metal on the surface and kept for further studies.

Battery configuration. All cells were assembled in the argon-atmosphere glove box (Vacuum Atmospheres) and packed in screw-thread vials (4 mL). These cells use 3D graphene as the cathode (areal loading ranged from 0.16 to 0.22 mg cm-2, see additional data in FIG. 8), Al or Al-LM as anode (20 mm in length for wire and 5 mm×10 mm for mesh), and 1-ethyl-3-methylimidazolium chloride/aluminum chloride (1.2 mL) as electrolyte. For the cathode, we use a silver-plated wire as the current collector, with colloidal silver as the adhesive and epoxy the fixing layer.

Figure 24A:
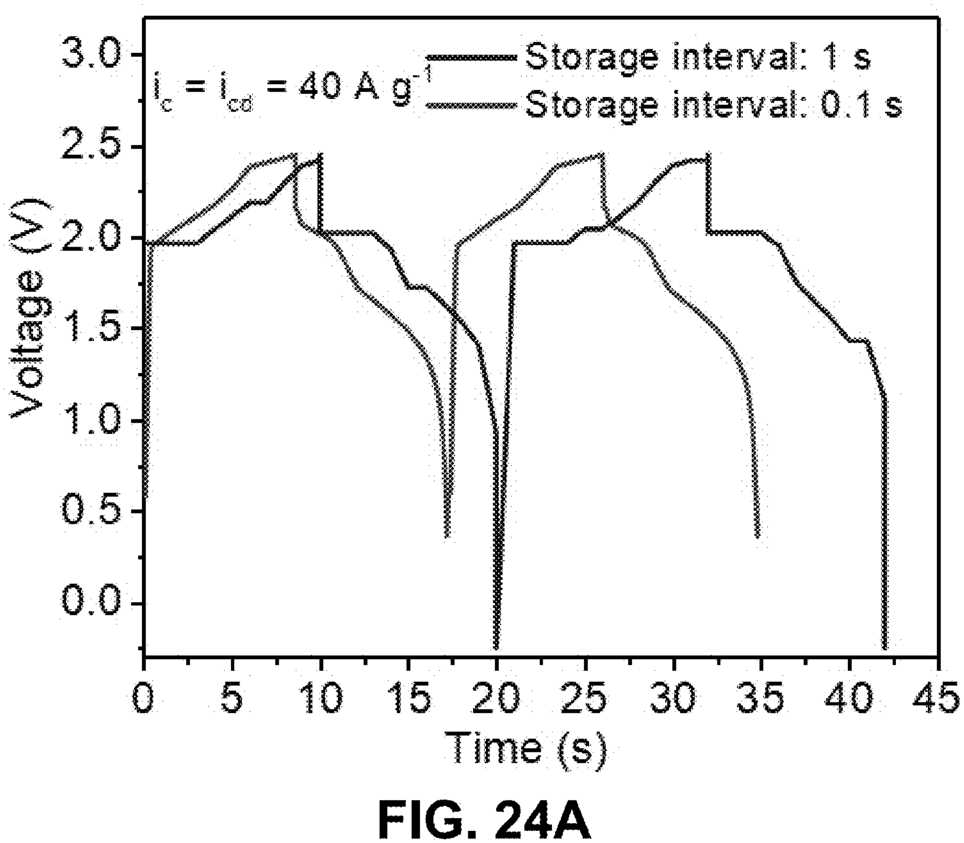
FIGS. 24A-24C: Sampling rate affects reported device properties. Galvanostatic charge and discharge curves under current densities of 20 (FIG. 24A), 40 (FIG. 24B) and 60 A $g^{-1}$ (FIG. 24C) measured by two battery stations: Neware BTS-4008 (50 mA; Minimum data storage interval: 0.1 s) and Neware BTS-3008 (5 mA; Minimum data storage interval: 1 s). While rarely mentioned in literatures, this graph shows sampling rate being a critical factor. Instruments having a small rate would give a rather large number in specific capacity or, an inappropriate sampling rate could mislead the audiences. Essentially for devices running under large current densities, both charging and discharging become quick, demanding a faster sampling rate. In order to provide a fair ground, we used an electrochemical analyzer (CH Instruments, CHI6062E; minimum data interval: 0.1 ms) for all the data received under large current densities.
Figure 24B:
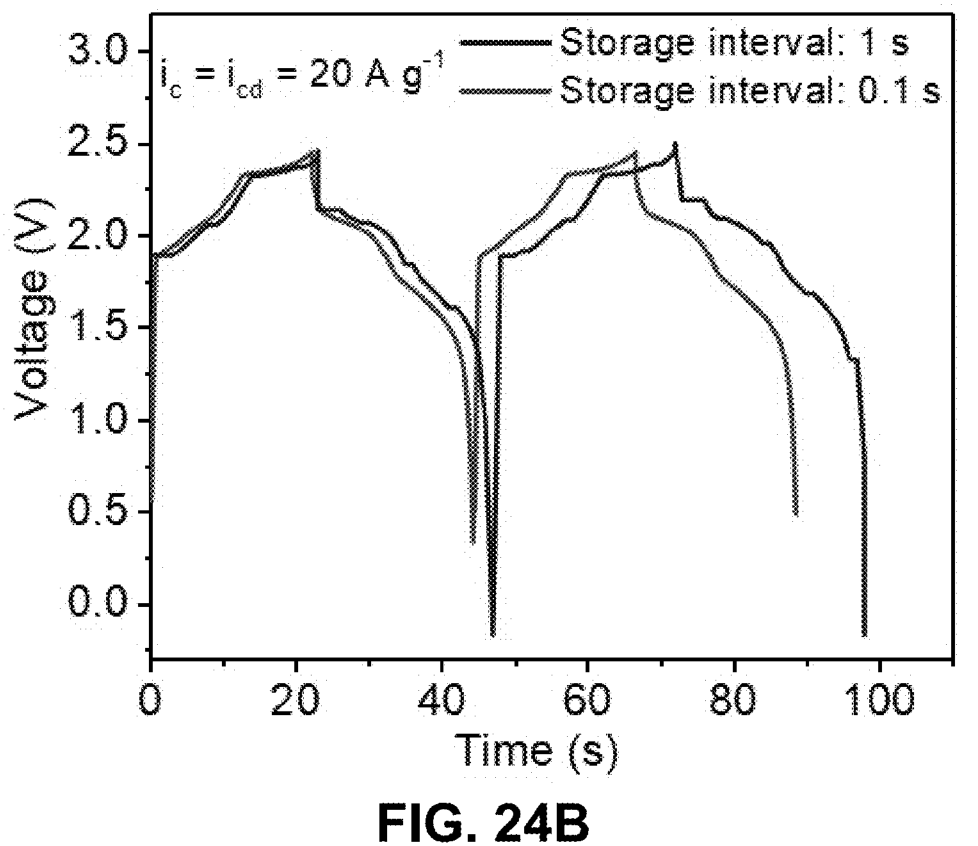
Figure 24C:
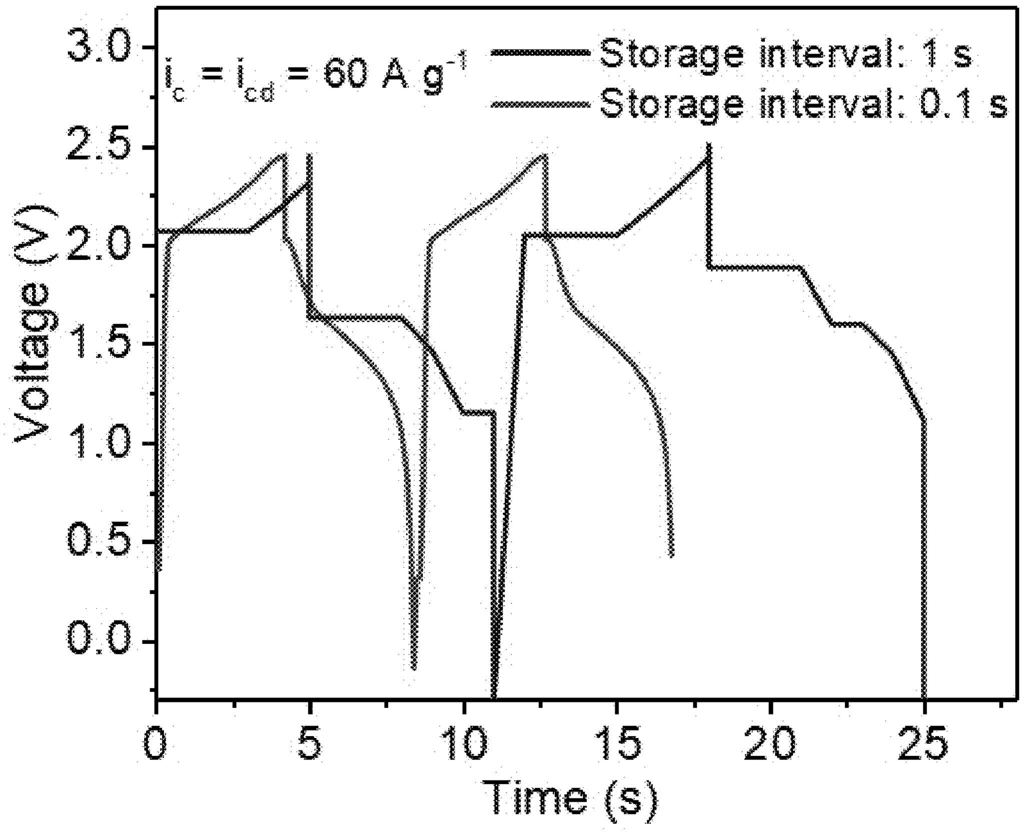

Electrochemical measurements. All measurements were performed outside the glovebox after the battery being sealed with an air-tight cap. Multi-cycled, galvanostatic charge/discharge were carried out on a battery testing system (Neware, BTS-4008, 5 V 50 mA; minimum data interval: 0.1 s). For extremely fast charge/discharge tests, since the number of points collected has a great impact on quantified device performances (for details see FIGS. 24A-24C), these tests were performed on an electrochemical analyzer (CH Instruments, CHI6062E; minimum data interval: 0.1 ms). Specific capacity data reported here are all based on the mass of graphene only. Cyclic voltammetry (CV) was also operated on CHI6062E with scanning ranging from 0 to +2.45 V (scan rate of 10 $mVs^{-1}$). We use 3D graphene as the working electrode and Al as the counter and reference electrode (shown in FIG. 1B). Electrochemical impedance spectroscopy (EIS) measurements were performed using a Gamry Interface 1000E potentiostat in two-electrode mode. The cell was designed to have three electrodes where two of them are anodes (one Al-LM anode and another pure Al) and third one is the 3D graphene cathode. We either use Al-LM/graphene pair or the Al/graphene pair, to minimize the influence of graphene cathode. Frequency range is set from 0.1 to 100 kHz and the AC voltage at 5 mV. In the same cell, we alternate the use of both anodes to ensure minimal aging effects. Each pair of electrodes was charged/discharged in the same electrolyte 10 times before the EIS measurement (FIG. 2E, see FIGS. 10A-10D for model and fitting).

Overcharging. We placed an optical microscope (MEIJI ML8530) in the glove box and used a digital camera (Tucsen H Series) to record the images via a laptop computer. The battery cell was assembled horizontally on a glass slide, with glass spacers to seal the electrolyte and both electrodes. The cell was placed under the lens of microscope, followed by cycling 50 times between +2.45 and +0.5 V prior to an overcharging test. All overcharging tests were conducted under a constant current density of 400 A $g^{-1}$.

Structure and morphology characterizations. The structure of 3D graphene was characterized by scanning electron microscopy (SEM; FEI Nova NanoSEM™ 450), Raman spectroscopy (Renishaw inVia Raman microscope, excited by a 633 nm laser with a laser spot size of 0.3 μm) and X-ray diffractometer (XRD, SmartLab Diffractometer, Rigaku, Texas, with a CuK wave). For X-ray diffraction (XRD) analyses, the battery cells were repetitively charged and discharged at a current density of 20 A $g^{-1}$. After 1000 cycles, the 3D graphene was removed from the cell. To avoid reaction with the moisture or oxygen from the air, the cathode was placed on a glass slide and then wrapped by a Scotch tape before XRD measurements out of the glove box. Elemental mapping of Al or Al alloy anodes was conducted via an energy-dispersive spectrometer (EDS) attached to FEI Nova NanoSEM™ 450. Fully charged Al or Al alloy anodes were washed with anhydrous toluene to remove any residual electrolyte. Then they were adhered over a carbon conductive tape and sealed in a plastic box before any characterizations.

Raman measurements. Raman measurements were performed using a Raman spectrometer configured in transmission mode on the Olympus IX71 inverted optical microscope. An oil immersion Olympus objective lens with 100× magnification and 1.4 NA (UPLSAPO) was utilized for focusing the laser on the surface of anode before collecting the Raman signal. Glass coverslips windows were created in a home-made sealed chamber. The chambers were placed on the stage equipped with an x-y-positioning piezoelectric controller. Two experimental setups were utilized: 1) Ntegra-Spectra (NT-MDT, Moscow, Russia) and 2) Raman-HR-TEC (StellarNet, Inc., Tampa, USA). 1) Ntegra-Spectra was utilized for initial detection of reaction species on the anode. Ntegra-Spectra detects the Raman signal using an Andor-CCD camera cooled to −60° C. and optically coupled with both the Raman spectrometer and inverted microscope. A diode laser with λ=532 nm and a nominal power of 100 mW was used for excitation (LaserExportCo, Ltd, Moscow, Russia). 2) Raman-HR-TEC (StellarNet, Inc., Tampa, FL, USA) was utilized for automated fast collection of spectra at various charging densities. The spectrometer is coupled to both the inverted microscope and the laser (λ=647 nm and a nominal power of 150 mW) using the Raman Probe—the fiber optics cable (StellarNet, Inc.) which integrates both excitation and collection cables. Home-built LabView (National Instruments, Austin, TX, USA) interface in "time series" mode was utilized allowing for collection of spectra without delays at various current densities especially suitable for signal collection at fast rates. Each spectrum was collected for a total of 5 sec acquisition time and background corrected for both instruments.

Figure 17A:
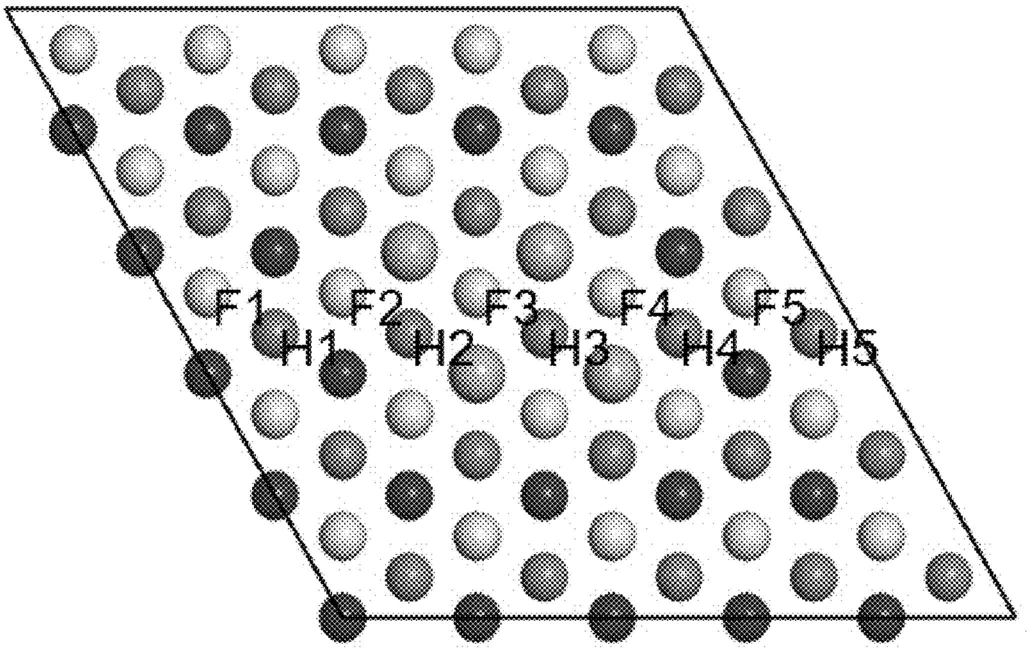
FIGS. 17A-17B: Small Ga island covers a small cavity on Al surface.
Figure 17B:
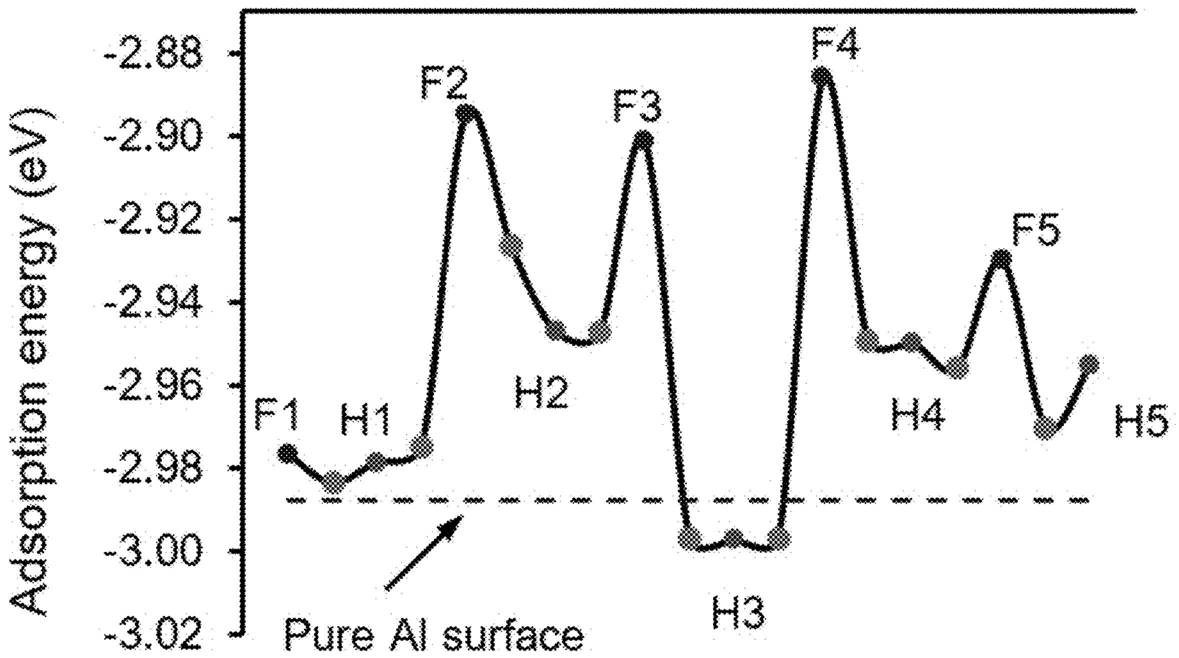

Computational methods. Self-consistent electronic structure calculations were performed for the Al/Ga system. The calculations were carried out using the Density-functional theory (DFT) method[38,39] as implemented in the Vienna ab initio simulation package VASP[40]. Projector augmented wave (PAW) pseudopotentials were used[41]. The generalized gradient approximation (GGA) of Perdew-Burke-Ernzerhof (PBE) form[42] is used for the exchange-correlation function. The Al diffusion barrier on Al (111) in a 4-layer slab geometry was selected. The supercell approach was used, with an array of 4×6 primitive cells arranged in the x-y plane when considering "strip"-like Ga layers on top of Al (111), and 5×5 array for the case of Ga "island" (FIGS. 17A-17B). The Blöchl's tetrahedron integration method was used[43]. We set the plane-wave-cut-off energy to 350 eV and choose the convergence criteria for energy of 10-6 eV. Calculations were performed with relaxation of atomic positions of all atoms in the unit cells using Hellmann-Feynman scheme till forces were less than 0.003 eV/A.

REFERENCES CORRESPONDING TO THE ABOVE

1 Lin, M. C. et al. An ultrafast rechargeable aluminium-ion battery. *Nature* 520, 324-328 (2015).

2 Lin, D. et al. Reviving the lithium metal anode for high-energy batteries. *Nat. Nanotechnol.* 12, 194-206 (2017).

3 Nitta, N. et al. Li-ion battery materials: present and future. *Mater. Today* 18, 252-264 (2015).

4 Chen, H. et al. Ultrafast all-climate aluminum-graphene battery with quarter-million cycle life. *Sci. Adv.* 3 (2017).

5 Hudak, N. S. Chloroaluminate-doped conducting polymers as positive electrodes in rechargeable aluminum batteries. *J. Phy. Chem. C* 118, 5203-5215 (2014).

6 Wang, D. Y. et al. Advanced rechargeable aluminium ion battery with a high-quality natural graphite cathode. *Nat. Commun.* 8, 14283 (2017).

7 Chen, H. et al. A defect-free principle for advanced graphene cathode of aluminum-ion battery. *Adv. Mater.* 29 (2017).

8 Yu, X. Z. et al. Graphene nanoribbons on highly porous 3D graphene for high-capacity and ultrastable Al-Ion batteries. *Adv. Mater.* 29 (2017).

9 Wu, Y. P. et al. 3D graphitic foams derived from chloroaluminate anion intercalation for ultrafast aluminum-Ion battery. *Adv. Mater.* 28, 9218-9222 (2016).

10 Angell, M. et al. High Coulombic efficiency aluminum-ion battery using an AlCl3-urea ionic liquid analog electrolyte. *Proc. Natl. Acad. Sci. U.S.A.* 114, 834-839 (2017).

11 Xu, H. et al. Low-cost AlCl3/Et3NHCl electrolyte for high-performance aluminum-ion battery. *Ener. Storage Mater.* 17, 38-45 (2019).

12 Endres, F. et al. The interface ionic liquid(s)/electrode(s): In situ STM and AFM measurements. *Faraday Discuss* 154, 221-233 (2012).

13 Cheng, X. B. et al. Towardsafe lithium metal anode in rechargeable batteries: a review. *Chem. Rev.* 117, 10403-10473 (2017).

14 Han, P. X. et al. Lithium ion capacitors in organic electrolyte system: scientific problems, material development, and key technologies. *Adv. Ener. Mater.* 8 (2018).

15 Gifford, P. R. et al. An aluminum chlorine rechargeable cell employing a room-temperature molten-salt electrolyte. *J. Electrochem. Soc.* 135, 650-654 (1988).

16 Chen, Z. et al. Three-dimensional flexible and conductive interconnected graphene networks grown by chemical vapour deposition. *Nat. Mater.* 10, 424-428 (2011).

17 Morita, S. et al. Scanning tunneling microscopy in air and liquid. *Phys. Scr.* 38, 277-281 (1988).

18 Benedetto Bozzini et al. Morphogenesis in metal electrodeposition. *Note di Matematica* 32, 7-46 (2012).

19 Murray, J. L. The Al—Ga (aluminum-gallium) system. *Bull. Alloy Phase Diag.* 4, 183 (1983).

20 Liu, J. et al. *Ch 5 Preparations and Characterizations of Functional Liquid Metal Materials: Principles and Applications. Liquid Metal Biomaterials* (Springer, Singapore, 2018).
21 Liu, T.-Y. et al. Intelligent liquid integrated functional entity: a basic way to innovate future advanced biomimetic soft robotics. *Adv. Intel. Sys.* 1, 1900017 (2019).
22 Torma, P. et al. Strong coupling between surface plasmon polaritons and emitters: a review. *Rep. Prog. Phys.* 78 (2015).
23 Gebbie, M. A. et al. Ionic liquids behave as dilute electrolyte solutions. *Proc. Natl. Acad Sci. U.S.A* 110, 9674-9679 (2013).
24 O'M.Bockris, J. et al. *Modern Electrochemistry*. (Kluwer Academic/Plenum Publishers, 2000).
25 Bazant, M. Z. et al. Double layer in Ionic Liquids: overscreening versus crowding. *Phys. Rev. Lett.* 106 (2011).
26 Black, J. M. et al. Topological defects in electric double layers of ionic liquids at carbon interfaces. *Nano Ener.* 15, 737-745 (2015).
27 Chen, F. et al. Pressure-induced structural transitions of a room temperature ionic liquid—1-ethyl-3-methylimidazolium chloride. *J. Chem. Phys.* 146, 094502 (2017).
28 Paschoal, V. H. et al. Vibrational spectroscopy of ionic liquids. *Chem. Rev.* 117, 7053-7112 (2017).
29 Parikh, A. N. et al. An intrinsic relationship between molecular-structure in self-assembled n-alkylsiloxane monolayers and deposition temperature. *J. Phys. Chem.* 98, 7577-7590 (1994).
30 Liu, Y. Y. et al. Challenges and opportunities towards fast-charging battery materials. *Nat. Ener.* 4, 540-550 (2019).
31 Zheng, J. M. et al. Electrolyte additive enabled fast charging and stable cycling lithium metal batteries. *Nat. Ener.* 2 (2017).
32 Sabirianov, R. F. et al. Enhanced initial protein adsorption on engineered nanostructured cubic zirconia. *Phys. Chem. Chem. Phys.* 13, 6597-6609 (2011).
33 Rubinstein, A. I. et al. Effect of the ordered interfacial water layer in protein complex formation: A nonlocal electrostatic approach. *Phys. Rye. E* 82 (2010).
34 Rubinstein, A. I. et al. Effects of the dielectric properties of the ceramic-solvent interface on the binding of proteins to oxide ceramics: a non-local electrostatic approach. *Nanotechnol.* 27 (2016).
35 Fedorov, M. V. et al. Unravelling the solvent response to neutral and charged solutes. *Mol. Phys.* 105, 1-16 (2007).
36 Leisegang, T. et al. The Aluminum-Ion Battery: A Sustainable and Seminal Concept? *Front. Chem.* 7, 268 (2019).
37 Gomez-Gonzalez, V. et al. Solvation of Al(3+) cations in bulk and confined protic ionic liquids: a computational study. *Phys. Chem. Chem. Phys.* 20, 19071-19081 (2018).
38 Hohenberg, P. et al. Inhomogeneous electron gas. *Phys. Rye. B* 136, B864 (1964).
39 Kohn, W. et al. Self-consistent equations including exchange and correlation effects. *Phys. Rev.* 140, 1133 (1965).
40 Kresse, G. et al. From ultrasoft pseudopotentials to the projector augmented-wave method. *Phys. Rye. B* 59, 1758-1775 (1999).
41 Blochl, P. E. Projector augmented-wave method. *Phys. Rye. B* 50, 17953-17979 (1994).
42 Perdew, J. P. et al. Generalized gradient approximation made simple. *Phys. Rev. Left.* 77, 3865-3868 (1996).
43 Blochl, P. E. et al. Improved tetrahedron method for brillouin-zone integrations. Phys. Rye. B 49, 16223-16233 (1994).

Supplementary Information for Ultra-Fast Charging in Aluminum-Ion Batteries: Electric Double Layers on Active Anode:

The following discussion is in view of FIGS. 14A-14F. Except for tin (Sn) that had an irreversible redox reaction, behaviors of all the other electrochemical cells are rather similar. Here we pay attention to two features: location of the major oxidation peak and repeatability of the entire CV scans (multiple scans performed from 0.0 to 2.5 V). The major peak is the place where $Al^{(0)}$ got electrodeposited on the anode and the 3D graphene cathode was oxidized. Locations for those major peaks varies with different metal anodes, with 2.45 V for In, 2.36 V for Ag, and 2.33 V for Ga. In comparison, Al-LM showed a complete peak for oxidation at a small potential of 2.35 V. While this number is slightly higher than that for Ga, Al-LM/graphene pair is easier to participate in the redox reactions, with lower oxidation plateaus at 1.55-2.19 V and 2.24-2.42 V but higher reduction plateaus at 1.5-1.92 V and 1.95-2.22 V (see highlights). Essentially, if we translate these plateaus to performance indicators for batteries, devices using Al-LM/graphene will consume the least amount of energy in charging but release the most energy in discharging. Furthermore, a higher current density for the upper plateau (stronger peaks) indicates that the redox reaction is much more intense. In comparison, although the oxidation potential of gallium is the lowest (2.33 V), its reduction platform is also low and peaks are relatively weak in intensity. Next we compare repeatability of the entire CV scans. It represents how well those electrodeposited $Al^{(0)}$ can be oxidized back into the organic electrolyte. As expected, pure Al and Al-LM beat all the other candidates in repeatability, in which little difference is observed for multiple CV scans.

Figure 16A:
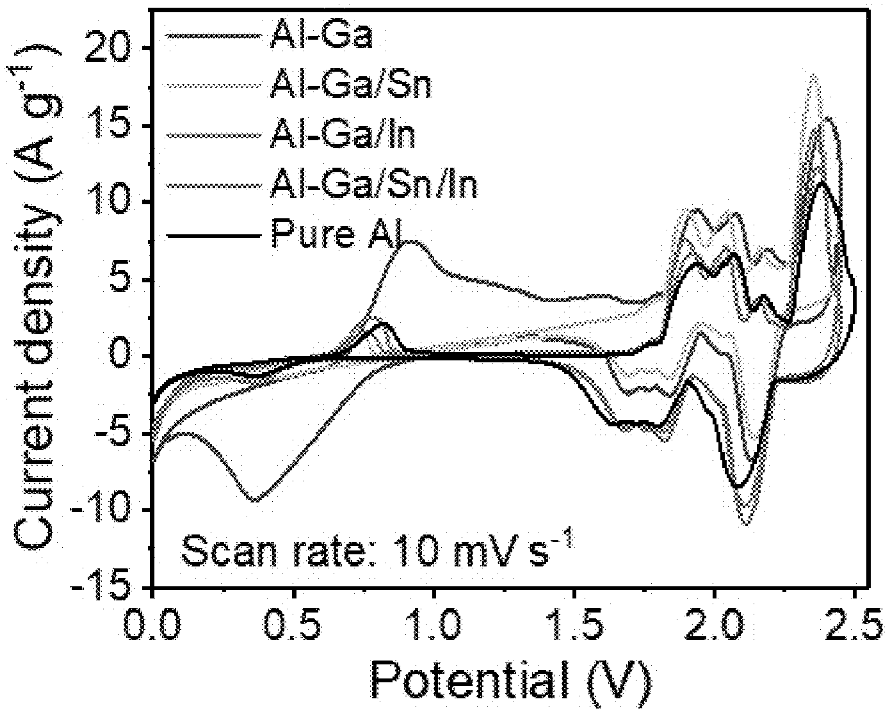
FIGS. 16A-16D: Influence of individual metal elements from Galinstan by varying the compositions.
Figure 16B:
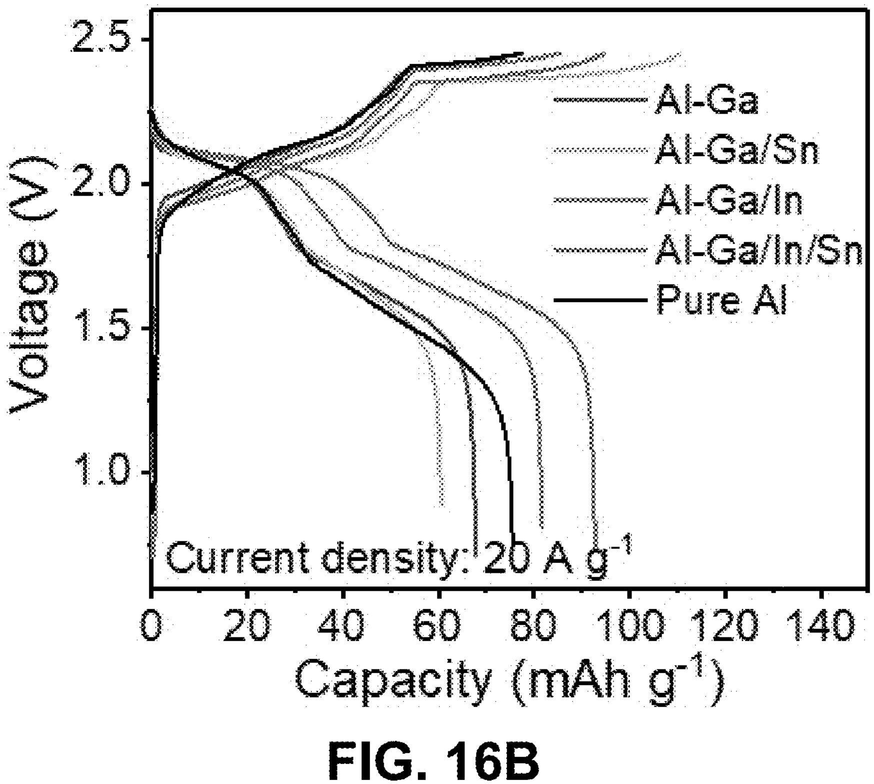
Figure 16C:
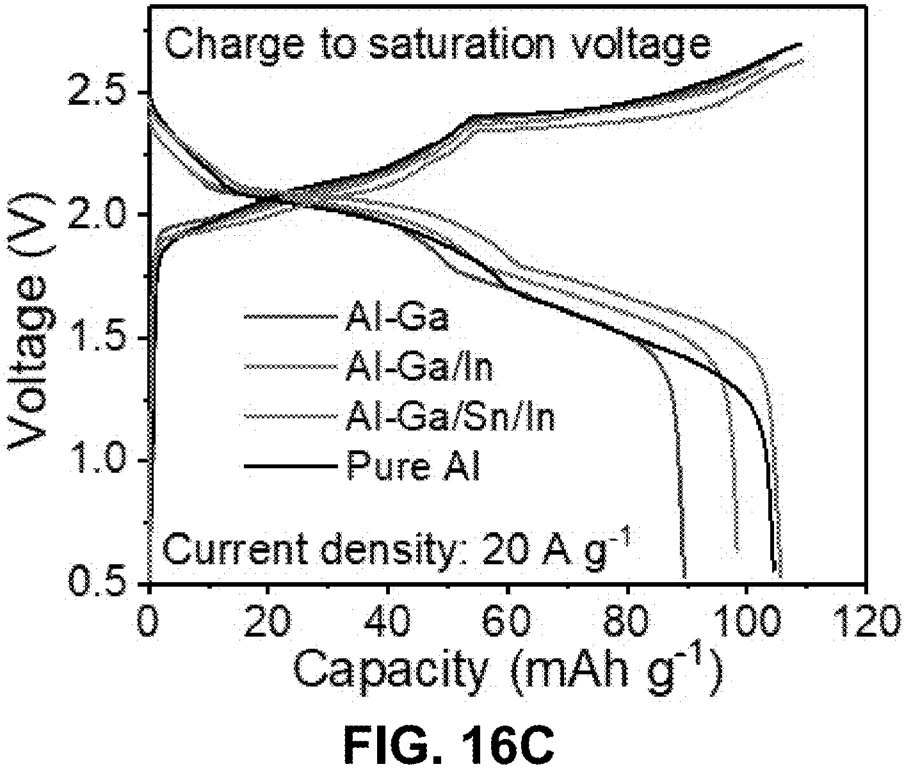
Figure 16D:
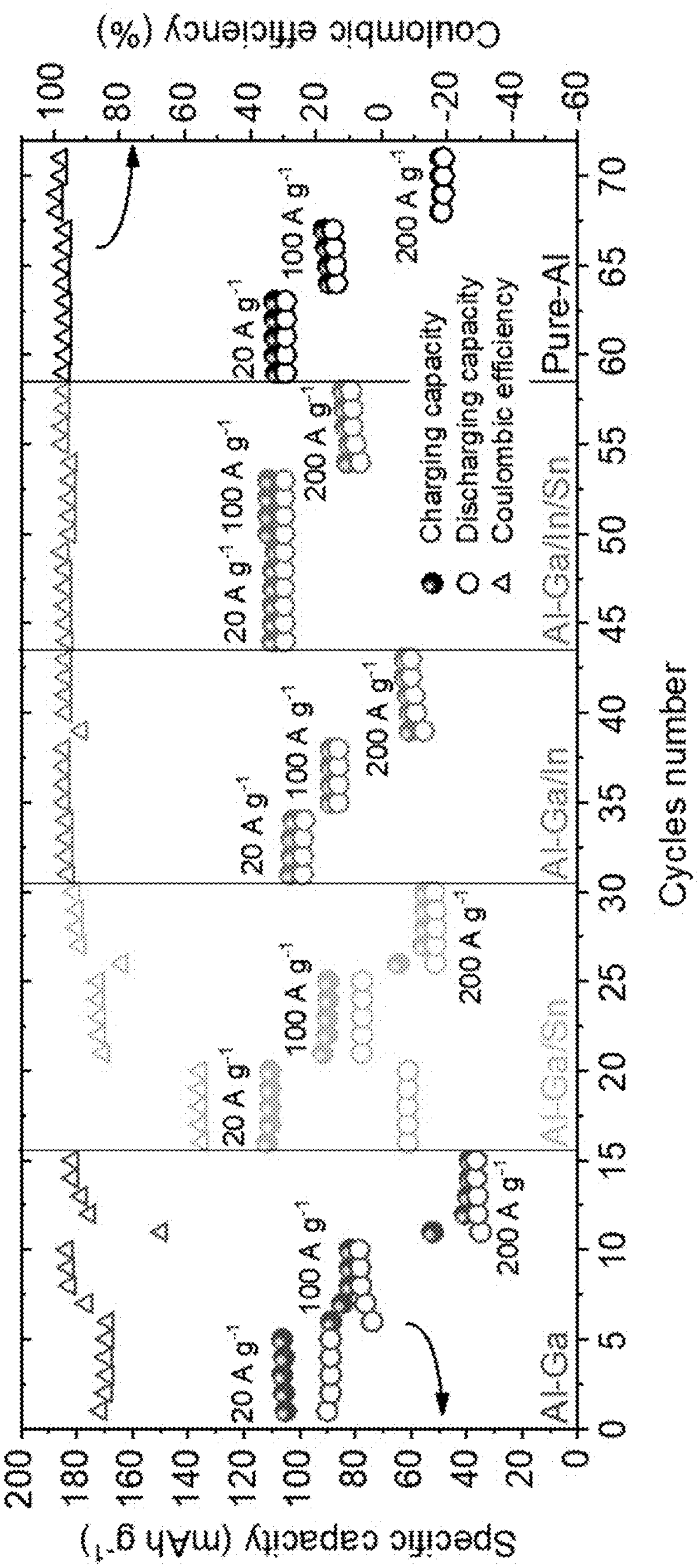

The following discussion is in view of FIGS. 16A-16D. We explored the influence of individual metal elements from Galinstan by varying the compositions. Five samples are involved: pure Al, Al treated by pure gallium (Al—Ga), Al treated with eutectic alloy of gallium (75 wt %) and indium (25 wt %) (Al—Ga/Sn), Al treated with eutectic alloy of gallium (85 wt %) and tin (15 wt %) (Al—Ga/In), and Al treated with Galinstan (Al—Ga/Sn/In). Once one of them is used as the anode, we paired it with a 3D-graphene cathode and the organic electrolyte (EMI-Cl:$AlCl_3$=1.5). Graphs of cyclic voltammogram as well as galvanostatic charge/discharge curves are shown above. Both Al—Ga/Sn and Al—Ga/Sn/In anodes exhibited the lowest value in potential for the major peak at 2.35 V (in FIG. 16A), but only Al—Ga/Sn/In had the highest capacity (in FIG. 16B) and lowest charging voltage (in FIG. 16C). In FIG. 16D, the battery with Al—Ga/In/Sn demonstrated the best performance in high-rate operations (less decline in capacity). Overall, the liquid metal (Galinstan) we reported in the manuscript is indeed the best anode for Al-ion batteries under high rates.

Now we explain why Al—Ga, Al—Ga/Sn, Al—Ga/In are not as good as Al—Ga/In/Sn. When we performed CV on the single metal (Ga, In, Sn, in FIGS. 14A-14F), we found that gallium (Ga) had the lowest oxidation plateaus (1.55-2.19 V and 2.2-2.4 V), but accompanied with low reduction plateaus (1.25-1.67 V, 1.85-2.15 V) and weak peaks during discharging. These all suggest that gallium can reduce interfacial resistance, but too much gallium could dissolve freshly deposited Al, discouraging it for subsequent discharging reactions[1]. Additionally, tin (Sn) had signs of irreversible redox reactions, so it plays a negative role in the battery performance. This matches the observation in FIG. 16D, on anode of Al—Ga/Sn, which has a low Coulombic efficiency. Except for the lack of stability, indium (In) seems to have no obvious drawbacks. However, it exhibited the highest value in potential (higher than our set voltage of 2.5 V; FIGS. 14A-14F). While electrochemically tin is not a favored choice, it does bring down the melting point for liquid metal. Such that, it might have helped a better infiltration through boundaries in aluminum. This is supported by the comparison between Al—Ga/In (Ga:In=75:25 wt %) and Al—Ga/In/Sn in FIG. 16D.

Figure 18A:
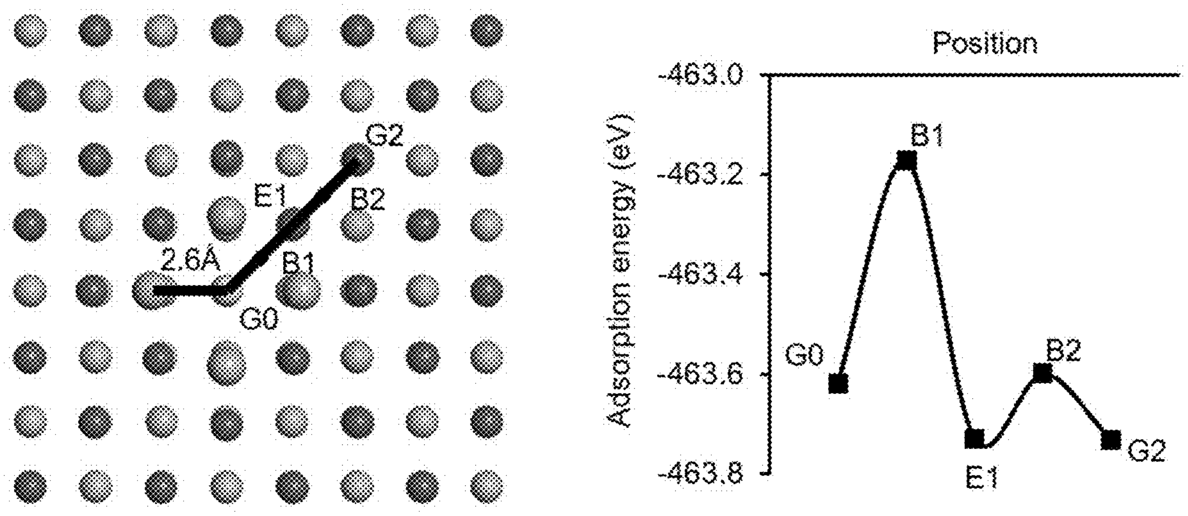
FIGS. 18A-18B: Al(100) and (110) surfaces containing Ga islands. Adsorption energy as function of the position of Al adatom. on Al(100) (FIG. 18A) and Al(110) (FIG. 18B) surfaces in the presence of 4-atom Ga island.
Figure 18B:
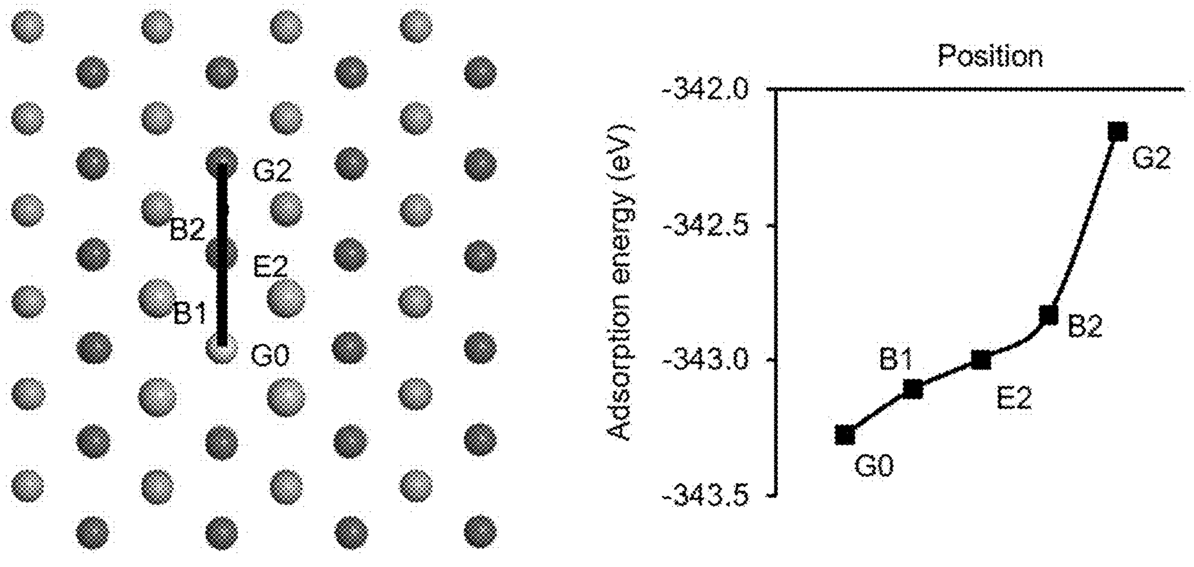

The following discussion is in view of FIGS. 18A-18B. Al(100) and Al(110) are other high symmetry surfaces for Al. The surface energy of these surfaces makes them to be less favorable to occur. However, the diffusion of Al adatom in the presence of Ga island fully supports our conclusions based on consideration of diffusion on (111) surface. Al position at the island reduces its energy comparing to sites on the planar surface of the same symmetry. In case of (110) and (100) surface it is basically due to the bond counting effect as Al creates more bonds when attaches or adsorbs on Ga island. Ga atoms appear to be ready to adjust to optimal Al-adatom (compared to native Al surface that is more rigid in that sense). In case of (111) surface the bond counting considerations does not work by symmetry if Ga island would not deform, however, the direct simulation shows that Ga effectively surrounding Al-adatom providing stronger bonding.

Figure 22:
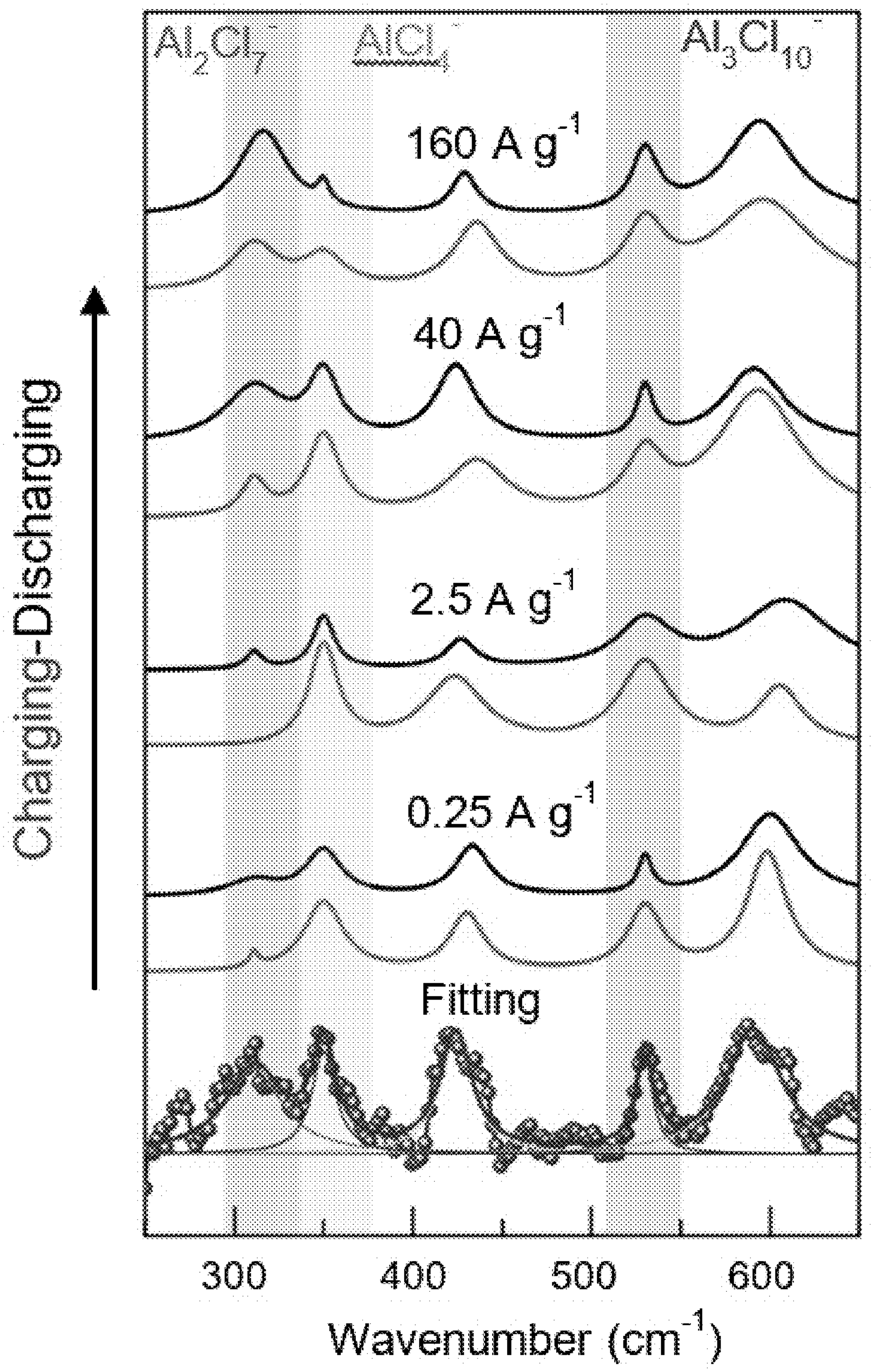
FIG. 22: Raman signals from Al-LM over a wide window of current densities. We sampled spectra with a large variation in current density, utilized high power laser with 647 nm excitation, and used pure Al as working electrode (instead of graphene). These modifications allowed for sufficient amount of current (or current density per gram of graphene) to flow through the Al-LM (counter/reference) while still make it possible to capture interpretable Raman signals. These factors as well as large reflection from the Al-LM electrode resulted in small intensities of the signal over the entire spectral range. We have focused our analysis on the 250-650 $cm^{-1}$ window where Al complexes are observed by performing fitting each peak with Lorentzian function for clarity.

The following discussion is in view of FIG. 22. High-wavenumber-shift was observed for all the peaks with this experimental setup. The following peaks are assigned: 598 $cm^{-1}$—$EMI^+$, 311 and 350 $cm^{-1}$ to $Al_2Cl_7^-$ and $AlCl_4^-$ respectively, and 529 $cm^{-1}$ to $Al_3Cl_{10}^-$. Slightly larger shift for $Al_3Cl_{10}^-$ might indicate further degree of polymerization while staying in the range of peaks between 480 and 540 $cm^{-1}$ typically assigned to $Al_3Cl_{10}^-$.[2] This gallium rich Al-LM (Al-$LM_{HIGH}$) resulted in the prominent appearance of Al triple-complexes. The peak intensity does follow similar trend as with relatively low gallium content Al-LM (Al-$LM_{LOW}$; FIGS. 3A-3F). Although, strengthening and weakening during charging and discharging, this peak never really disappears under the conditions tested for all current densities, which further validates our hypothesis indicating active involvement of the Al triple-complex in electrochemical reactions.

Embodiments and discussion regarding calculations of theoretical capacity:

The charge storage capacity is related to the number of ions adsorbed on the cathode. 3D graphene grown on nickel foam has a large surface area but with few stacked layers. From the XRD on the cathode before and after the charging, not much change in interlayer spacing was observed. We therefore conclude most of the absorptions for chloroaluminate ($AlCl_4^-$) occurred on open surfaces of graphene. Let us estimate the capacity using a single layer of anions on one graphene monolayer:

$$S_{hexagon-G} = \frac{3\sqrt{3}\,l^2}{2} = 5.239\times10^{-20}\ \mathrm{m}^2$$

In each hexagon, there are 2 carbon atoms (1/3*6) so the specific surface area for a single graphene layer (just one side) is:

$$S_G = \frac{S_{hexagon-G}}{2*\text{mass of carbon}} = \frac{5.239\times10^{-20}\ \mathrm{m}^2}{2\times1.994\times10^{-23}\ \mathrm{g}} = 1.314\times10^3\ \mathrm{m}^2\mathrm{g}^{-1}$$

Next, we take the size of $AlCl_4^-$ as d=0.479 nm 3 and assume these Al mono-complexes are closely packed on one-side of a monolayer of graphene. We treat them as a center-filled anionic hexagon, where the area is:

$$S_{hexagon-anion} = \frac{3\sqrt{3}\,(d)^2}{2} = 5.961\times10^{-19}\ \mathrm{m}^2$$

In each hexagon, there will be 3 $AlCl_4^-$ complexes (1/3*6+1) so the number of close-packed $AlCl_4^-$ per gram of graphene is:

$$N_{anion} = \frac{3S_G}{S_{hexagon-anion}} = 6.613\times10^{21}\ \mathrm{g}^{-1}$$

Theoretical capacity (Q) can be calculated using the Faraday's law, where the number of charge per anion is 1 (for n), F is the Faraday constant, and NA is the Avogadro's constant:

$$Q_{theoretical} = \frac{nFN_{anion}}{N_A} = \frac{96485.3329\ sA\ \mathrm{mol}^{-1}\times6.613\times10^{21}\ \mathrm{g}^{-1}}{6.02214\times10^{23}\ \mathrm{mol}^{-1}} = 1059.52\ sA\ \mathrm{g}^{-1} = 294.31\ mAh\ \mathrm{g}^{-1}$$

Considering that the graphene we made has an open 3D network. Graphene layers are not tightly packed, hence most of absorption will happen on the exposed surfaces. Besides, we did not count the edges from graphene in adsorbing anions. Adding all these factors together, specific capacity can be much greater than 294 mAh $g^{-1}$. Therefore, our specific capacity of 200 mAh $g^{-1}$ is not unreasonable.

REFERENCES CORRESPONDING TO THE ABOVE SUPPLEMENTAL INFORMATION

1 Jiao, H. et al. Liquid gallium as long cycle life and recyclable negative electrode for Al-ion batteries. *Chem Eng J* 391, 123594 (2020).

2 Dymek, C. J. J. et al. ChemInform Abstract: Spectral Identification of A13C110-in 1-Methyl-3-ethylimidazolium Chloroaluminate Molten Salt. *ChemInform* 19 (1988).

3 Wang, D. Y. et al. Advanced rechargeable aluminium ion battery with a high-quality natural graphite cathode. *Nat. Commun.* 8, 14283 (2017).

Example 1: Relevant Technologies

Various potentially useful descriptions, background information, applications of embodiments herein, terminology (to the extent not inconsistent with the terms as defined herein), mechanisms, compositions, methods, definitions, and/or other embodiments may be found in the following art, all of which are incorporated herein by reference in their entirety to the extent not inconsistent herewith:

U.S. Ser. No. 10/297,87062; AMBRI INC.; 2017-12-08—Voltage-enhanced energy storage devices;

US 20190089013A1; MIT; 2018-11-16—Multi-Element Liquid Metal Battery;

U.S. Pat. No. 9,786,955B1; MIT; 2014-03-10—Assembly methods for liquid metal battery with bimetallic electrode;

U.S. Pat. No. 8,841,014B1; Univ. KY Res. Found.; 2012-04-27—Liquid metal electrodes for rechargeable batteries;

1 Jul. 2020; Chem. Eng. J.; Volume 391, 123594—Liquid gallium as long cycle life and recyclable negative electrode for Al-ion batteries;

15 Dec. 2017; Science Advances; Vol. 3, no. 12—Ultrafast all-climate aluminum-graphene battery with quarter-million cycle life;

6 Apr. 2015; Nature; 520, 324-328—An ultrafast rechargeable aluminium-ion battery;

20 Feb. 2014; J. Phys. Chem. C 2014, 118, 10, 5203-5215—Chloroaluminate-Doped Conducting Polymers as Positive Electrodes in Rechargeable Aluminum Batteries; and 5 Feb. 2021 Nat. Commun. 12, 820.

CERTAIN ASPECTS AND EMBODIMENTS

Various aspects are contemplated and disclosed herein, several of which are set forth in the paragraphs below. It is explicitly contemplated and disclosed that any aspect or portion thereof can be combined to form an aspect. In addition, it is explicitly contemplated that: any reference to aspect 1 includes reference to aspects 1a and 1b, etc., and any combination thereof (i.e., any reference to an aspect includes reference to that aspect's lettered versions). Moreover, the terms "any preceding aspect" and "any one of the preceding aspects" means any aspect that appears prior to the aspect that contains such phrase (for example, the sentence "Aspect 5: The method or system of any preceding aspect . . . " means that any aspect prior to aspect 5 is referenced, including letter versions, including aspects 1a through 4). For example, it is contemplated and disclosed that, optionally, any electrochemical cell, material, method, or device of any the below aspects may be useful with or combined with any other aspect provided below. Further, for example, it is contemplated and disclosed that any embodiment or aspect described above may, optionally, be combined with any of the below listed aspects:

Aspect 1a: An electrochemical cell comprising:

an anode comprising:

a first surface comprising aluminum metal or an aluminum alloy;

a liquid metal on the first surface, the liquid metal being in liquid state during operation of the battery and the liquid metal having a different composition than that of the first surface; and aluminum-rich dendrites extending from the first surface and in contact with an electrolyte;

a cathode; and the electrolyte between the cathode and the anode, the electrolyte being capable of conducting ions.

Aspect 1 b: A method for making an electrochemical cell, the method comprising:

electrochemically growing aluminum-rich dendrites from nucleation sites of a first surface of an anode of the cell; wherein:

the anode comprises the first surface, the first surface comprising aluminum metal or an aluminum alloy;

the first surface is at least partially covered by a liquid metal;

the nucleation sites comprise aluminum-rich amorphous domains of the first surface and/or aluminum-rich defect sites of the first surface;

providing a cathode in electrical communication with the anode via a circuit and in ionic communication with the cathode via an ionically conductive electrolyte; and providing the electrolyte between the anode and the cathode.

Aspect 2: The cell of Aspect 1, wherein the aluminum-rich dendrites grow from aluminum-rich amorphous domains of the first surface and/or from defect sites of the first surface.

Aspect 3: The cell of any of the preceding Aspects, wherein the aluminum-rich dendrites have a height above the first surface that is greater than a thickness of a layer of the liquid metal on the first surface.

Aspect 4: The cell of any of the preceding Aspects, wherein the dendrites are formed of aluminum metal and/or an aluminum alloy.

Aspect 5: The cell of any of the preceding Aspects, wherein the dendrites at least partially grow via an electroplating during operation of the cell.

Aspect 6: The cell of any of the preceding Aspects, wherein growth of the dendrites is self-limited such that dendrites do not contact the cathode during operation of the cell.

Aspect 7: The cell of any of the preceding Aspects, wherein a number density of dendrites on the first surface is less than the same in an equivalent cell free of the liquid metal.

Aspect 8: The cell of any of the preceding Aspects, wherein the liquid metal comprises gallium.

Aspect 9: The cell of any of the preceding Aspects, wherein the liquid metal is gallium metal or a metallic alloy comprising gallium.

Aspect X: The cell of any of the preceding Aspects, wherein the liquid metal is an alloy comprising gallium, indium, and tin.

Aspect 10: The cell of any of the preceding Aspects, wherein aluminum, aluminum atoms, and/or aluminum ions are soluble in the liquid metal.

Aspect 11: The cell of any of the preceding Aspects, wherein the liquid metal covers a majority of the first surface between the dendrites.

Aspect 12: The cell of any of the preceding Aspects, wherein the liquid metal infiltrates or at least partially fills at least a portion of grain boundaries in the first surface.

Aspect 13: The cell of any of the preceding Aspects, wherein presence of the liquid metal increases a surface energy of at least portions of the first surface relative to a surface energy of the same portions of the first surface in absence of the liquid metal.

Aspect 14: The cell of any of the preceding Aspects, wherein the liquid metal is in the form of a liquid layer on the first surface.

Aspect 15: The cell of any of the preceding Aspects, wherein where the liquid metal is present the liquid metal physically separates the first surface from the electrolyte.

Aspect 16: The cell of any of the preceding Aspects, wherein the electrolyte is not in physical contact with the first surface except at or near the dendrites.

Aspect 17: The cell of any of the preceding Aspects, wherein the electrolyte is ionically conductive.

Aspect 18: The cell of any of the preceding Aspects, wherein the electrolyte is characterized as an organic electrolyte, an ionic liquid, or both.

Aspect 19: The cell of any of the preceding Aspects, wherein the anode is an aluminum metal electrode or an aluminum alloy electrode.

Aspect 20: The cell of any of the preceding Aspects, wherein the first surface comprises aluminum metal.

Aspect 21: The cell of any of the preceding Aspects, wherein the cathode comprises a three-dimensional network of carbon or a porous three-dimensional structure of carbon.

Aspect 22: The cell of any of the preceding Aspects, wherein the cathode comprises graphene.

Aspect 23: The cell of any of the preceding Aspects, wherein the cathode comprises a three-dimensional network of graphene or a porous three-dimensional structure of graphene.

Aspect 24: The cell of any of the preceding Aspects being a rechargeable Al-ion battery.

Aspect 25: The cell of any of the preceding Aspects, wherein the anode is in electrical communication with the cathode via an electrical circuit; and wherein the anode is in ionic communication with the cathode via the electrolyte.

Aspect 26: The cell of any of the preceding Aspects, the cell and/or a battery comprising one or more of said cell is characterized by a Coulombic efficiency of at least 97%.

Aspect 27: The cell of any of the preceding Aspects, the cell and/or a battery comprising one or more of said cell is capable of a charging rate C rating of 104 C and/or of charging to a capacity of at least 88 mAh $g^{-1}$ in 0.35 seconds.

Aspect 28: The cell of any of the preceding Aspects, the cell and/or a battery comprising one or more of said cell is capable of a specific capacity of 200 mAh $g^{-1}$ or greater.

Aspect 29: A method for making an electrochemical cell, the method comprising:

electrochemically growing aluminum-rich dendrites from nucleation sites of a first surface of an anode of the cell;

wherein:

the anode comprises the first surface, the first surface comprising aluminum metal or an aluminum alloy;

the first surface is at least partially covered by a liquid metal;

the nucleation sites comprise aluminum-rich amorphous domains of the first surface and/or aluminum-rich defect sites of the first surface;

providing a cathode in electrical communication with the anode via a circuit and in ionic communication with the cathode via an ionically conductive electrolyte; and providing the electrolyte between the anode and the cathode.

Aspect 30: A battery according to any of the embodiments described herein.

Aspect 31: An electrochemical cell according to any of the embodiments described herein.

Aspect 32: An anode or anode according to any of the embodiments described herein.

Aspect 33: A method according to any of the embodiments described herein for making a battery or cell according to any of the embodiments described herein.

Aspect 34: A method according to any of the embodiments described herein for operating a battery or cell according to any of the embodiments described herein.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms “a”, “an”, and “the” include plural reference unless the context clearly dictates otherwise. Thus, for example, reference to “a cell” includes a plurality of such cells and equivalents thereof known to those skilled in the art. As well, the terms “a” (or “an”), “one or more” and “at least one” can be used interchangeably herein. It is also to be noted that the terms “comprising”, “including”, and “having” can be used interchangeably. The expression “of any of claims XX-YY” (wherein XX and YY refer to claim numbers) is intended to provide a multiple dependent claim in the alternative form, and in some embodiments is interchangeable with the expression “as in any one of claims XX-YY.”

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

All possible ionic forms of molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every electrode, cell, battery, device, system, formulation, combination of components, and method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An electrochemical cell comprising:

an anode comprising:

a first surface comprising aluminum metal or an aluminum alloy;

a liquid metal on the first surface, the liquid metal being in liquid state during operation of the battery and the liquid metal having a different composition than that of the first surface; and aluminum-rich dendrites extending from the first surface and in contact with an electrolyte;

a cathode;

the electrolyte between the cathode and the anode, the electrolyte being capable of conducting ions;

wherein the liquid metal is in the form of a liquid metal layer on the first surface; and wherein the aluminum-rich dendrites have a height above the first surface that is greater than a thickness of the liquid metal layer on the first surface.

2. The cell of claim 1, wherein the aluminum-rich dendrites grow from aluminum-rich amorphous domains of the first surface and/or from defect sites of the first surface.

3. The cell of claim 1, wherein the dendrites are formed of aluminum metal and/or an aluminum alloy.

4. The cell of claim 2, wherein the dendrites at least partially grow via an electroplating during operation of the cell.

5. The cell of claim 2, wherein growth of the dendrites is self-limited such that dendrites do not contact the cathode during operation of the cell.

6. The cell of claim 1, wherein a number density of dendrites on the first surface is less than the same in an equivalent cell free of the liquid metal.

7. The cell of claim 1, wherein the liquid metal comprises gallium.

8. The cell of claim 7, wherein the liquid metal is an alloy comprising gallium, indium, and tin.

9. The cell of claim 1, wherein aluminum, aluminum atoms, and/or aluminum ions are soluble in the liquid metal.

10. The cell of claim 1, wherein the liquid metal covers a majority of the first surface between the dendrites.

11. The cell of claim 1, wherein the liquid metal infiltrates or at least partially fills at least a portion of grain boundaries in the first surface.

12. The cell of claim 1, wherein presence of the liquid metal increases a surface energy of at least portions of the first surface relative to a surface energy of the same portions of the first surface in absence of the liquid metal.

13. The cell of claim 1, wherein where the liquid metal is present the liquid metal physically separates the first surface from the electrolyte.

14. The cell of claim 1, wherein the electrolyte is not in physical contact with the first surface except at or near the dendrites.

15. The cell of any one of the preceding claims, wherein the electrolyte is ionically conductive; and wherein the electrolyte is characterized as an organic electrolyte, an ionic liquid, or both.

16. The cell of claim 1, wherein the anode is an aluminum metal electrode or an aluminum alloy electrode.

17. The cell of claim 1, wherein the first surface comprises aluminum metal.

18. The cell of claim 1, wherein the cathode comprises a three-dimensional network of carbon or a porous three-dimensional structure of carbon.

19. The cell of claim 16 being a rechargeable Al-ion battery.

20. The cell of claim 1, wherein the anode is in electrical communication with the cathode via an electrical circuit; and wherein the anode is in ionic communication with the cathode via the electrolyte.

21. The cell of claim 1, wherein the cell is: characterized by a Coulombic efficiency of at least 97%, capable of a charging rate C rating of $10^4$ C and/or of charging to a capacity of 88 mAh $g^{-1}$ in 0.35 seconds, and/or capable of a specific capacity of 200 mAh $g^{-1}$.

22. A method for making an electrochemical cell, the method comprising:

electrochemically growing aluminum-rich dendrites from nucleation sites of a first surface of an anode of the cell; wherein:

the anode comprises the first surface, the first surface comprising aluminum metal or an aluminum alloy;

the first surface is at least partially covered by a liquid metal;

the nucleation sites comprise aluminum-rich amorphous domains of the first surface and/or aluminum-rich defect sites of the first surface;

providing a cathode in electrical communication with the anode via a circuit and in ionic communication with the cathode via an ionically conductive electrolyte; and providing the electrolyte between the anode and the cathode;

wherein the liquid metal is in the form of a liquid metal layer on the first surface; and wherein the aluminum-rich dendrites have a height above the first surface that is greater than a thickness of the liquid metal layer on the first surface.

* * * * *